(12) United States Patent
Yi et al.

(10) Patent No.: US 6,292,980 B1
(45) Date of Patent: Sep. 25, 2001

(54) HINGE MECHANISM OF PORTABLE PHONE

(75) Inventors: Young-Jin Yi, Seoul; Young-Bae Ji; Cheon-Gyun Oh, both of Kyonggi-do, all of (KR)

(73) Assignee: Samsung Electronics Co., Ltc. (KR)

( * ) Notice: Subject to any disclaimer, the term of this patent is extended or adjusted under 35 U.S.C. 154(b) by 0 days.

(21) Appl. No.: 09/320,506

(22) Filed: May 26, 1999

(30) Foreign Application Priority Data

| May 26, 1998 | (KR) | 98-8833 |
| May 26, 1998 | (KR) | 98-8834 |
| Jun. 27, 1998 | (KR) | 98-11335 |
| Aug. 18, 1998 | (KR) | 98-15500 |
| Sep. 4, 1998 | (KR) | 98-16827 |
| Apr. 13, 1999 | (KR) | 99-12991 |

(51) Int. Cl.$^7$ .................................. E05C 17/64
(52) U.S. Cl. ............... 16/303; 16/329; 16/331; 16/304; 16/330; 379/433; 379/434
(58) Field of Search ............... 16/330, 303, 304, 16/329, 331; 379/433, 434

(56) References Cited

U.S. PATENT DOCUMENTS

| 5,628,089 | 5/1997 | Wilcox et al. . |
| 5,697,124 | 12/1997 | Jung . |
| 6,085,387 | * 7/2000 | Han .................................. 16/330 |

FOREIGN PATENT DOCUMENTS

| 0 713 313 A1 | 5/1996 | (EP) . |
| WO 92/20181 | 11/1992 | (WO) . |

* cited by examiner

*Primary Examiner*—Chuck Y. Mah
*Assistant Examiner*—Enoch E. Peavey
(74) *Attorney, Agent, or Firm*—Dilworth & Barrese, LLP

(57) ABSTRACT

There is disclosed a hinge mechanism for use in a portable phone having a phone body and a cover, the hinge mechanism configured to mechanically couple the cover to the phone body. The hinge mechanism includes at least one hinge module mounted to the phone body and configured to hinge the cover with respect to the phone body for opening and closing the cover. The hinge module includes a hinge housing having a bottom wall and a pair of opposite lateral end walls spaced from each other, one of the lateral walls having a hole. The hinge housing also has a pair of opposite longitudinal end walls spaced from each other. A hinge shaft is mounted in the housing and has a mountain-shaped portion provided with a pair of opposite cam surfaces at one longitudinal portion thereof and a shaft portion at the other longitudinal portion thereof. The hinge shaft is arranged in the hinge housing such that the shaft portion extends through the hole of the hinge housing outwardly from the hinge housing and is coupled to the cover. A hinge cam is provided in the hinge housing and has at one longitudinal portion thereof, a pair of mountain-shaped protrusions respectively provided with facing cam surfaces defining a valley-shaped portion therebetween, and, at the other longitudinal portion thereof, a mounting protrusion. The hinge cam valley-shaped portion is engaged with the mountain-shaped portion of the hinge shaft in such a fashion that it slides straight in a rotating axis direction in response to the rotation of the hinge shaft. A hinge spring is provided in the hinge housing to urge the hinge cam toward the hinge shaft.

10 Claims, 49 Drawing Sheets

HINGE MECHANISM OF PORTABLE PHONE

BACKGROUND OF THE INVENTION

1. Field of the Invention

The present invention relates to a portable phone, and more particularly to a hinge mechanism for use in a flip type or folder type portable phone for mechanically coupling a flip cover or folder to a phone body.

2. Description of the Related Art

Portable phones are portable communication terminals such as cellular phones, hand-held phones (HHPs), CT-2 phones, and personal communication service (PCS) phones. Such portable communication terminals have a communication function for conducting radio communications with a base station.

Currently, developments of such portable communication terminals are kept in pace with the tendency of electronic elements to provide a high sound sensitivity, as well as a light and compact device. For portable phones, there are various constructions such as, for example, a bar type, a flip type, and a folder type construction.

Although the bar type, flip type and folder type portable phones are currently used, the tendency toward the use of flip type or folder type portable phones is increasing gradually. The reason why the use of flip type or folder type portable phones is increasing currently is because a flip cover or folder coupled to a phone body serves to protect a plurality of keys on the phone body, thereby preventing erroneous operations of those keys, while additionally serving as a reflecting plate for concentrating sound, thereby enhancing the sound sensitivity. Further, the flip type or folder type construction is advantageous in that a microphone unit or speaker unit can be installed on the flip cover or folder resulting in a compact phone body.

Typically, flip type portable phones include a phone body, a flip cover, and a hinge mechanism adapted to mechanically couple the flip cover to the phone body. Such flip type portable phones are designed so that its operation mode is automatically switched between a conversation mode and a call waiting mode in accordance with open and closed states of the flip cover, respectively. On the other hand, folder type portable phones typically have a construction including a phone body, a folder, and a hinge mechanism adapted to mechanically and electrically couple the folder to the phone body.

Although the current tendency of portable phones is to provide a more compact phone construction, the minimum size of the phone is limited since it is necessary to ensure a minimal overall length corresponding to the distance between the mouth and ear of the user. In portable phones, a distance of about 14 cm or more should be maintained between a voice transmitter, on which a microphone unit is installed, and a voice receiver, namely, an ear piece on which a speaker is installed. The distance between the voice transmitter and voice receiver is termed a "conversation distance". In order to provide a compact phone body while accommodating the limitation resulting from the necessity of the conversation distance, an arrangement has been proposed in which the microphone unit is installed on the flip cover in the case of flip type portable phones. For the same purpose, in the case of folder type portable phones, an arrangement has been proposed in which the speaker is installed on the folder, along with an LCD unit.

Meanwhile, a hinge mechanism for flip type portable phones is disclosed in U.S. Pat. No. 5,697,124 issued to Jong Gab Jung, assigned to Samsung Electronics Co., Ltd., Korea, and entitled "HINGE MECHANISM FOR FOLDABLE ELECTRONIC APPARATUS". However, the hinge mechanism disclosed in this patent also has numerous problems.

The hinge mechanism disclosed in the U.S. Pat. No. 5,697,124 includes a pair of hinge modules installed in a receiving part of a phone body in a symmetric fashion. Each hinge module includes a hinge shaft, a hinge cam, a spring, and a hinge cover assembled together in a hinge housing. However, the hinge mechanism occupies a large space because its hinge modules, which consist of a plurality of elements, should be arranged in a symmetric fashion. For this reason, this construction adversely affects the compactness of the phone body.

Furthermore, there is a degradation in productivity and in the efficiency of the assembling process because the hinge mechanism includes two hinge modules each consisting of a large number of elements (the hinge housing, the hinge shaft, the hinge cam, the spring, and the hinge cover).

Moreover, the springs of the hinge modules disclosed in the U.S. Pat. No. 5,697,124 are too strong to make assembling thereof easy. Due to such a strong spring force, the hinge covers may be frequently separated or damaged, thereby causing the springs to become disengaged or be lost.

SUMMARY OF THE INVENTION

Accordingly, the present invention is provided to resolve the above mentioned problems, and an object of the present invention is to provide a hinge mechanism for use with a portable phone which is capable of easily being assembled.

Another object of the invention is to provide a hinge mechanism for use with a portable phone which is compact.

Another object of the invention is to provide a hinge mechanism for use with a portable phone which eliminates the use of separate elements, such as an independent hinge cover or cap, adapted to support a spring, thereby increasing the reliability in the opening and closing operations of a folder.

Another object of the invention is to provide a hinge mechanism for use with a portable phone which is capable of achieving stable opening and closing operations of a folder.

Another object of the invention is to provide a hinge mechanism for use with a portable phone which is capable of mounting a magnet thereto.

In accordance with the present invention, these objects are accomplished by providing in a portable phone including a phone body, a cover, and a hinge mechanism adapted to mechanically couple the cover to the phone body, the hinge mechanism generally having at least one hinge module mounted to the phone body and adapted to hinge the cover with respect to the phone body for opening and closing the cover. The hinge module generally includes a hinge housing having a bottom wall, and a pair of opposite lateral end walls spaced from each other, one of the lateral walls having a hole, and also having a pair of opposite longitudinal end walls spaced from each other.

The hinge module further includes a hinge shaft having a projection or mountain-shaped portion provided with a pair of opposite cam surfaces at one longitudinal portion thereof and a shaft portion at the other longitudinal portion thereof. Preferably, the shaft portion is provided at a free end thereof with a pair of opposite circumferential flat surfaces and a pair of opposite circumferential curved surfaces. The hinge shaft is arranged in the hinge housing such that the shaft portion extends through the hole of the hinge housing outwardly from the hinge housing and is coupled to the cover so that it rotates together with the cover.

A hinge cam is arranged in the hinge housing such that it faces the hinge shaft. The hinge cam has at one longitudinal portion thereof, a pair of projections or mountain-shaped protrusions respectively provided with facing cam surfaces defining a valley-shaped portion therebetween, and, at the other longitudinal portion thereof, a mounting structure or protrusion. The hinge cam is engaged at the valley-shaped portion with the mountain-shaped portion of the hinge shaft such that it slides straight in the housing in response to rotation of the hinge shaft. A hinge spring is provided in the hinge housing such that it is mounted to the mounting structure or protrusion of the hinge cam at one end thereof and is in contact with the other lateral end wall of the hinge housing at the other end thereof, the hinge spring serving to urge the hinge cam toward the hinge shaft. Preferably, the hinge module includes means for guiding the straight sliding movement of the hinge cam within the housing.

In alternate embodiments, a cover is provided to close an open upper surface of the housing.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in detail to the preferred embodiments of the present invention. In the following description of the present invention, a detailed description of known functions and configurations incorporated herein will be omitted when it may make the subject matter of the present invention rather unclear.

Figure 1:
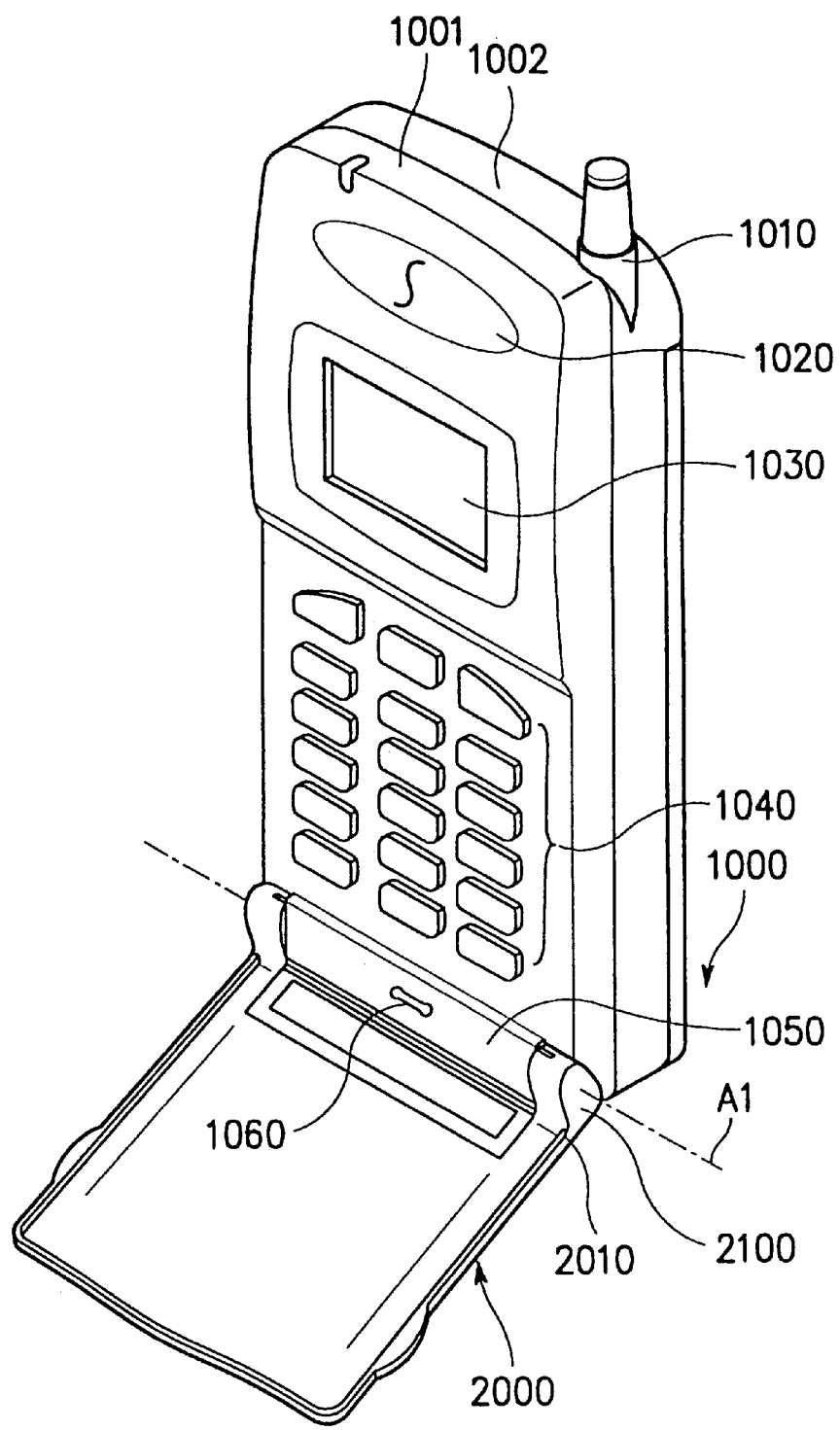
FIG. 1 is a perspective view illustrating a flip type portable phone which is in an off-hook state.
Figure 2:
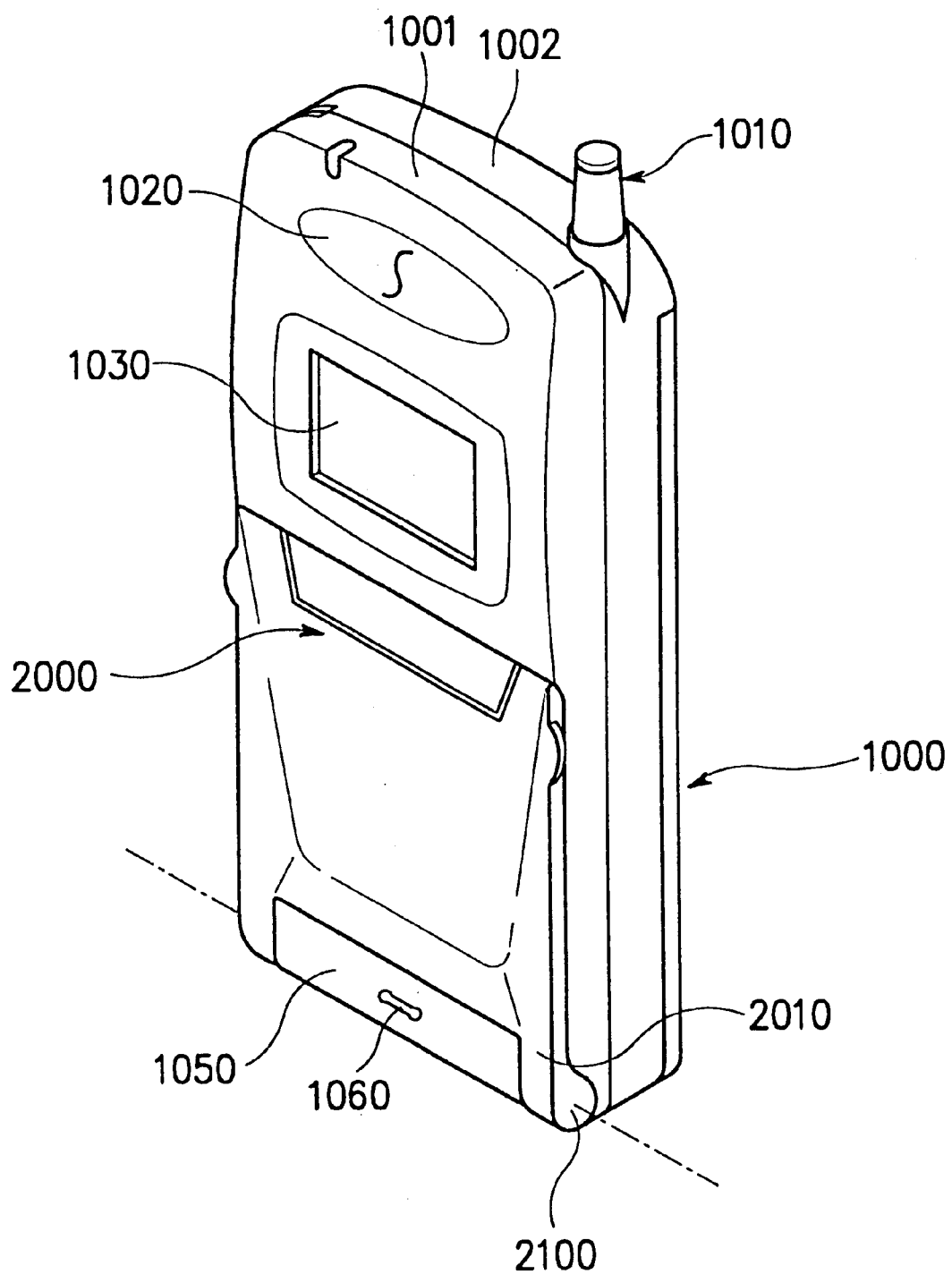
FIG. 2 is a perspective view illustrating the flip type portable phone of FIG. 1 which is in an on-hook state.

Referring to FIGS. 1 and 2, FIG. 1 is a perspective view illustrating a flip type portable phone which is in an off-hook state and which corresponds to a conversation mode. FIG. 2 is a perspective view illustrating the flip type portable phone which is in an on-hook state which corresponds to a call waiting mode.

As shown in FIGS. 1 and 2, the portable phone includes a phone body 1000, a flip cover 2000, and a hinge mechanism (shown in FIG. 3) adapted to mechanically couple the flip cover 2000 to the phone body 1000. The phone body 1000 includes an upper casing frame 1001 and a lower casing frame 1002. An antenna unit 1010 is mounted to the upper end of the phone body 1000. An ear piece 1020 including a speaker is arranged on the phone body 1000. An LCD unit 1030 is arranged on the phone body 1000 below the ear piece 1020. Below the LCD unit 1030, a key pad 1040 including a plurality of keys is arranged on the phone body 1000. A hinge arm 1050 is mounted to the phone body 1000 below the key pad 1040. A microphone unit 1060 is installed in a central portion of the hinge arm 1050. A pair of hinge modules (shown in FIG. 3) are also installed in the hinge arm 1050 at opposite sides of the microphone unit 1060. The hinge modules compose a hinge mechanism according to the present invention.

A flip cover 2000 is hingably coupled to the phone body 1000 by means of the hinge mechanism. The flip cover 2000 is provided with a pair of laterally spaced necks 2010 extending from one end of its body. A hinge socket 2100 is formed at a free end of each neck 2010 and coupled to the hinge mechanism.

Figure 3:
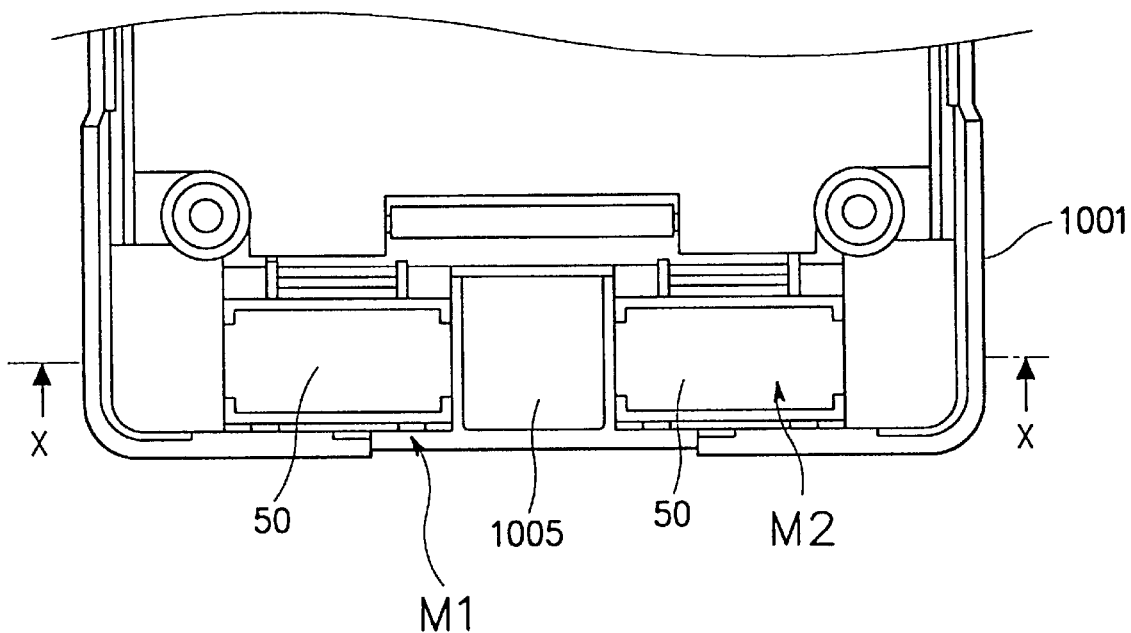
FIG. 3 is a plan view of hinge modules having a configuration according to a first embodiment of the present invention, illustrating a state in which the hinge modules are mounted in a receiving portion provided at a lower casing frame of a phone body.

Referring now to FIG. 3, the hinge modules, which are denoted by the reference characters M1 and M2, are symmetrically mounted in a receiving portion of the upper casing frame 1001, respectively. The hinge modules have a configuration in accordance with a first embodiment of the present invention. A space 1005 is defined in the receiving portion of the upper casing frame 1001 between the hinge modules M1 and M2 in order to receive the microphone unit 1060 (see FIG. 1).

Figure 4:
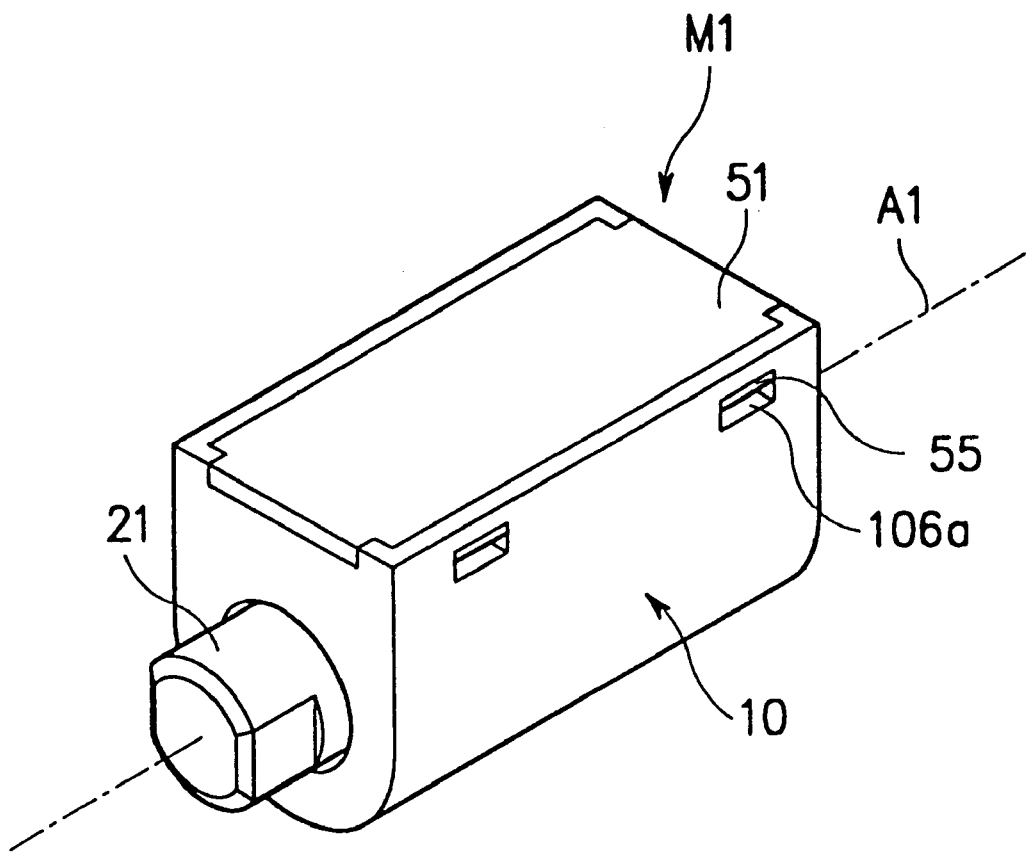
FIG. 4 is a perspective view illustrating one hinge module according to the first embodiment of the present invention in an assembled state.
Figure 5:
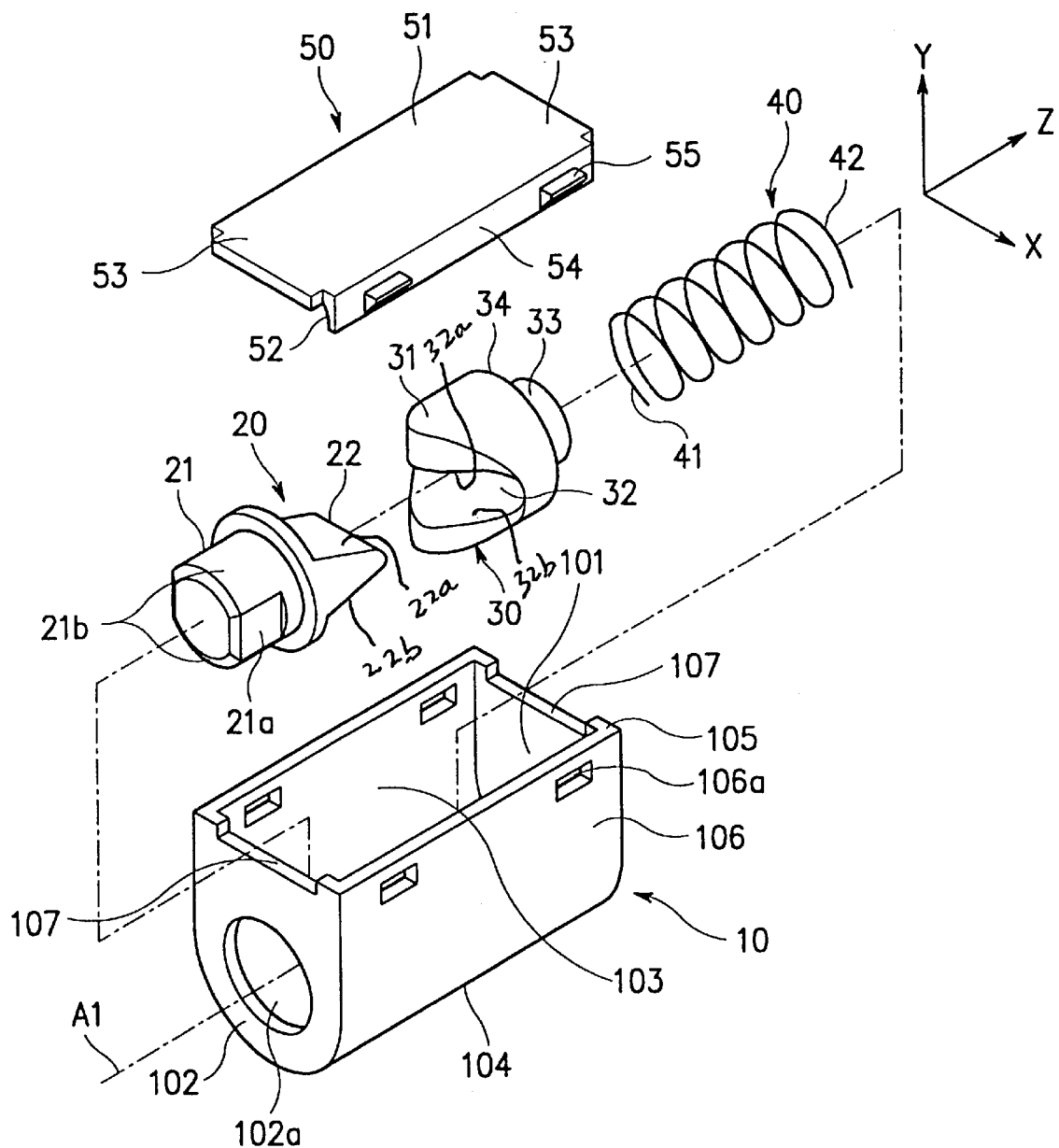
FIG. 5 is a perspective view with parts separated illustrating the hinge module shown in FIG. 4.
Figure 6:
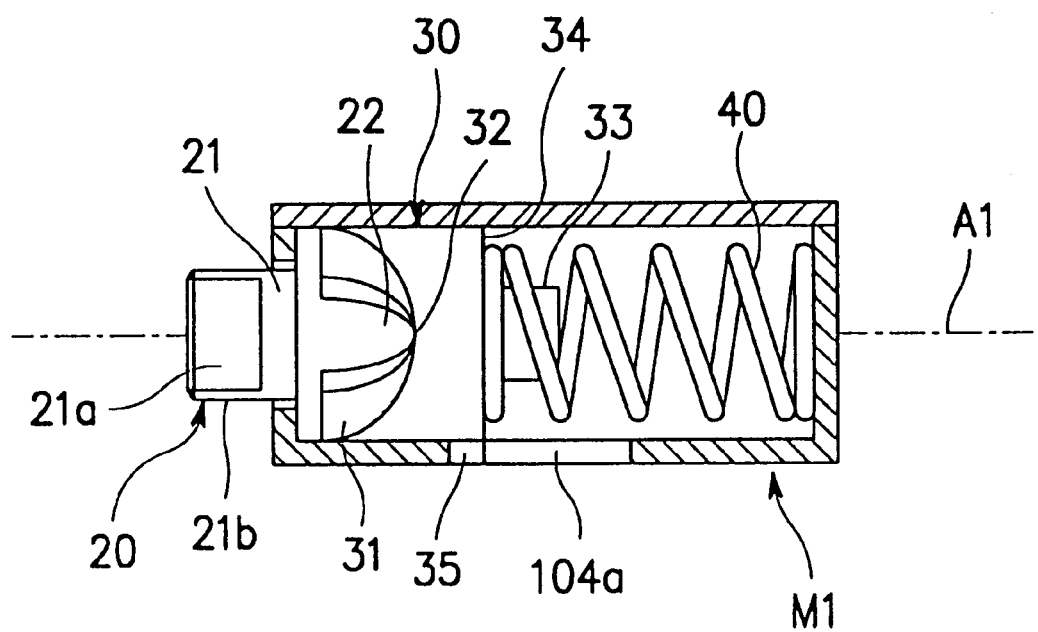
FIG. 6 is a cross-sectional view illustrating the assembled hinge module of FIG. 4.

Referring now to FIGS. 4 to 6, the configuration of each hinge module will be described in detail. For reference, it is noted that the X-axis direction in FIG. 5 corresponds to a horizontal direction, the Y-axis direction corresponds to a vertical direction, and the Z-axis direction corresponds to a rotating axis direction. It is also noted that the hinge modules M1 and M2 have the same configuration and are mounted in a symmetrical manner in the receiving portion of the phone body 1000. Accordingly, the following description will be made only in conjunction with one module, namely, the module M1. The description for the other module M2 would be identical.

As mentioned above, the hinge mechanism of the present invention includes two hinge modules which are assembled in the receiving portion provided at the lower end of the upper casing frame 1001. When the hinge modules are in a state in which they are mounted in the receiving portion of the upper casing frame 1001, their hinge covers are exposed outwardly from the receiving portion.

FIG. 4 is a perspective view illustrating the hinge module assembled in accordance with an embodiment of the present invention. FIG. 5 is an exploded perspective view illustrating the hinge module shown in FIG. 4. FIG. 6 is a cross-sectional view illustrating the assembled hinge module.

As shown in FIGS. 4 to 6, the hinge module M1 includes a hinge housing 10. As best shown in FIGS. 5 and 6, the hinge module M1 also includes a hinge shaft 20, a hinge cam j30, and a hinge spring 40. A hinge cover 50 is additionally provided and assembled to the hinge housing 10 in order to protect the hinge shaft 20, hinge cam 30, and hinge spring 40 received in the hinge housing 10. The hinge shaft 20, hinge cam 30 and hinge spring 40 are sequentially installed in the hinge housing 10 in the direction of a rotating axis A1 in this order. The hinge shaft 20 and hinge cam 30 have cylindrical shapes, respectively, so that they are assembled together in the rotating axis direction.

The hinge cover 50 may be selectively used. In other words, the hinge cover 50 is assembled to the hinge housing 10 in the case of a flip type portable phone. On the other hand, in the case of a folder type portable phone, the hinge cover 50 is not an essential element of the hinge mechanism. In the latter case, the hinge cover 50 may be selectively used or omitted.

Referring specifically to FIG. 5, the hinge housing 10 is completely closed at one end thereof by a lateral end wall 101 and is partially opened at the other end thereof by a lateral end wall 102. That is, a circular hole 102a is formed through the end wall 102 in order to allow a shaft portion 21 of the hinge shaft 20 to pass therethrough. The hinge housing 10 is also completely opened at its upper end and is completely closed at its lower end. That is, the hinge housing 10 has an opening 103 at its upper end, and a curved bottom wall 104 at its lower end. At least one engagement slot or hole 106a is provided at each side wall 106 of the hinge housing 10 in order to mount the hinge cover 50 to the upper end of the hinge housing 10, thereby covering the opening 103.

The hinge housing 10 is also provided with an upper surface 105 extending around the opening 103. A pair of recesses 107 are formed on the upper surface 105 at opposite ends of the hinge housing 10 in the rotating axis direction, respectively. A guide slot 104a (shown in FIG. 6) is formed at the bottom wall 104 in such a fashion that it extends in a longitudinal direction, namely, the rotating axis direction, by a desired predetermined distance. Guide slot 104a is provided to guide hinge cam 30 within housing 10 in a manner described hereinbelow.

The shaft portion 21 of the hinge shaft 20 extends in the rotating axis direction, namely, the Z-axis direction. The hinge shaft 20 also has a mountain-shaped portion 22 extending in the horizontal direction, namely, the X-axis direction, while having a pair of vertically opposite cam surfaces (22a, 22b). The shaft portion 21 has a cylindrical shape in such a fashion that it is provided at opposite lateral ends thereof with a pair of facing flat surfaces 21a, respectively, and at upper and lower ends thereof with a pair of facing curved surfaces 21b, respectively. The direction, in which the curved surfaces 21b are opposite to each other corresponds to the vertical direction, namely, the Y-axis direction, and is perpendicular to the direction along which the mountain-shaped portion 22 extends. The direction, in which the flat surfaces 21a are opposite to each other, corresponds to the horizontal direction, namely, the X-axis direction.

The hinge cam 30, which slides in the rotating axis direction Z, namely, the longitudinal direction, with respect to the hinge shaft 20, has, at one longitudinal portion thereof, a pair of vertically spaced mountain-shaped portions 31 defining a valley-shaped portion 32 therebetween. The valley-shaped portion 32 is defined by a pair of facing cam surfaces (32a, 32b) respectively provided on the mountain-shaped portions 31. The cam surfaces of the mountain-shaped portions 31 are in contact with the cam surfaces of the hinge shaft 20, respectively. The hinge cam 30 is also provided at the other longitudinal portion thereof with a spring mounting structure or protrusion 33 extending in the rotating axis direction. While the disclosed embodiments illustrate a protrusion as the spring mounting structure, it is within the contemplated scope of the present invention to provide other spring mounting structure, such as, for example, a hole, a groove, slot etc. As noted above, guide slot 104a in wall 104 guides hinge cam 30. A guide protrusion 35 (shown in FIG. 6) is downwardly protruded from the lower surface of the hinge cam 30. The guide protrusion 305 is received in the guide slot 104a (shown in FIG. 6) of the hinge housing 10 so that it guides movement of the hinge cam 30 along a straight path in the rotating axis or Z-axis direction. The valley-shaped portion 32 defined between the mountain-shaped portions 31 extends horizontally.

The hinge spring 40 is installed between the hinge cam 30 and the completely closed end wall 101 of the hinge housing 10. One end 41 of the hinge spring 40 is in contact with a surface 34 formed around the spring mounting protrusion 33 whereas the other end 42 of the hinge spring 40 is in contact with the completely closed end wall 101 of the hinge housing 10. Accordingly, the spring force of the hinge spring 40 is applied in the rotating axis direction A1. Since the hinge spring 40 is fitted around the spring mounting protrusion 33 at one end thereof, its separation from housing 10 is prevented.

Referring to FIG. 5, the hinge cover 50 has a flat upper surface 51 and a curved lower surface 52. The curved lower surface 52 is adapted to support the hinge shaft 20 and hinge cam 30. The hinge cover 50 is also provided at opposite longitudinal ends thereof with a pair of opposite protrusions 53 to be engaged with the recesses 107, respectively. At least one engagement protrusion 55 is protruded from each side surface of the hinge cover 50.

The assembly of the first embodiment of hinge module M1, which has the above mentioned configuration, will now be described with reference to FIGS. 5 and 6. Hinge shaft 20 is positioned within housing 10 such that shaft portion 21 protrudes through hole 102a in end wall 102. Hinge cam 30 is inserted into housing 10 and positioned such that mountain-shaped portion 22 of hinge shaft 20 is with in the valley shaped portion 32 of hinge cam 30. Subsequently, hinge spring 40 is compressed and positioned within housing 10 such that one end of spring 40 surrounds spring mounting protrusion 33 and the opposite end of hinge spring 40 engages end wall 101. Finally, hinge cover 50 is positioned to cover housing 10 by positioning protrusions 53 within recesses 107 on housing 10 and press-fitting hinge cover 50 to engage hole 106a on housing 10 with protrusions 55. It should be noted that components of the following disclosed embodiments are assembled in essentially the same manner and order.

In the completely assembled state of the hinge module M1, the valley-shaped portion 32 of the hinge cam 30 is maintained in a state engaged with the mountain-shaped portion 22 of the hinge shaft 20. The hinge cam 30 is also maintained in a state urged toward the hinge shaft 20 by the hinge spring 40. The mountain-shaped portion 22 of the hinge shaft 20 extends horizontally whereas the direction, in which the mountain-shaped portions 31 of the hinge cam 30 are opposite to each other, corresponds to the vertical direction. When the hinge shaft 20 rotates, the hinge cam 30 slides along the hinge shaft 20 while conducting a straight reciprocal movement along the guide slot 104a.

Figure 7:
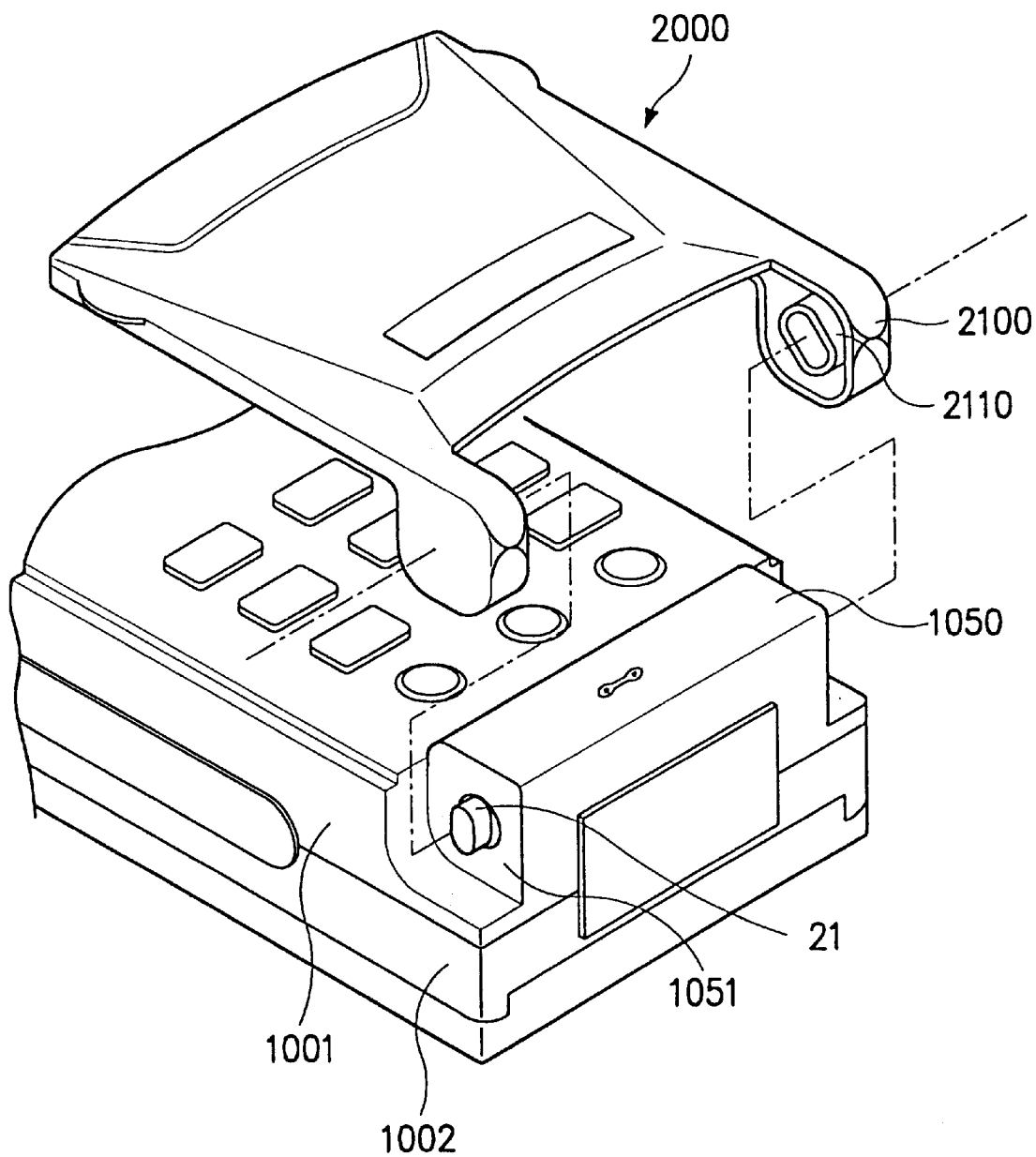
FIG. 7 is a perspective view illustrating a process for assembling a flip cover to the hinge mechanism according to the first embodiment of the present invention.

When assembly of module M1 is completed, the shaft portion 21 of the hinge shaft 20 is exposed outwardly from the hinge housing 10, as shown in FIGS. 4 and 6. The shaft portion 21 of the hinge shaft 20 is coupled to the associated hinge socket 2100 (shown in FIG. 7) of the flip cover 2000 so that it rotates in accordance with the opening and closing operations of the flip cover 2000. Specifically, the hinge modules of the present invention are mounted in a symmetrical manner in the hinge arm 1050 of the upper casing frame 1001, the shaft portions 21 of the hinge modules are exposed outwardly from opposite ends 1051 of the hinge arm 1050, respectively, as shown in FIG. 7. The hinge sockets 2100 of the flip cover 2000 are fitted around the exposed shaft portions 21 of the hinge modules in the rotating axis direction, respectively. Each of the hinge sockets 2100 has a fitting portion 2110 configured to fit around an associated one of the shaft portions 21. The fitting portion 2110 has a shape corresponding to that of the associated shaft portion 21 including the flat and curved surfaces as shown.

In operation, when the hinge shaft 20 rotates along with the flip cover 2000, the hinge cam 30 slides along the hinge shaft 20 while conducting a straight reciprocal movement along the guide slot 104a, as shown in FIG. 6. At this time, the hinge spring 40 conducts a compression or expansion movement along the rotating axis. Thus, flip cover 2000 is movably secured between two positions as described in more detail hereinbelow with respect to FIG. 11.

Figure 8:
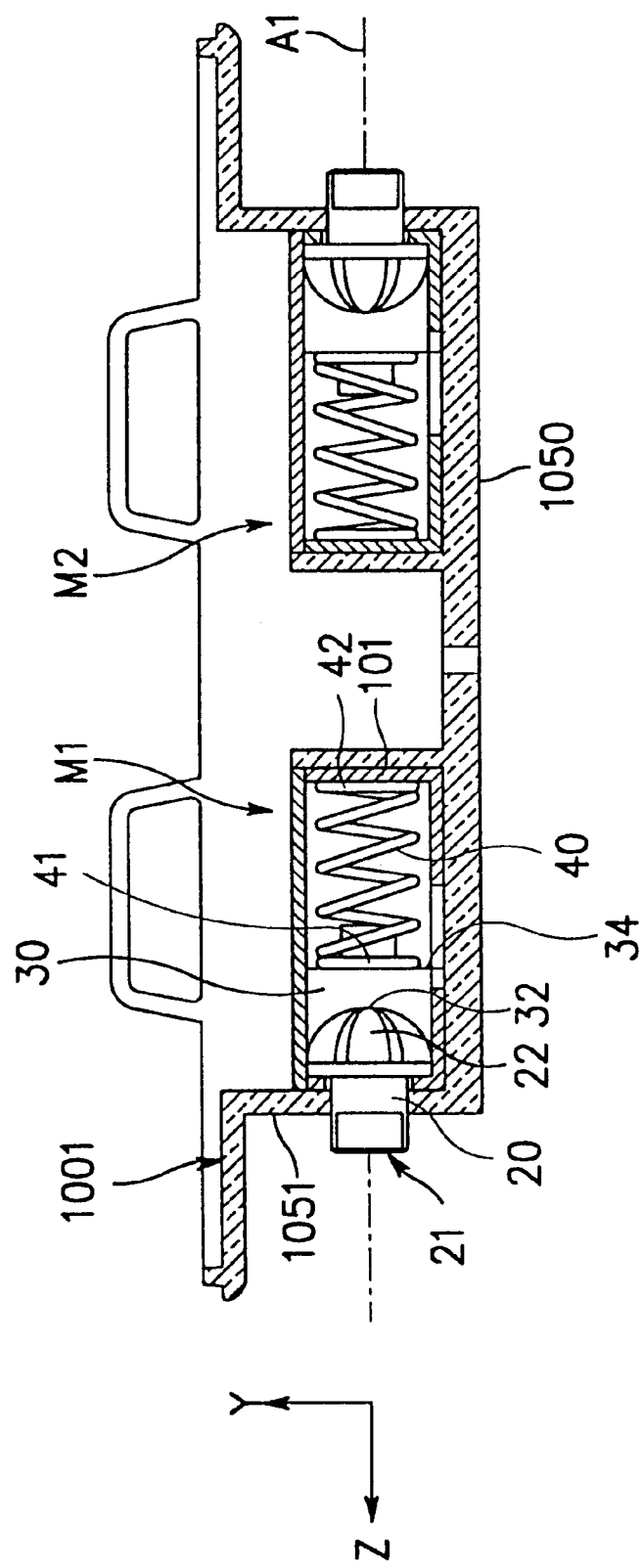
FIG. 8 is a cross-sectional view taken along the line X—X of FIG. 3, illustrating a state in which two hinge modules are mounted in a symmetrical manner in a receiving portion of a hinge arm included in the phone body.
Figure 9:
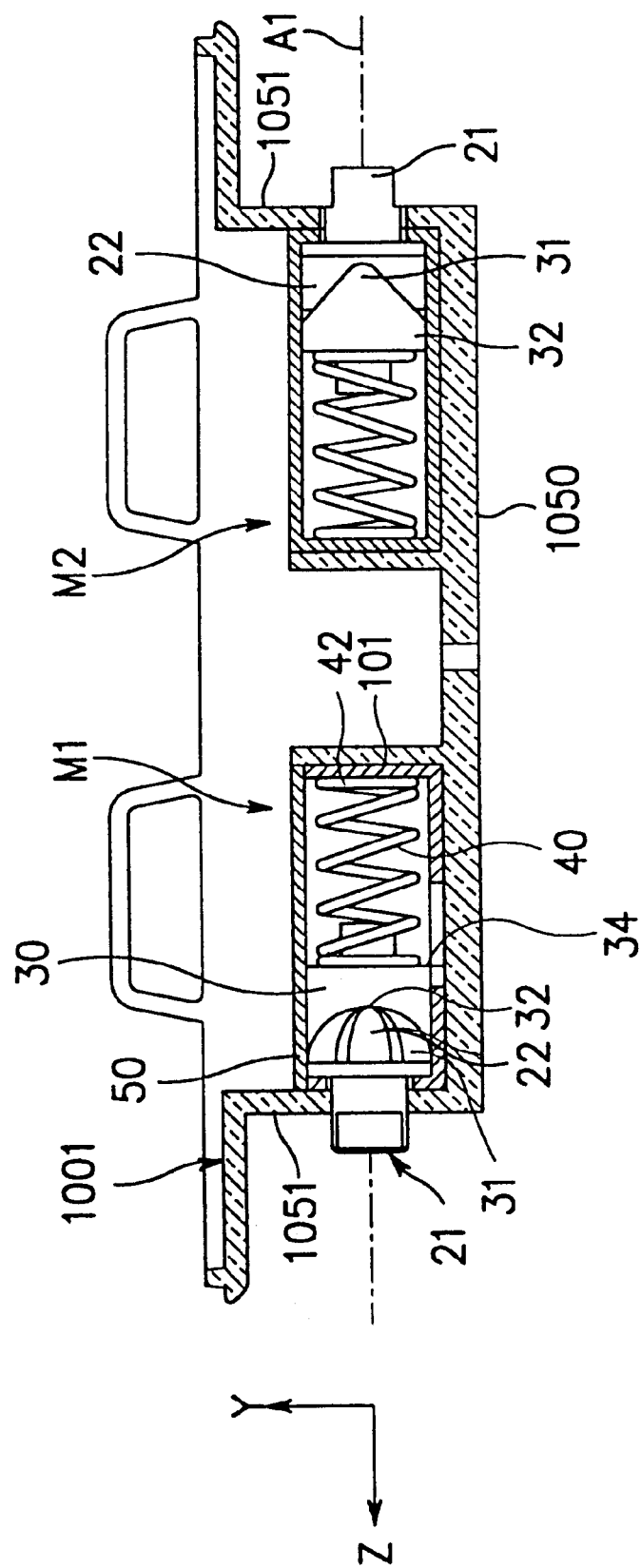
FIG. 9 is a cross-sectional view similar to FIG. 8, illustrating a state in which two hinge modules are mounted in an asymmetrical manner in the receiving portion of the hinge arm.
Figure 10:
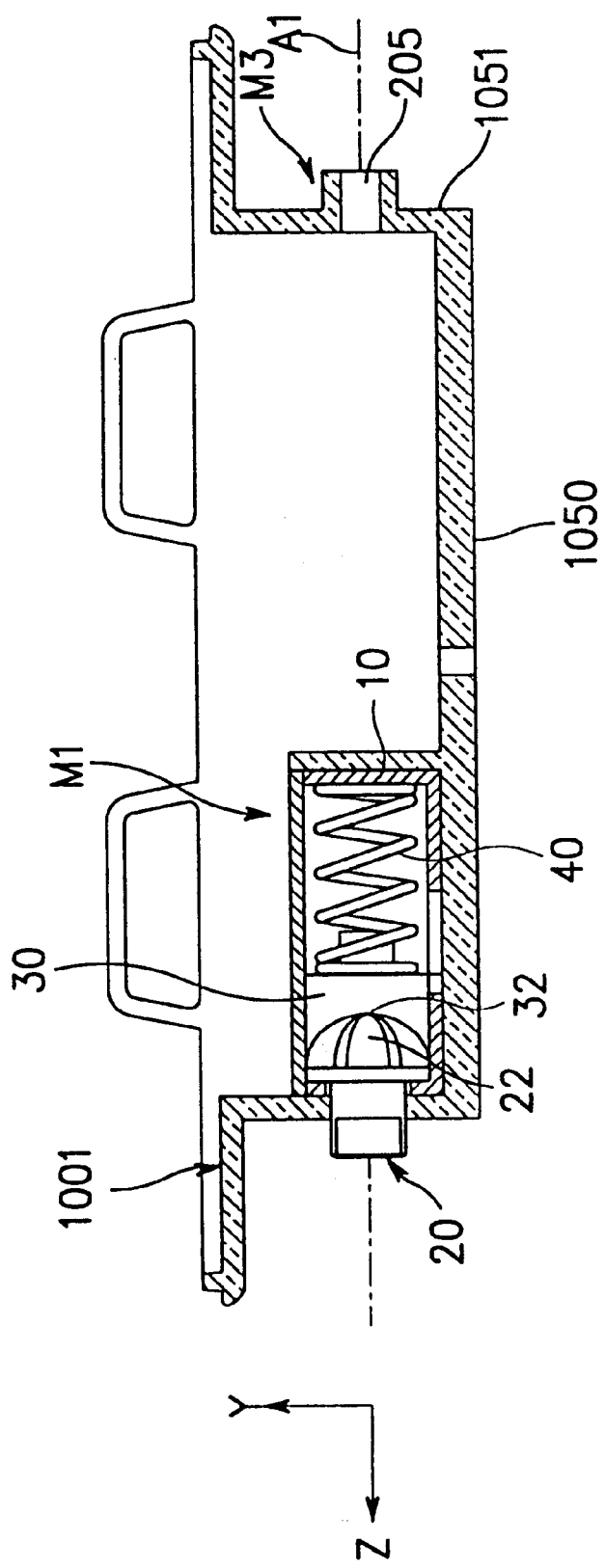
FIG. 10 is a cross-sectional view similar to FIG. 8 illustrating an alternate embodiment in which only one hinge module is mounted in the receiving portion of the hinge arm.

Referring to FIGS. 8 to 10, various mounting methods for the hinge modules M1 and M2 are illustrated. In FIG. 8 the hinge modules M1 and M2 are mounted in a symmetrical manner in the receiving portion of the hinge arm 1050 included in the phone body. That is the mountain-shaped portions 22 of both hinge shafts 20 are in parallel alignment and the valley-shaped portions 30 of both hinge cams 30 are in parallel alignment.

Referring to FIG. 9 the hinge modules M1 and M2 are mounted in an asymmetrical manner in the receiving portion of the hinge arm 1050 included in the phone body. That is, the mountain-shaped portion 22 of one hinge shaft 20 is oriented within the associated housing 10 in an orientation perpendicular to the mountain-shaped portion of the opposed hinge shaft 20. Similarly, the valley-shaped portion 32 of one hinge cam 30 is oriented substantially perpendicular to valley-shaped portions 32 of the opposed hinge cam 30.

FIG. 10 illustrates an embodiment in which only one hinge module M1 is mounted in the receiving portion of the hinge arm 1050.

For example, in the case of FIG. 8, the hinge modules M1 and M2 are mounted in a symmetrical manner in the hinge arm 1050 included in the phone body. Where the hinge modules M1 and M2 of the present invention are mounted in the receiving portion of the upper casing frame 1001 in such a fashion that they are symmetric to each other in the rotating axis direction A1, as shown in FIG. 8, the hinge housing 10, hinge shaft 20, hinge cam 30, and hinge spring 40 of each hinge module arranged such that they are symmetric to those of the other hinge module.

In use, the mountain-shaped portion 22 of the hinge shaft 20 is engaged with the valley-shaped portion 32 of the hinge cam 30. One end 41 of the hinge spring 40 is in contact with the surface 34 of the hinge cam 30 whereas the other end 42 of the hinge spring 40 is in contact with the closed end wall 101 of the hinge housing 10. When the mountain-shaped portion 22 of the hinge shaft 20 is positioned in a state, in which its cam surfaces are vertically opposite to each other, the hinge spring 40 is maintained in a maximum expansion state. The shaft portion 21 of the hinge shaft 20 is exposed outwardly from the associated end 1051 of the hinge arm 1050. As mentioned above, the mountain-shaped portion 22 of the hinge shaft 20 extends horizontally in such a fashion that their cam surfaces are vertically opposite to each other, and the valley-shaped portion 32 of the hinge cam 30 also extends horizontally in such a fashion that the cam surfaces defining the valley-shaped portion 32 face each other in the vertical direction.

In the case of FIG. 9, the hinge modules M1 and M2 are mounted in an asymmetrical manner in the receiving portion of the hinge arm 1050 included in the phone body. As shown in FIG. 9, the hinge module M1 is mounted in such a fashion that it is directed in an upward direction (Y-axis direction) whereas the hinge module M2 is mounted in such a fashion that it is directed in an inward direction of the phone body.

In the hinge module M1, accordingly, the mountain-shaped portion 22 of the hinge shaft 20 is arranged in such a fashion that its cam surfaces are vertically opposite to each other, and the mountain-shaped portions 31 of the hinge cam 30 are arranged in such a fashion that their cam surfaces are vertically opposite to each other. In contrast thereto, in the hinge module M2, the mountain-shaped portion 22 of the hinge shaft 20 is arranged in such a fashion that its cam surfaces are horizontally opposite to each other, and the mountain-shaped portions 31 of the hinge cam 30 are arranged in such a fashion that their cam surfaces are horizontally opposite to each other.

Also, the shaft portions 21 of the hinge modules M1 and M2, which are exposed outwardly from opposite ends 1051 of the hinge arm 1050, respectively, are arranged in such a fashion that they are asymmetric to each other.

Thus, the hinge modules M1 and M2, which have the same configuration, are mounted to the upper casing frame 1001 of the phone body in such a fashion that they are asymmetric to each other. As a result, the engaging position of the hinge shaft 20 with respect to the associated hinge cam 30 in the hinge module M1 is varied from that of hinge module M2 when the shaft portions 21 of the hinge modules M1 and M2 are fitted in the hinge sockets 2100 of the flip cover 2000.

Referring to FIG. 10, only one hinge module M1 is mounted in the left part of the receiving portion of the hinge arm 1050 provided at the upper casing frame 1001. In the right part of the receiving portion of the upper casing frame 1001, a hinge dummy M3 is mounted in such a fashion that it is integral with the receiving portion.

The hinge dummy M3 has an axially extending hole 205 adapted to increase the rigidity of the hinge dummy M3. In this case, the space utilization of the phone body can be maximized because the other hinge module M2 is dispensed with.

Figure 11:
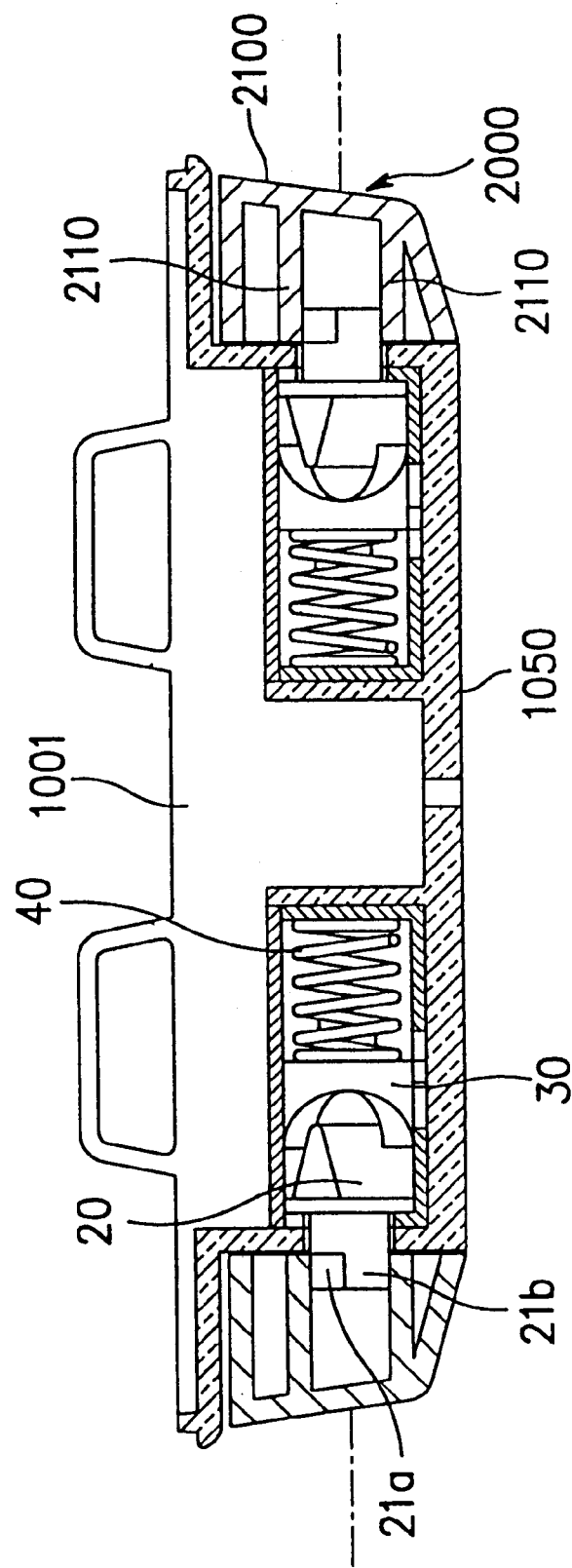
FIG. 11 is a cross-sectional view illustrating a state in which a flip cover is mounted to two hinge modules according to the first embodiment of the present invention.

FIG. 11 is a cross-sectional view illustrating the state in which the flip cover 2000 is coupled to two hinge modules M1 and M2 symmetrically mounted in the receiving portion of the upper casing frame 1001. As shown in FIG. 11, the hinge modules M1 and M2 are fitted in the hinge sockets 2100 of the flip cover 2000, respectively, so that they apply, to the flip cover 2000, a force adapted to urge the flip cover 2000 to be opened in an on-hook state and a force adapted to prevent the flip cover 2000 from being pivotally moved in an off-hook state. Such a function of the hinge modules M1 and M2 is achieved in accordance with a cooperation of the hinge shaft 20, hinge cam 30 and hinge spring 40 included in each hinge module. The forces applied to the flip cover 2000 are generated from the hinge springs 40. A desired conversation angle (in the off-hook state) and a desired call waiting angle (in the on-hook state) of the flip cover 2000 are obtained in accordance with rotating movements of the hinge shafts 20, straight sliding movements of the hinge cams 30, and cam operations between the hinge shafts 20 and the associated hinge cams 30. The angle, at which the flip cover 2000 is prevented from being pivotally moved, corresponds to a general conversation angle of, for example, 135°. The cover maintained in the closed position, an angle of 45°, against the spring force.

Meanwhile, the opening and closing angle range of the flip cover 2000 may be varied by varying the angular position of the shaft portion 21 in each hinge shaft and the angular position of the fitting portion 2110 in each hinge socket 2100. Where the hinge modules are symmetrically arranged in accordance with the present invention, the opening and closing angle range of the flip cover 200 is about 130° to about 150°. Where the direction, in which the flat surfaces 21a formed at the exposed end of each hinge shaft 20 are opposite to each other, and the direction, in which the curved surfaces 21b are opposite to each other, are varied, the opening and closing angle range of the flip cover 200 is varied. In other words, when the angular position of the shaft portion 21 in each hinge shaft 20 is varied, the opening and closing angle range of the flip cover 200 is varied.

Figure 12:
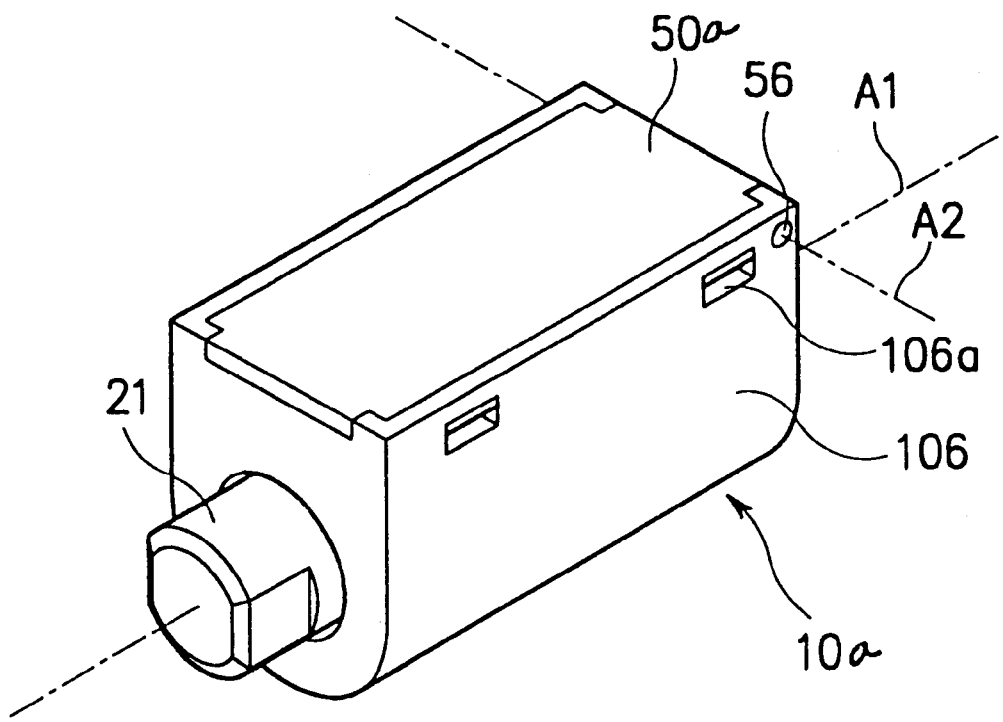
FIG. 12 is a perspective view illustrating a hinge module having a configuration according to a second embodiment of the present invention.
Figure 13:
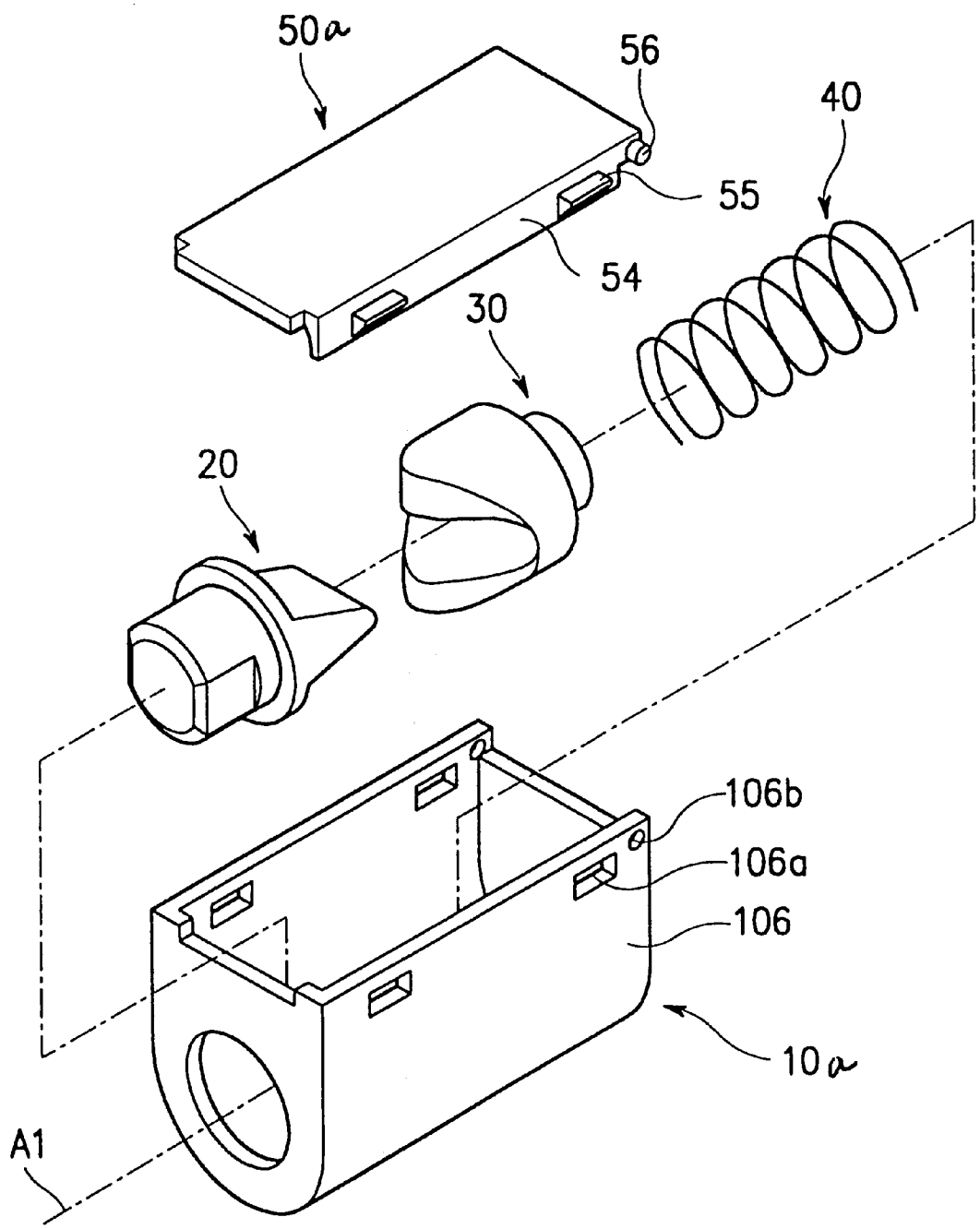
FIG. 13 is a perspective view with parts separated illustrating the hinge module according to the second embodiment of the present invention.

FIG. 12 is a perspective view illustrating a hinge module having a configuration according to a second embodiment of the present invention. FIG. 13 is a perspective view with parts separated illustrating the hinge module according to the second embodiment of the present invention.

Referring to FIGS. 12 and 13, the hinge module configuration according to the second embodiment of the present invention is similar or identical to that according to the first embodiment, except for the configurations of the hinge housing 10a and hinge cover 50a. Accordingly, the hinge module configuration according to the second embodiment of the present invention will be described only in association with the configurations of the hinge housing 10a and hinge cover 50a while referring to FIGS. 12 and 13.

In the hinge module M1 according to the second embodiment of the present invention, the means for assembling the hinge cover 50a to the hinge housing 10a comprises an additional pair of hinge holes 106b respectively perforated through both side walls 106 of the hinge housing 10a at one upper corner of the hinge housing 10a, and a pair of hinge protrusions 56 respectively formed at both side surfaces 54 of the hinge cover 50a. The hinge protrusions 56 are engaged with the hinge holes 106b. Accordingly, the hinge cover 50a can hinge about a rotating axis A2 with respect to the hinge housing 10a in order to open and close the hinge housing 10a. Similar to that disclosed in the first embodiment above, as housing cover 50a is pivoted, engagement protrusions 55 are pressed into snap fit engagement with holes 106a on housing 10a.

By virtue of the above mentioned assembling means, the process of assembling the hinge cover 50a to the hinge housing 10a can be easily carried out. Also, the process of assembling the hinge shaft, hinge cam, and hinge spring in the hinge housing can be easily and accurately carried out. Accordingly, increased convenience is provided the worker in conducting the assembling process. That is, the assembling process can be completed by simply hingably moving the hinge cover 50a to close the hinge housing 10a after assembling the hinge shaft 20, hinge cover 30, and hinge spring 40 in the hinge housing 10a. When it is desired to disassemble the elements mounted in the hinge housing 10a, this can be easily achieved by simply hingably moving the hinge cover 50a to open the hinge housing 10a. The second embodiment also prevents the hinge cover 50a from being lost during maintenance and repair of the hinge module.

Figure 14:
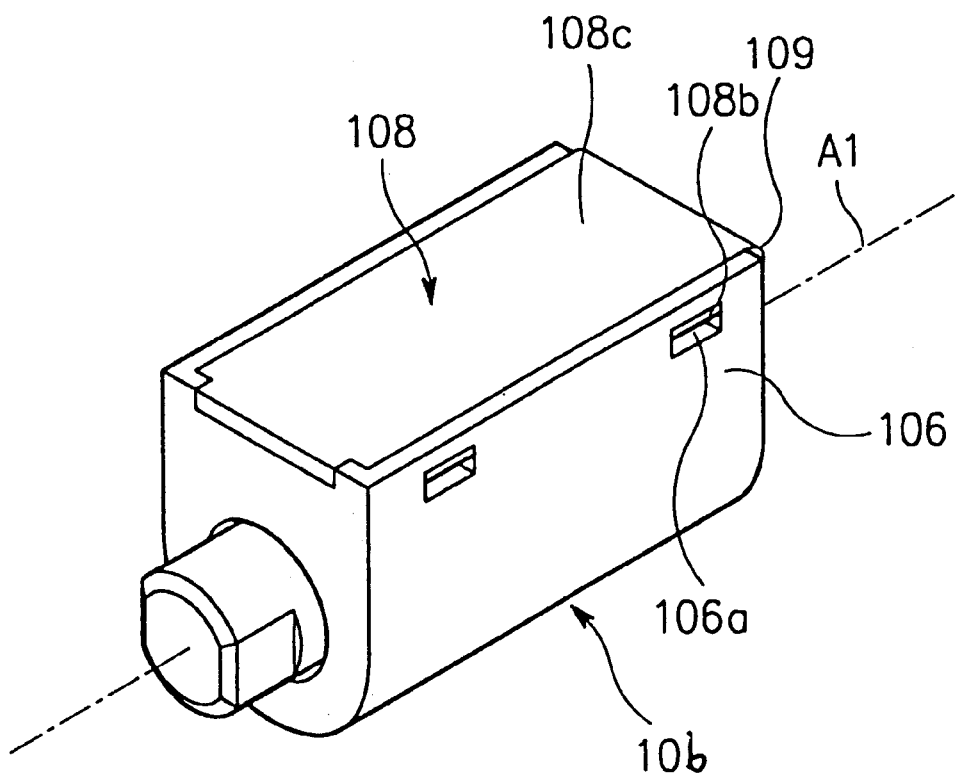
FIG. 14 is a perspective view illustrating a hinge module having a configuration according to a third embodiment of the present invention.
Figure 15:
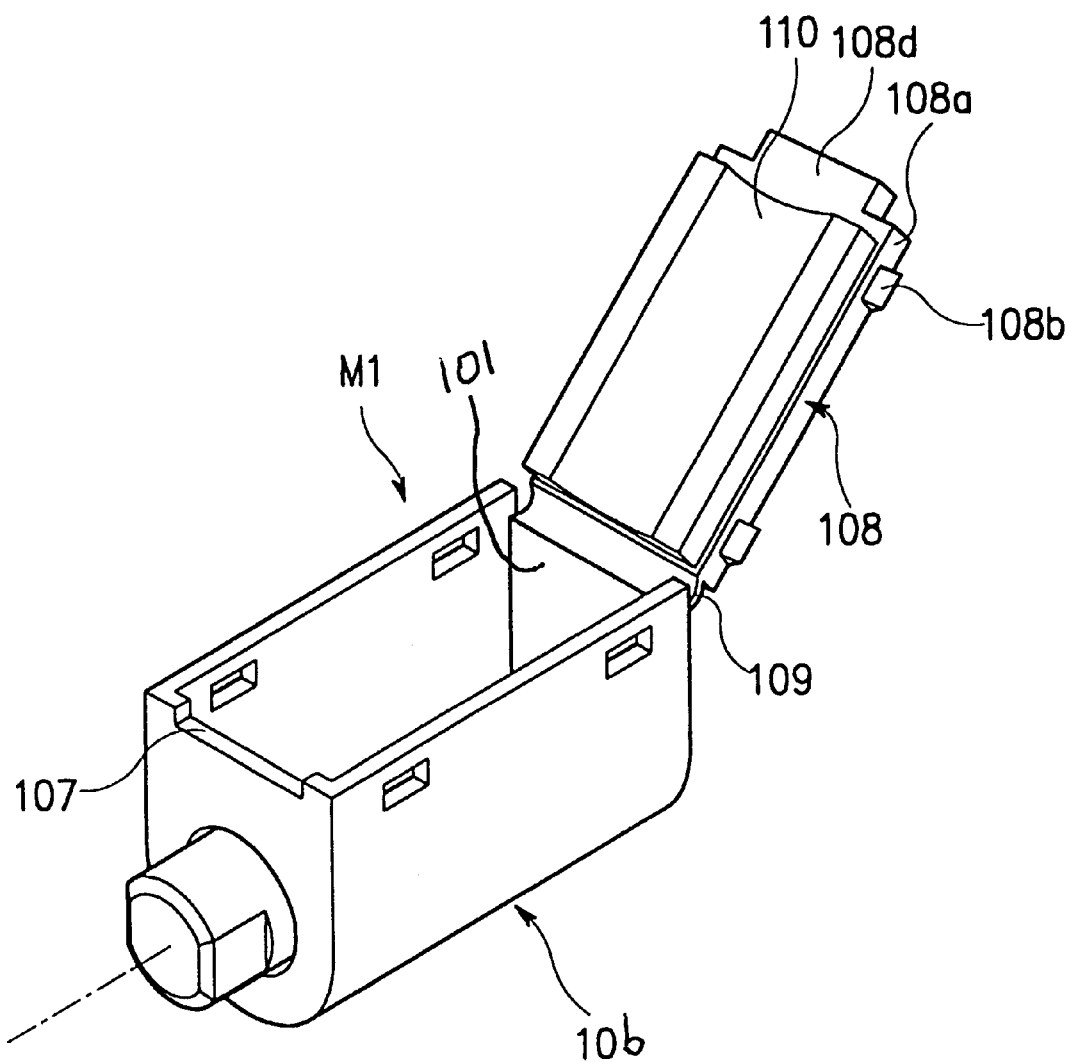
FIG. 15 is a perspective view with parts separated illustrating the hinge module according to the third embodiment of the present invention.

FIG. 14 is a perspective view illustrating a hinge module having a configuration according to a third embodiment of the present invention. FIG. 15 is a perspective view with parts separated illustrating the hinge module according to the third embodiment of the present invention. The hinge module configuration according to the third embodiment of the present invention is similar or identical to that according to the first embodiment, except for the configuration of the hinge housing 10b and the configuration of a hinge cover 108. Accordingly, the hinge module configuration according to the third embodiment of the present invention will be described only in association with the configurations of the hinge housing 10b and hinge cover 108 while referring to FIGS. 14 and 15.

In the hinge module M1 according to the third embodiment of the present invention, the hinge cover 108 is coupled to the hinge housing 10b by a living hinge or connecting member 109 in such a fashion that it is integral with the hinge housing 10b, as shown in FIGS. 14 and 15.

The connecting member 109 is made of a flexible material while having a structure having a small thickness so that it serves as a hinge member for the hinge cover 108. The flexible material of the hinge member 109 may be a plastic material. The hinge member 109 is connected at one end thereof to the closed end wall 101 of the hinge housing 10b and at the other end thereof to one end of the hinge cover 108 so as to integrally connect the hinge housing 10b and hinge cover 108 together. The hinge member 109 has sufficient flexibility to allow the hinge cover 108 to move between open and closed positions relative to hinge housing 10b.

Hinge cover 108 has opposite side surfaces 108a, a flat upper surface 108c (FIG. 14), and a curved lower surface 110. At least one engagement protrusion 108b is protruded from each side surface 108 which is configured to engage holes 106a in walls 106 of housing 10b to maintain the cover 108 in a closed position. The hinge cover 108 also has a protrusion 108d to be engaged with the recess 107 of the hinge housing 10b.

Figure 16:
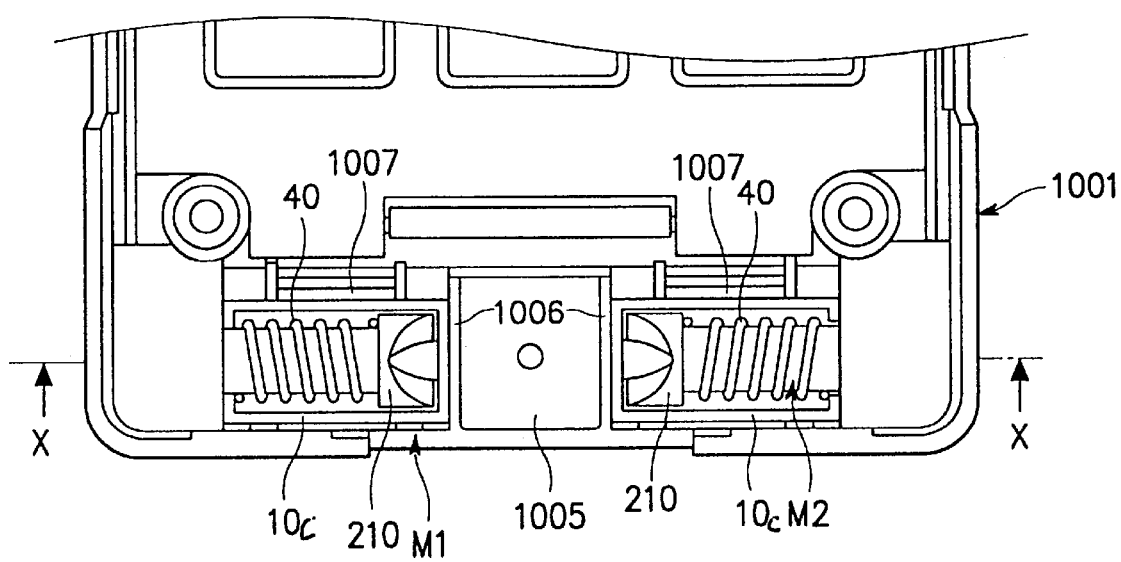
FIG. 16 is a bottom view of hinge modules having a configuration according to a fourth embodiment of the present invention, illustrating a state in which the hinge modules are mounted in a symmetrical manner in the receiving portion defined in the upper casing frame of the phone body.

FIG. 16 is a bottom view illustrating hinge modules having a configuration according to a fourth embodiment of the present invention mounted in a symmetrical manner in the receiving portion defined in the upper casing frame 1001 of the phone body 1000.

As shown in FIG. 16, the hinge modules M1 and M2 are symmetrically mounted in the receiving portion of the upper casing frame 1001 in such a fashion that a space 1005 is defined therebetween. The space 1005 defined between the hinge modules M1 and M2 is adapted to install a microphone unit therein.

In order to maintain the hinge modules M1 and M2 in a fixed state, walls 1006 and 1007 are formed on the upper casing frame 1001.

Figure 17:
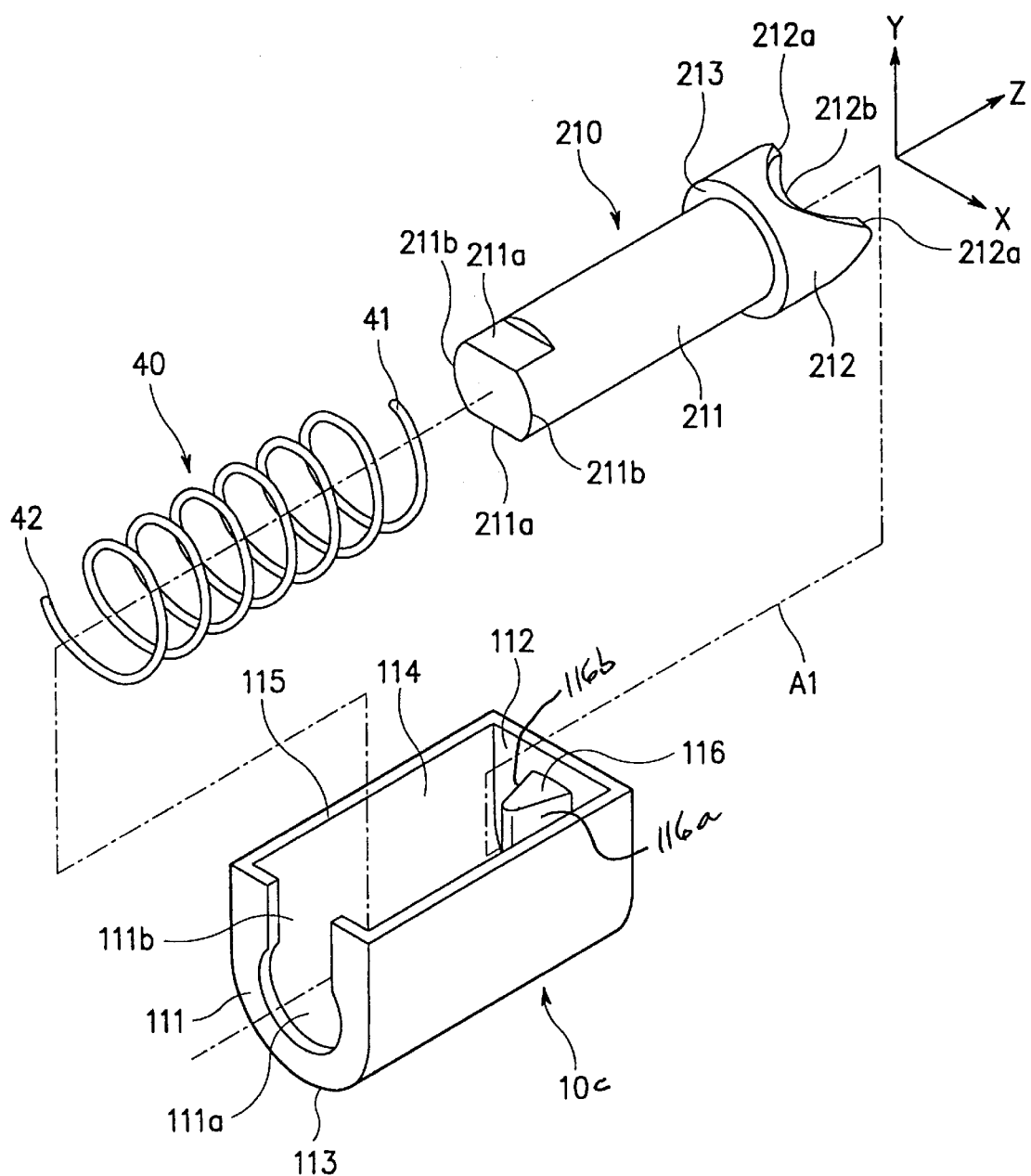
FIG. 17 is a perspective view with parts separated illustrating the configuration of one hinge module according to the fourth embodiment of the present invention.

FIG. 17 is a perspective view with parts separated illustrating the configuration of one hinge module according to the fourth embodiment of the present invention.

For reference, it is noted that the X-axis direction in FIG. 17 corresponds to a horizontal direction, the Y-axis direction corresponds to a vertical direction, and the Z-axis direction corresponds to a rotating axis direction. It is also noted that the hinge modules M1 and M2 have the same configuration and are mounted in a symmetrical manner in the receiving portion of the phone body 1000. Accordingly, the following description will be made only in conjunction with one module, namely, the module M1. The description for the other module M2 would be identical.

As mentioned above, the hinge mechanism of the present invention includes two hinge modules which are assembled in the receiving portion provided at the lower end of the upper casing frame 10001. Although FIG. 16 illustrates the case in which the hinge modules are symmetrically mounted, those hinge modules may be mounted in an asymmetric manner. Furthermore, it is possible to mount only one hinge module. Such different configurations of the hinge mechanism result in only a variation in the opening and closing angle range of the flip cover 2000. Those different configurations of the hinge mechanism will be described in detail, in conjunction with FIGS. 20–22.

As shown in FIG. 17, the hinge module M1 includes a hinge housing 10c, a hinge shaft 210 mounted in the hinge housing 10c, and a hinge spring 40 mounted in the hinge housing 10c and positioned around the hinge shaft 210. In the hinge housing 10c, the hinge shaft 210 and hinge spring 40 are disposed in the direction of a rotating axis A1.

The hinge housing 10c is completely closed at one end thereof when viewed in the rotating axis direction A1 by a lateral end wall 112 and partially opened at the other end thereof by a lateral end wall 111. The hinge housing 10c is also completely opened at its upper end and completely closed at its lower end. That is, the hinge housing 10c has an opening 114 at its upper end, and a curved bottom wall 113 at its lower end. The hinge housing 10c has a flat surface 115 arranged around the opening 114. The curved bottom wall 113 has a semi-cylindrical shape. The partially opened end wall 111 of the hinge housing 10c has a C-shaped structure. That is, the partially opened end wall 111 is provided with two holes 111a and 111b. The hole 111a allows a shaft portion 211 of the hinge shaft 210 to extend therethrough in the rotating axis direction A1 whereas the hole 111b allows the shaft portion 211 to be downwardly inserted through the hole 111a with the flat sides 211a of shaft 211 parallel to the wall edges defined by hole 111b when the hinge shaft 210 is assembled into the housing.

A mountain-shaped protrusion 116 extends from the completely closed end wall 112 of the hinge housing 10c in the rotating axis direction A1 in the interior of the hinge housing 10c. The mountain-shaped protrusion 116 also extends vertically (namely, in the Y-axis direction) while having a uniform mountain-shaped cross section. The mountain-shaped protrusion 116 serves as a fixed cam having a pair of horizontally opposite cam surfaces 116a, 116b.

The hinge shaft 210 has a cylindrical construction and is provided with a cam 212 configured to engage the mountain-shaped protrusion 116 and serving to slide on the cam surfaces of the mountain-shaped protrusion 116 during a rotation of the hinge shaft 210, thereby moving the hinge shaft 210 in the longitudinal direction. The shaft portion 211 of the hinge shaft 210 extends from the cam 212 in the rotating axis direction A1. The cam 212 has a pair of horizontally spaced mountain-shaped portions 212a defined with a valley-shaped portion 212b therebetween. The valley-shaped portion 212b is defined by a pair of horizontally facing cam surfaces respectively provided at the mountain-shaped portions 212a in such a fashion that it extends vertically (namely, in the Y-axis direction). The mountain-shaped portions 212a of the hinge shaft 210 horizontally face each other. The cam surfaces of the mountain-shaped portions 212a are in contact with the cam surfaces 116a and 116b of the mountain-shaped protrusion 116, respectively. The shaft portion 211 is provided at opposite lateral ends thereof with a pair of facing flat surfaces 211a, respectively, and at upper and lower ends thereof with a pair of facing curved surfaces 211b, respectively. The hinge shaft 210 also has a stepped portion at a connection between the cam 212 and shaft portion 211. The stepped portion has an annular surface 213. The flat surfaces 211a of the shaft portion 211 vertically face each other whereas the curved surfaces 211b of the shaft portion 211 horizontally face each other.

The hinge spring 40 is arranged between the hinge shaft 210 and hinge housing 10c in such a fashion that it is fitted around the shaft portion 211 of the hinge shaft 210. In a state in which the hinge shaft 210 is assembled in the hinge housing 10, the hinge spring 40 is in contact with the annular surface 205 of the hinge shaft 210 at one end thereof and with the partially opened end wall 111 (namely, the C-shaped surface) of the hinge housing 10c. The hinge spring 40 conducts a compression or expansion movement with respect to the shaft portion 211 of the hinge shaft 210.

To assemble the hinge module, spring 40 is positioned about shaft portion 211 and compressed to allow flat surfaces 211a to be aligned with and slid between space 111. Once shaft 210 is aligned with hole 111a. Valley 212b of cam 212 is positioned about mountain-shaped portion 116. Shaft 218 is rotated to the position illustrated with side surfaces 211b perpendicular. Thus, shaft 210 cannot move upwardly out of hole 111a. Compression on spring 40 is released to allow spring 110 to bias shaft 211 and thus cam 212 against mountain-shaped portion 116.

As mentioned above, the hinge mechanism of the present invention includes two hinge modules which are assembled in the receiving portion provided at the lower end of the upper casing frame 1001. Although FIG. 16 illustrates the case in which the hinge modules are symmetrically mounted, those hinge modules may be mounted in an asymmetric manner. Furthermore, it is possible to mount only one hinge module. Such different configurations of the hinge mechanism result in only a variation in the opening and closing angle range of the flip cover 2000. Those different configurations of the hinge mechanism will be described in detail, in conjunction with FIGS. 20 to 22.

Figure 18:
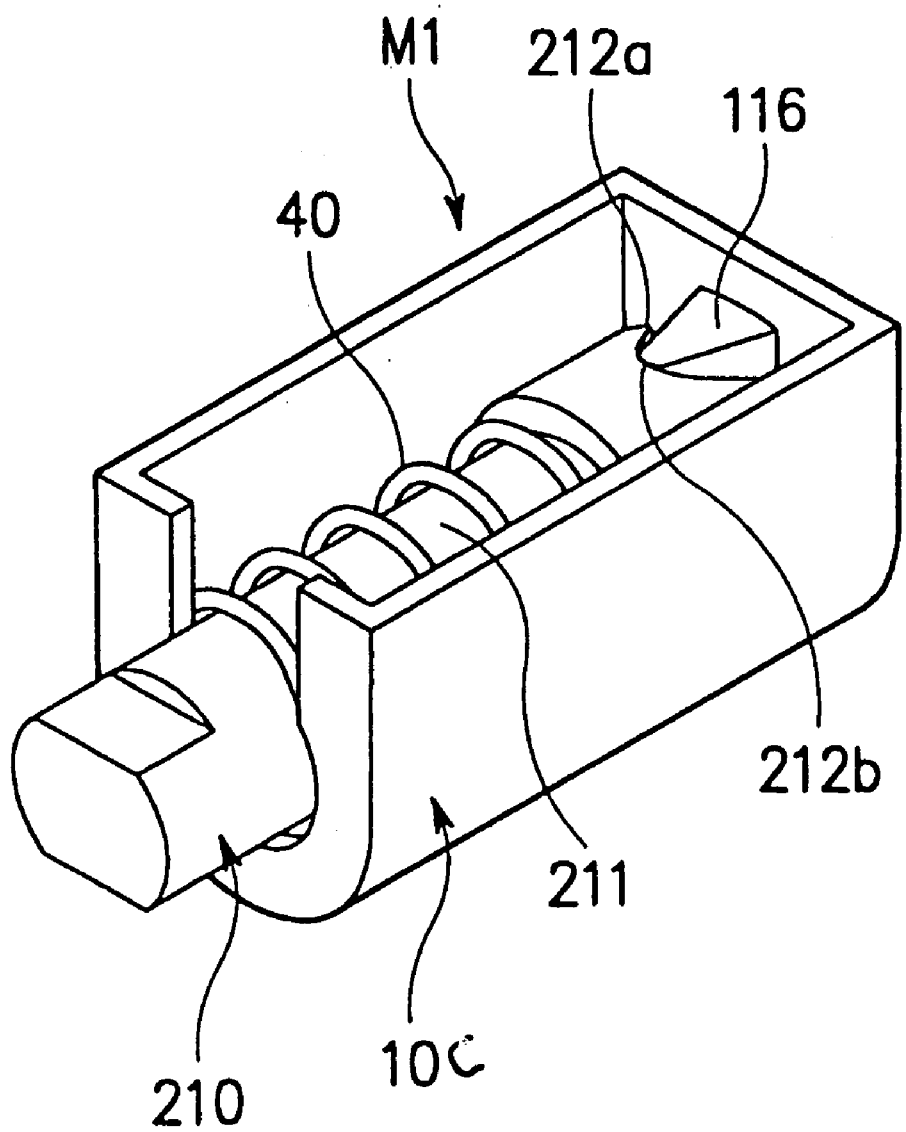
FIG. 18 is a perspective view illustrating one hinge module according to the fourth embodiment of the present invention in an assembled state.
Figure 19:
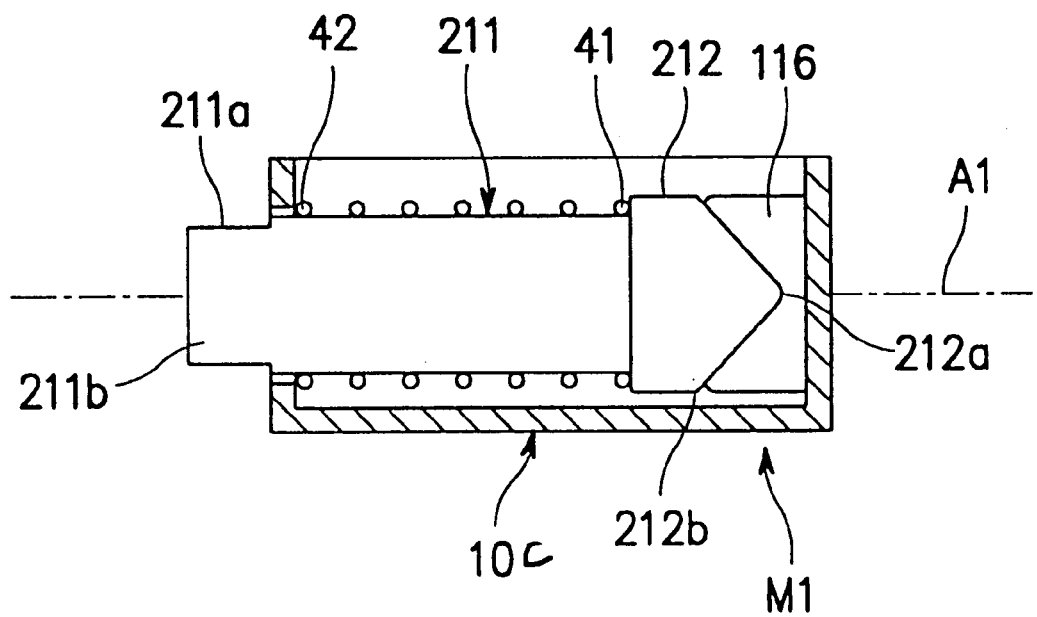
FIG. 19 is a cross-sectional view illustrating the assembled hinge module of FIG. 18.

FIGS. 18 and 19 illustrate the state in which the hinge shaft 210 and hinge spring 40 are assembled in the hinge housing 10c. As shown in FIGS. 18 and 19, the mountain-shaped protrusion 116 of the hinge housing 10c is in a state engaged with the valley-shaped portion 212b of the hinge shaft 210. The hinge spring 40 is in a state in which it is fitted around the shaft portion 211 of the hinge shaft 210 while being supported by the hinge housing 10c and shaft portion 211 at both ends thereof, respectively. The free end of the hinge shaft 210 is protruded outwardly from the hinge housing 10c.

Figure 20:
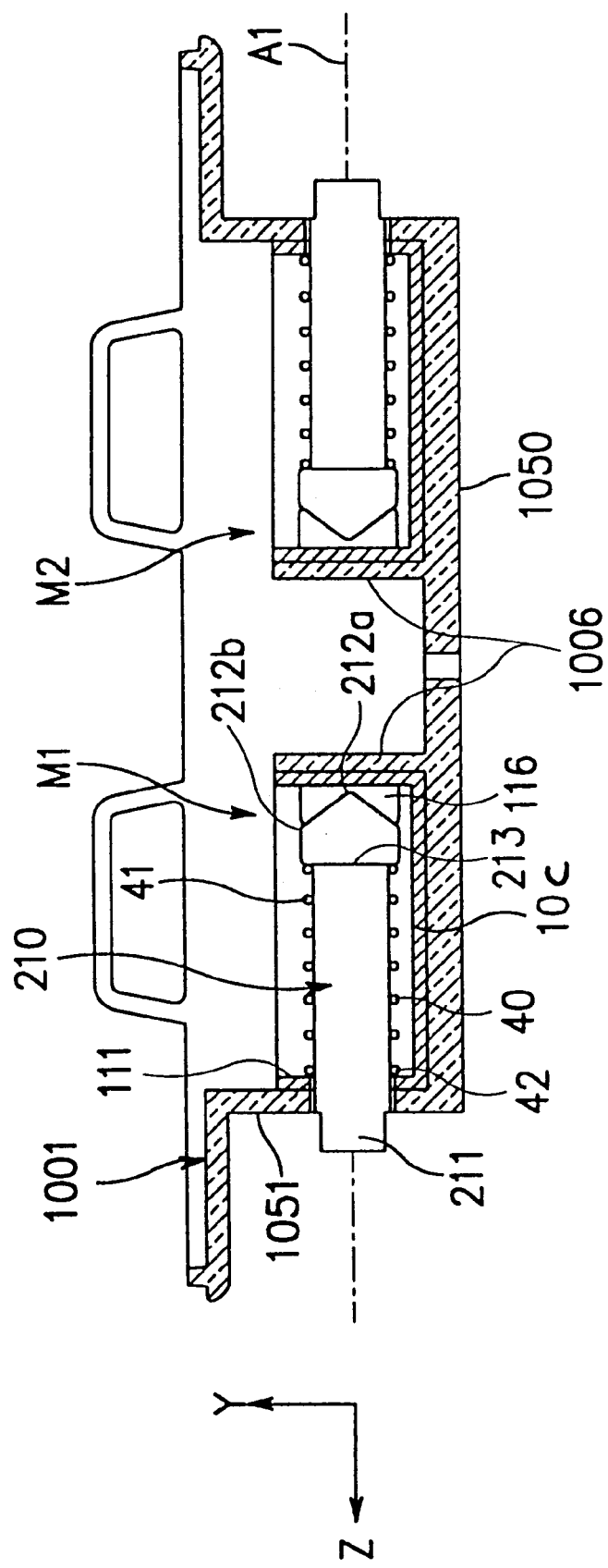
FIG 20 is a cross-sectional view taken along the line X—X of FIG. 16, illustrating a state in which two hinge modules are mounted in a symmetrical manner in the receiving portion of the phone body.

FIG. 20 is a cross-sectional view taken along the line X—X of FIG. 16, illustrating two hinge modules, having the configuration according to the fourth embodiment of the present invention, symmetrically mounted in the receiving portion of the phone body 1000. As with prior embodiments, it is possible to change the opening and closing angle range of the flip cover by appropriately selecting a desired one of the various hinge module mounting methods. That is, the opening and closing angle range of the flip cover is varied by varying the engaging position of the hinge shaft 211 with respect to the hinge protrusion 116 in each hinge module.

In addition, the opening and closing angle range of the flip cover can be varied by varying the angle defined between the cam surfaces of the mountain-shaped protrusion 116 formed at the hinge housing 10c or the angle defined between the cam surfaces provided at the mountain-shaped portion 212a of the hinge shaft 210.

In the case of FIG. 20, the hinge modules M1 and M2 are mounted in a symmetrical manner in the hinge arm 1050 included in the phone body 1000. Where the hinge modules M1 and M2 of the present invention are mounted in the receiving portion of the upper casing frame 1001 in such a fashion that they are symmetric to each other in the rotating axis direction A1, as shown in FIG. 20, the hinge housing 10c, hinge shaft 210, and hinge spring 40 of each hinge module are arranged in this order in the rotating axis direction A1 while being symmetric to those of the other hinge module.

The mountain-shaped protrusion 116 of the hinge housing 10c is engaged with the valley-shaped portion 212b of the cam 212. One end 41 of the hinge spring 40 is in contact with the annular surface 213 of the hinge shaft 210 whereas the other end 42 of the hinge spring 40 is in contact with the partially opened end wall 111 of the hinge housing 10c. The hinge spring 40 is maintained in a maximum expansion state when the portable phone is in an on-hook or off-hook state. The free end of the shaft portion 211 is exposed outwardly from the associated end 1051 of the hinge arm 1050. As mentioned above, the mountain-shaped portion 116 of the hinge housing 10c extends vertically in such a fashion that its cam surfaces face each other in the horizontal direction. The valley-shaped portion 212b of the cam 212 also extends vertically. That is, the cam surfaces of the mountain-shaped portions 212a of the cam 212 face each other in the horizontal direction.

During opening and closing operations of the flip cover, the mountain-shaped portions 212a and valley-shaped portion 212b of the cam 212 conduct a slide movement on the mountain-shaped protrusion 116 of the hinge housing 10c. When the apexes of the mountain-shaped portions 212a of the cam 212 come into contact with the apex of the mountain-shaped protrusion 116 of the hinge housing 10c, the hinge spring 40 is rendered to be in a maximum compression state.

Figure 21:
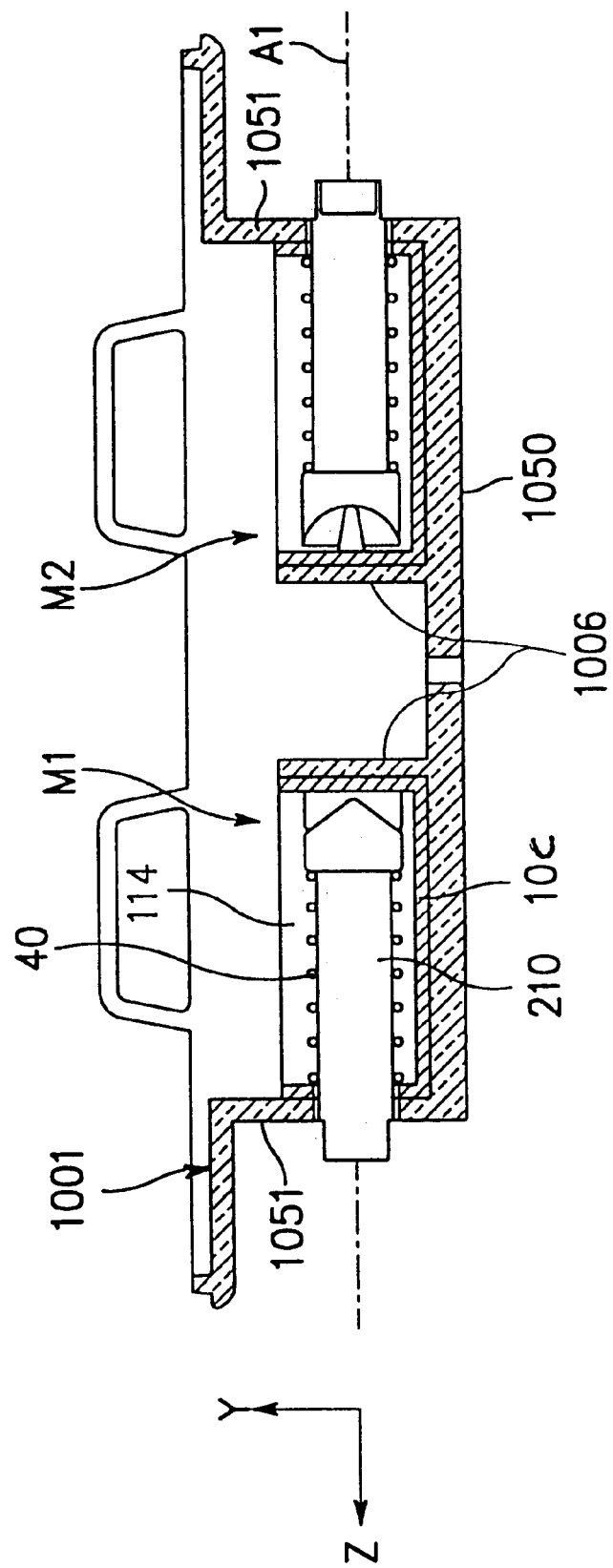
FIG. 21 is a cross-sectional view similar to FIG. 20, illustrating a state in which two hinge modules are mounted in an asymmetrical manner in the receiving portion of the phone body.

FIG. 21 is a cross-sectional view illustrating the state in which two hinge modules having the configuration according to the fourth embodiment of the present invention are asymmetrically mounted in the receiving portion of the phone body 1000. In the case of FIG. 21, the hinge modules M1 and M2 are mounted in an asymmetrical manner in the receiving portion of the hinge arm 1050 included in the phone body. As shown in FIG. 21, the hinge module M1 is mounted in such a fashion that it is directed in an upward direction whereas the hinge module M2 is mounted in such a fashion that it is directed in an inward direction of the phone body.

In the hinge module M1, accordingly, the mountain-shaped portions 212a of the hinge shaft 210 are arranged in such a fashion that their cam surfaces face each other in the horizontal direction, and the mountain-shaped protrusion 116 of the hinge housing 10c extends vertically in such a fashion that its cam surfaces are horizontally opposite to each other. On the other hand, in the hinge module M2, the mountain-shaped portions 212a of the hinge shaft 210 are arranged in such a fashion that its cam surfaces face each other in the vertical direction, and the mountain-shaped protrusion 116 of the hinge housing 10c extends horizontally in such a fashion that its cam surfaces are vertically opposite to each other.

Also, the shaft portions 211 of the hinge modules M1 and M2, which are exposed outwardly from opposite ends 1051 of the hinge arm 1050, respectively, are arranged in such a fashion that they are asymmetric to each other.

Thus, the hinge modules M1 and M2, which have the same configuration, are mounted to the upper casing frame 1001 of the phone body in such a fashion that they are asymmetric to each other. In this case, accordingly, only the opening and closing angle range of the flip cover is changed from that of the case shown in FIG. 20.

As shown in FIG. 20 or 21, the hinge modules M1 and M2 may be mounted in the receiving portion provided at the hinge arm 1050 of the phone body 1000 in a symmetric or asymmetric manner. Alternatively, only one hinge module M1 may be mounted in the receiving portion of the hinge arm 1050.

Figure 22:
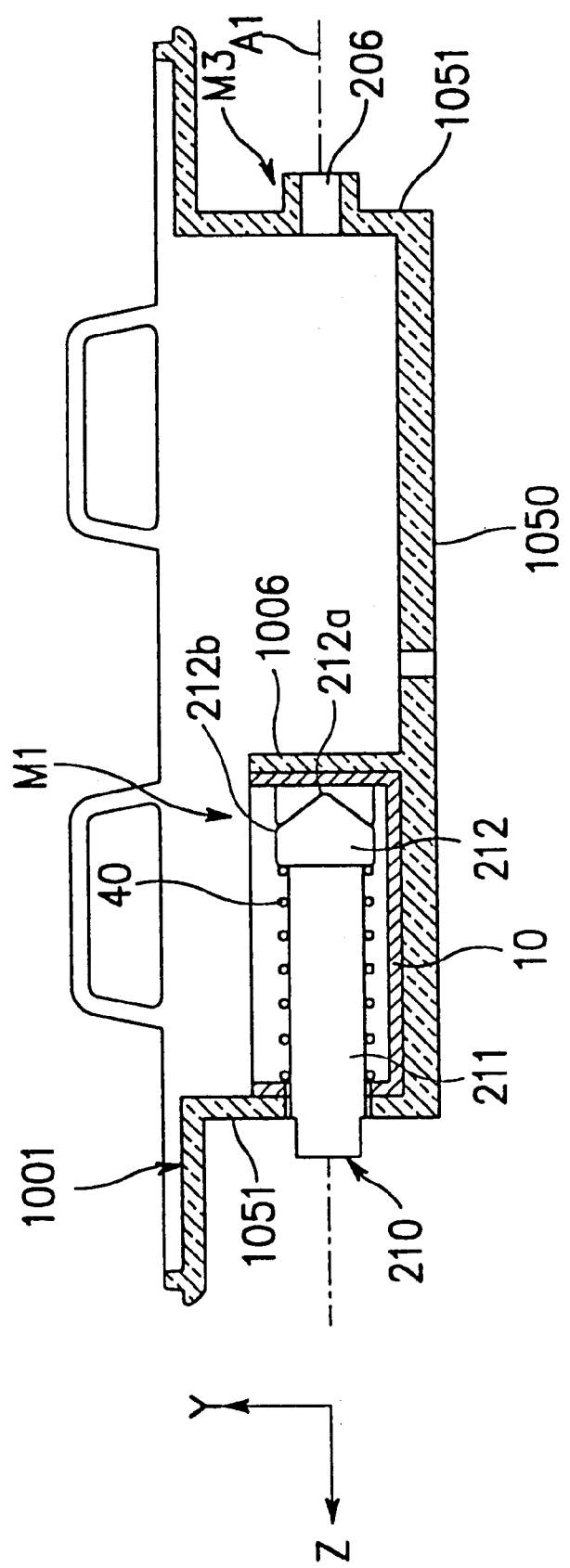
FIG. 22 is a cross-sectional view similar to FIG. 20 illustrating an alternate embodiment in which only one hinge module is mounted in the receiving portion of the phone body.

FIG. 22 is a cross-sectional view illustrating the state in which only one hinge module having the configuration according to the fourth embodiment of the present invention is mounted in the receiving portion of the phone body 1000. In the case of FIG. 22, only one hinge module is mounted in the receiving portion of the hinge arm 1050 provided at the upper casing frame 1001.

As shown in FIG. 22, only one hinge module, namely, the hinge module M1, is mounted in the left part of the receiving portion of the upper casing frame 1001. In the right part of the receiving portion of the upper casing frame 1001, a hinge dummy M3 is mounted in such a fashion that it is integral with the receiving portion. The hinge dummy M3 extends in the rotating axis direction.

The hinge dummy M3 has an axially extending hole 206 adapted to increase the rigidity of the hinge dummy M3. In this case, the space utilization of the phone body can be maximized because the other hinge module M2 is dispensed with. The hinge dummy M3 only serves to axially support the flip cover. That is, the hinge dummy M3 has no influence on the opening and closing angle range of the flip cover.

Figure 23:
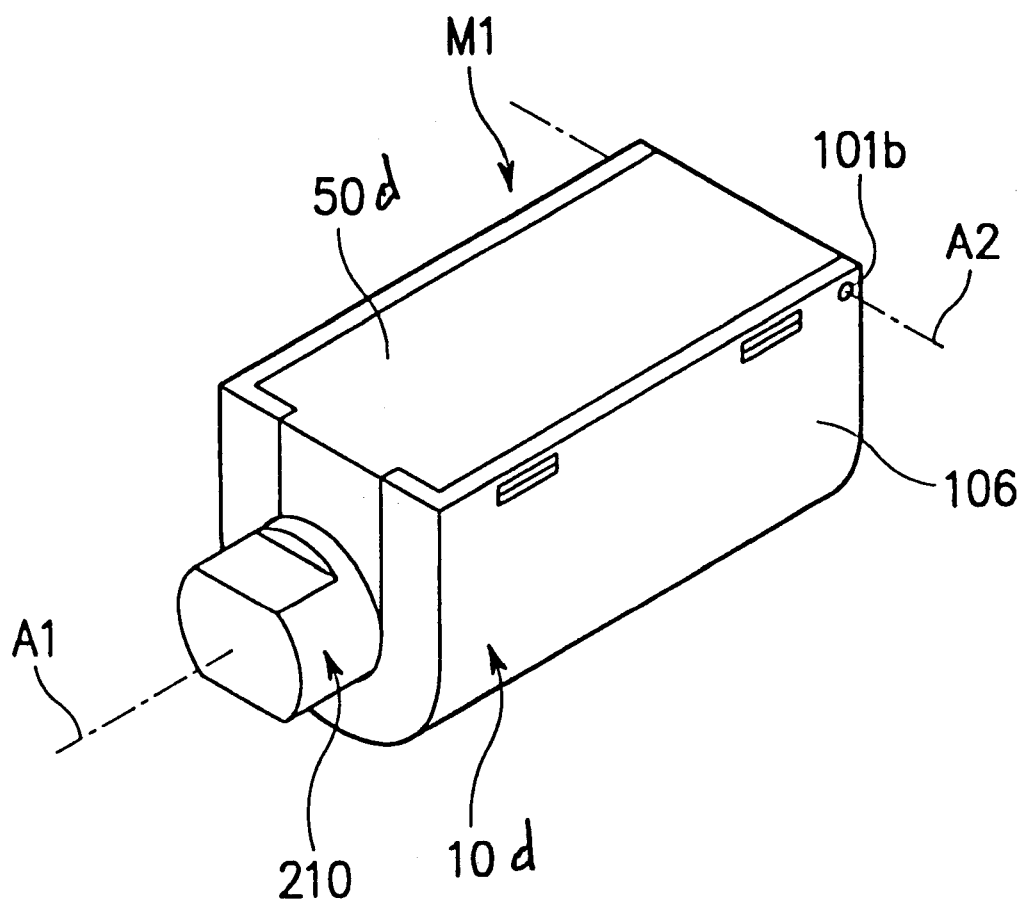
FIG. 23 is a perspective view illustrating an assembled state of a hinge module having a configuration according to a fifth embodiment of the present invention.
Figure 24:
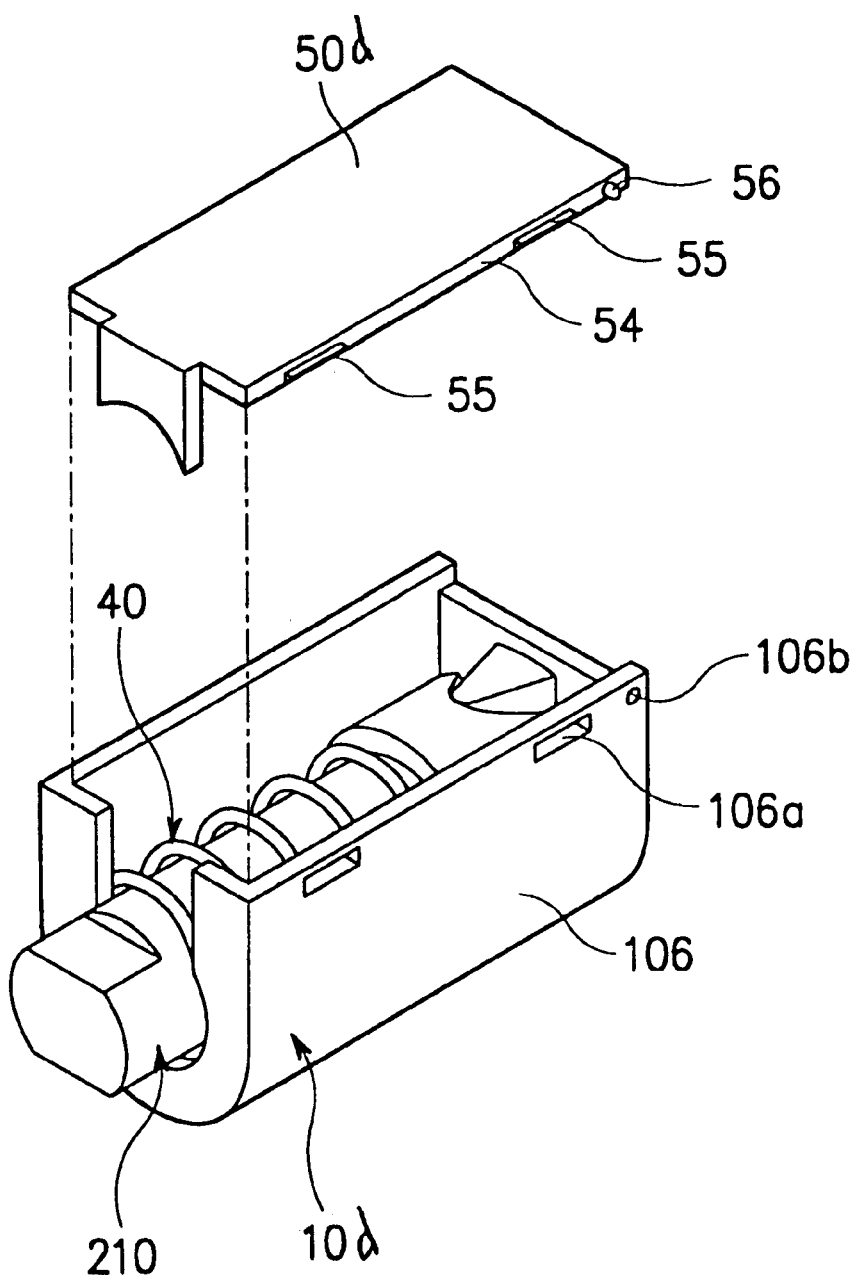
FIG. 24 is a perspective view illustrating the hinge module according to the fifth embodiment of the present invention in which the hinge cover is separated from the hinge housing.

FIG. 23 is a perspective view illustrating an assembled hinge module having a configuration according to a fifth embodiment of the present invention. FIG. 24 is a perspective view illustrating the hinge module according to the fifth embodiment of the present invention in which the hinge cover is separated from the hinge housing.

As shown in FIGS. 23 and 24, the hinge module includes a hinge housing 10d, a hinge shaft 210 arranged in the interior of the hinge housing 10d, a hinge spring 40 (FIG. 24) fitted around the hinge shaft 210 in the hinge housing 10d, and a hinge cover 50d coupled to the hinge housing 10d to provide an improvement in the efficiency of the assembling process.

The hinge module configuration according to the fifth embodiment of the present invention is similar or identical to that according to the fourth embodiment, except for the configurations of the hinge housing 10d and hinge cover 50d. Accordingly, the hinge module configuration according to the fifth embodiment of the present invention will be described only in association with the configurations of the hinge housing 10d and hinge cover 50d while referring to FIGS. 23 and 24.

The hinge housing 10d has opposite side walls 106 each provided with at least one hole 106a at a desired position.

The hinge cover 50d has opposite side surfaces 401 each provided with at least one engagement protrusion 55 adapted to engage with an associated one of the holes 106a. A hinge means is provided in order to hingably couple the hinge cover 50d to the hinge housing 10d. The hinge means comprises a pair of hinge protrusions 56 respectively provided at opposite side surfaces of the hinge cover 50d and a pair of hinge holes 106b respectively provided at opposite side walls 106 of the hinge housing 10d. By the hinge means, the hinge cover 50d can move hingably with respect to the hinge housing 10d. Since the hinge cover 50d is hingably coupled to the hinge housing 10d, an improvement in the efficiency of the assembly process is achieved. An improvement in ease of production is also obtained.

Figure 25:
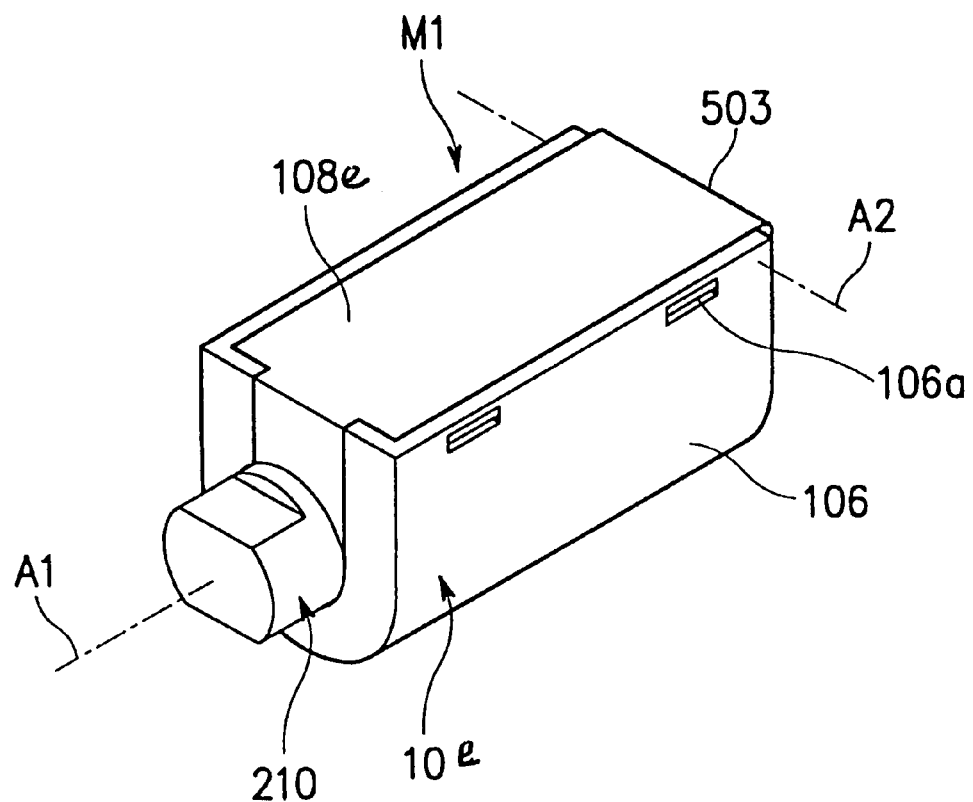
FIG. 25 is a perspective view illustrating an assembled state of a hinge module having a configuration according to a sixth embodiment of the present invention.
Figure 26:
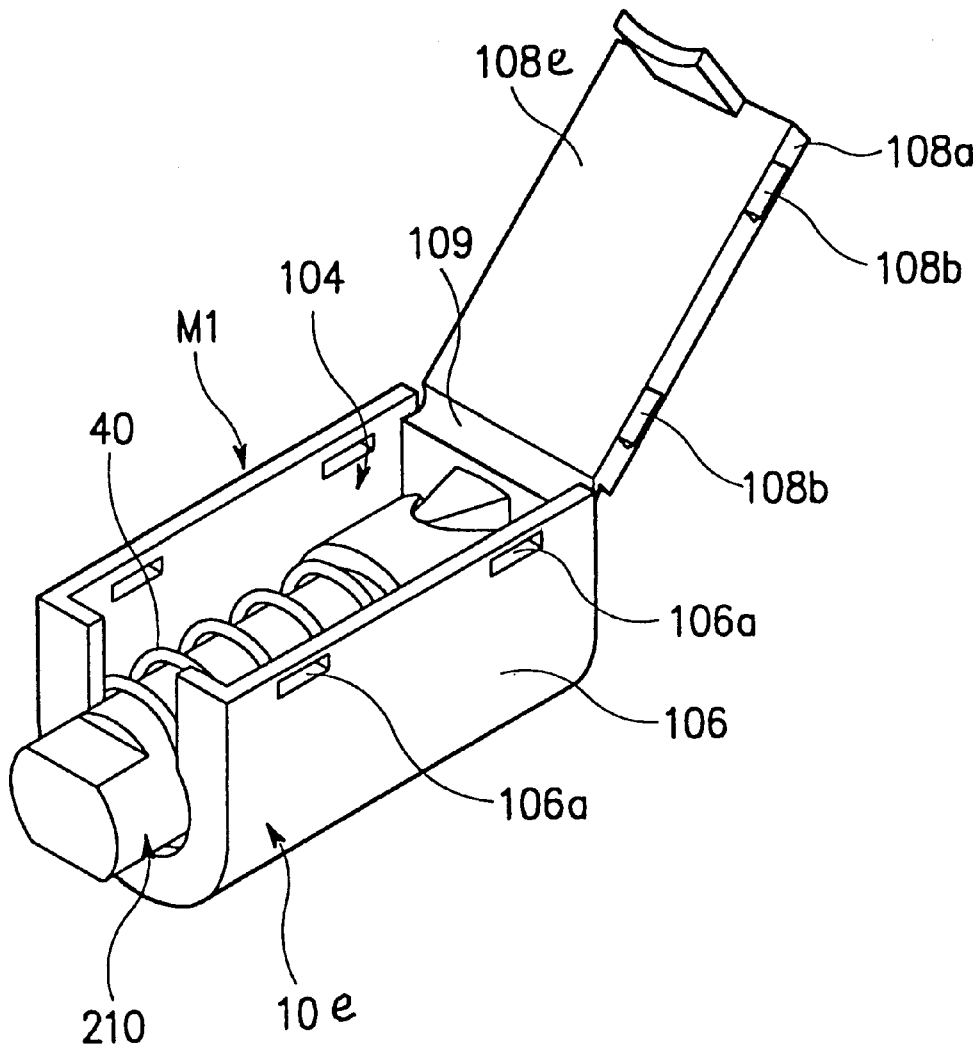
FIG. 26 is a perspective view illustrating the hinge module according to the sixth embodiment of the present invention in which the hinge cover is opened away from the hinge hosing.

FIG. 25 is a perspective view illustrating an assembled hinge module having a configuration according to a sixth embodiment of the present invention. FIG. 26 is a perspective view illustrating the hinge module according to the sixth embodiment of the present invention in which the hinge cover is separated from the hinge housing.

As shown in FIGS. 25 and 26, the hinge module includes a hinge housing 10e, a hinge shaft 210 arranged in the interior of the hinge housing 10e, a hinge spring 40 (FIG. 26) fitted around the hinge shaft 210 in the hinge housing 10e, and a hinge cover 108e integrally molded with the hinge housing 10e to provide an improvement in the efficiency of the assembling process. The hinge module configuration according to the sixth embodiment of the present invention is similar or identical to that according to the fifth embodiment, except for the configurations of the hinge housing 10e and hinge cover 108e. Accordingly, the hinge module configuration according to the sixth embodiment of the present invention will be described only in association with the configurations of the hinge housing 10e and hinge cover 108e while referring to FIGS. 25 and 26.

The hinge housing 10e has opposite side walls 106 each provided with at least one hole 106a at a desired position. The hinge cover 108e has opposite side surfaces 108a each provided with at least one engagement protrusion 108b adapted to engage with an associated one of the holes 106a. The holes 106a and engagement protrusions 108b provide a means for keeping the hinge cover 108e in a state closing the opening 104 of the hinge housing 10e.

The hinge cover 108e is coupled to the hinge housing 10e by a connecting member 109 in such a fashion that it is integral with the hinge housing 10e. The hinge cover 108e is hingable with respect to the hinge housing 10e by the connecting member 109. The connecting member 109 is made of a flexible material while having a structure having a small thickness so that it serves as a hinge member for the hinge cover 108e. The flexible material of the hinge member 109 may be a plastic material having an appropriate tensile strength. A thin structure made of such a plastic material and integrally formed with the housing 10e and cover 108e may be used for the hinge member 109. Since the hinge cover 108e is hingably coupled to the hinge housing 10e by means of the hinge member 109, improvements in the efficiency and productivity of the assembly process is achieved.

Although the present invention has been described as being applied to flip type portable phones, it may be equivalently applied to compact terminals or other electronic appliances. Also, the present invention may be applied to folder type portable phones.

Figure 27:
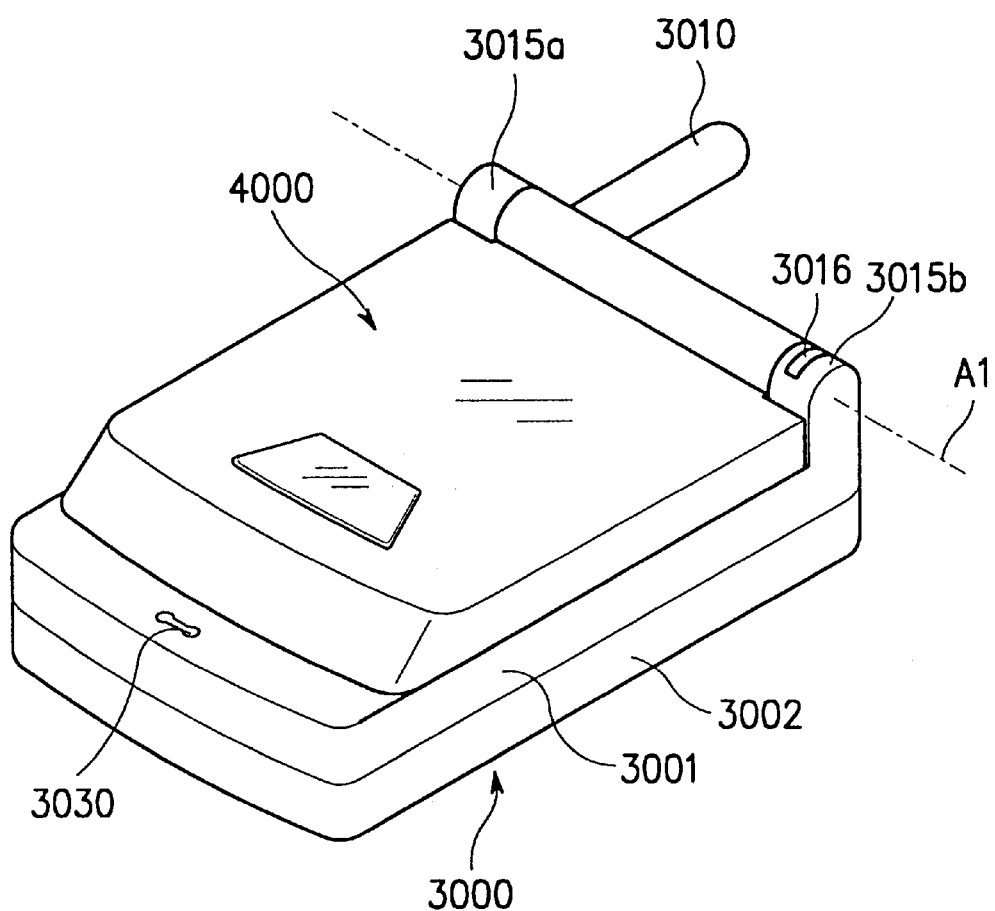
FIG. 27 is a perspective view illustrating a folder type portable phone, in an on-hook state, and equipped with a hinge mechanism having a configuration according to a seventh embodiment of the present invention.
Figure 28:
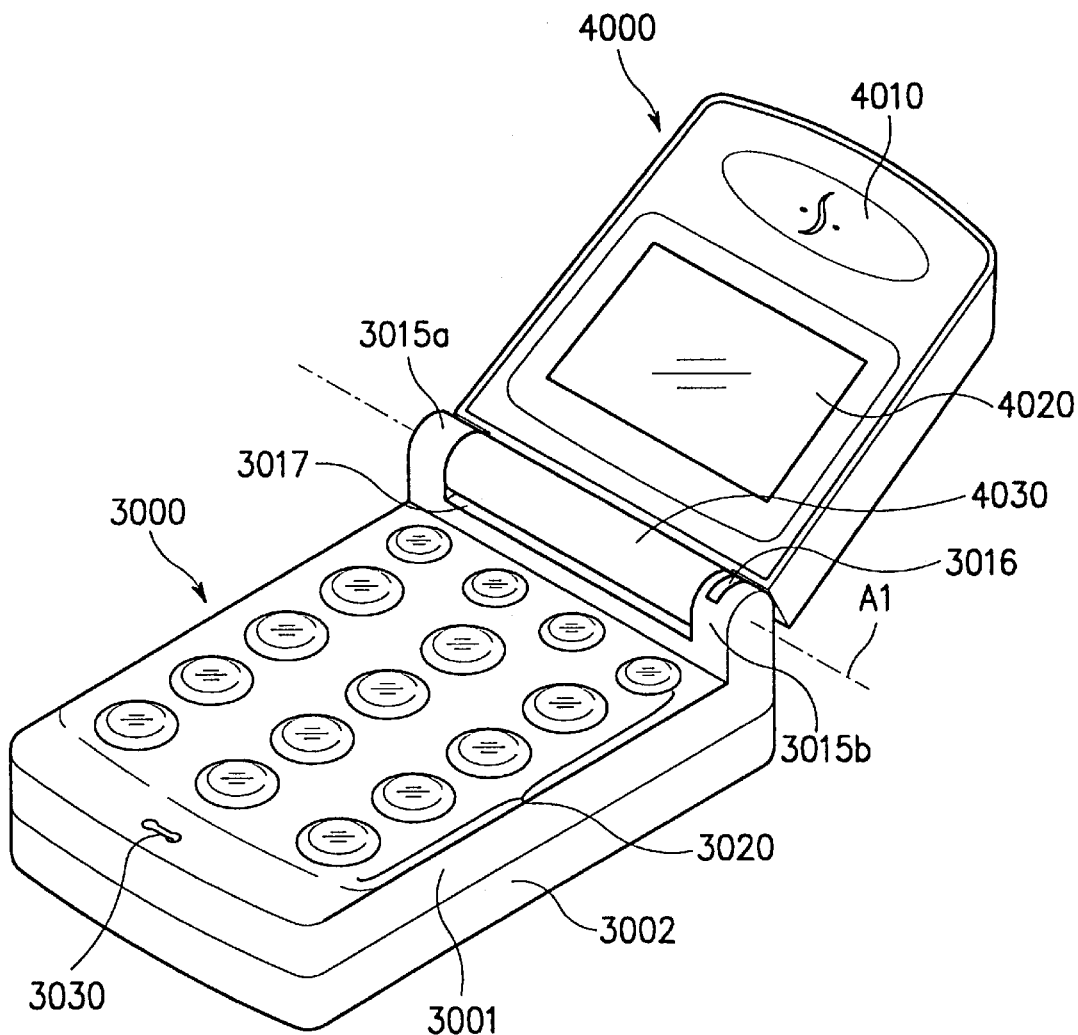
FIG. 28 is a perspective view illustrating the folder type portable phone of FIG. 28 in an off-hook state and equipped with the hinge mechanism according to the seventh embodiment of the present invention.

FIGS. 27 and 28 illustrate a folder type portable phone equipped with a hinge mechanism having a configuration according to a seventh embodiment of the present invention.

FIG. 27 is a perspective view illustrating an on-hook state of the folder type portable phone whereas FIG. 28 is a perspective view illustrating an off-hook state of the portable phone. Hereinafter, the present invention will be described in conjunction with such a folder type portable phone.

In such a folder type portable phone, the off-hook state corresponds to a state in which a conversation is enabled. The on-hook state corresponds to a state in which no conversation is enabled. That is, the off-hook state of the portable phone corresponds to a conversation mode whereas the on-hook state of the portable phone corresponds to a call waiting mode.

As shown in FIGS. 27 and 28, the folder type portable phone includes a phone body 3000, a folder 4000, and a hinge mechanism (shown in FIG. 29) configured to mechanically couple the folder 4000 to the phone body 3000.

The phone body 3000 includes an upper casing frame 3001 and a lower casing frame 3002. An antenna unit 3010 (FIG. 27) is mounted to the upper end of the phone body 3000. Below the antenna unit 3010 as shown in FIG. 28, a key pad 3020 including a plurality of function keys and numeral keys is arranged on the phone body 3000. A microphone unit 3030 is installed in the phone body 3000 below the key pad 3020. A pair of side arms 3015a and 3015b are provided at the phone body 3000 between the antenna unit 3010 and key pad 3020. A slot 3017 is also provided at the phone body 3000 between the side arms 3015a and 3015b. A call lamp 3016 is arranged at one of the side arms, namely, the side arm 3015b.

The folder 4000, which is hingably coupled to the phone body 3000 by means of the hinge mechanism, is provided at the upper end thereof with an ear piece 4010 including a speaker. An LCD unit is arranged beneath the ear piece 4010. In FIG. 28, an LCD window 4020 is shown which is included in the LCD unit.

A central hinge arm 4030 is formed at the lower end of the folder 4000. The central hinge arm 4030 has a cylindrical shape and is arranged in the slot 3017. The hinge mechanism is installed in the central hinge arm 4030. Accordingly, the folder 4000 can carry out hingable movements (opening and closing movements) about a rotating axis A1 with respect to the body 3000.

Figure 29:
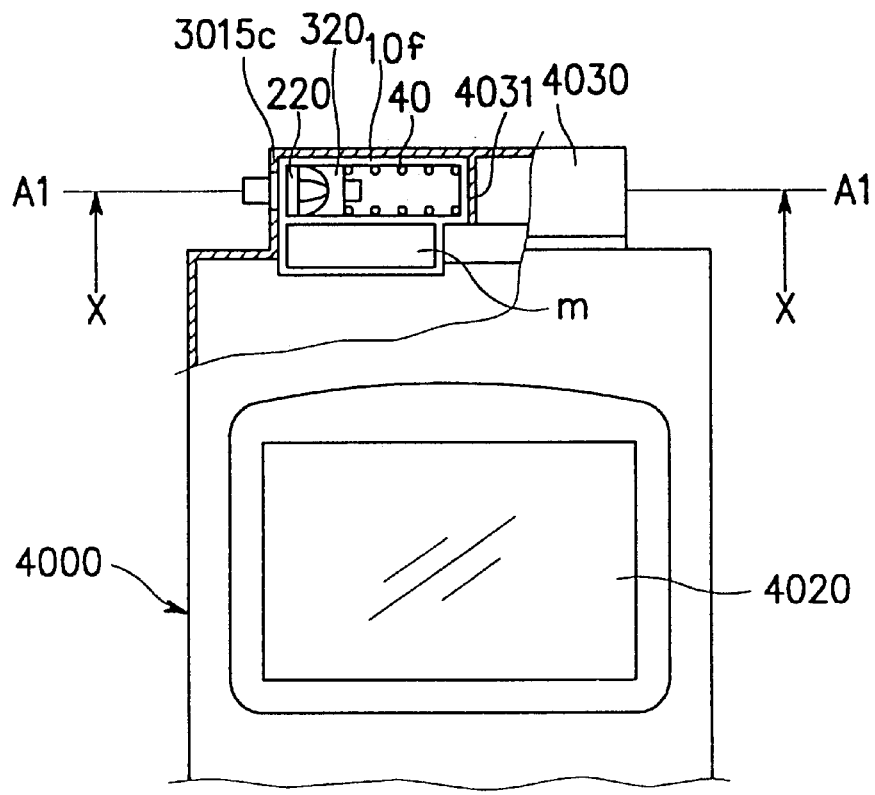
FIG. 29 is a partially broken plan view illustrating a folder mounted with the hinge mechanism according to the seventh embodiment of the present invention.
Figure 30:
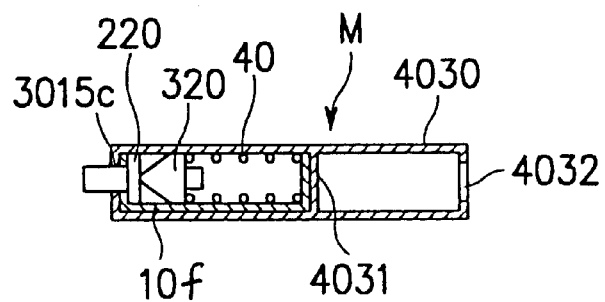
FIG. 30 is a cross-sectional view taken along the line X—X of FIG. 29.

Referring now to FIGS. 29 and 30, FIG. 29 is a partially broken plan view illustrating the folder mounted with the hinge mechanism according to the seventh embodiment of the present invention. FIG. 30 is a cross-sectional view taken along the line X—X of FIG. 29. The hinge mechanism according to the seventh embodiment of the present invention will now be described in conjunction with FIGS. 29 and 30.

This hinge mechanism includes only one hinge module. The hinge module is mounted within the central hinge arm 4030. The central hinge arm 4030, which has a cylindrical shape, is opened at opposite ends 3015c (FIG. 29) and 4032 thereof. (FIG. 30) The hinge module, which is denoted by the reference character M, is arranged in the interior of the central hinge arm 4030 at one side of the central hinge arm 4030. In order to fix the hinge module M in the hinge arm 4030, a partition wall 4031 is formed near the central portion of the hinge arm 4030. The portion of the hinge arm 4030 opposite to the portion, where the hinge module M is received, may provide a space for allowing a flexible printed circuit or wires extending from the speaker to pass therethrough. In the drawings, the flexible printed circuit and wires are not shown.

The hinge module M includes a hinge housing 10f. The hinge module M also includes a hinge shaft 220, a hinge cam 320, and a hinge spring 40 installed in the hinge housing 10f along the rotating axis A1 in this order. The hinge module M further includes a magnet m installed on the hinge housing 10f. The hinge housing 10f is provided with a means for mounting the magnet m.

Figure 31:
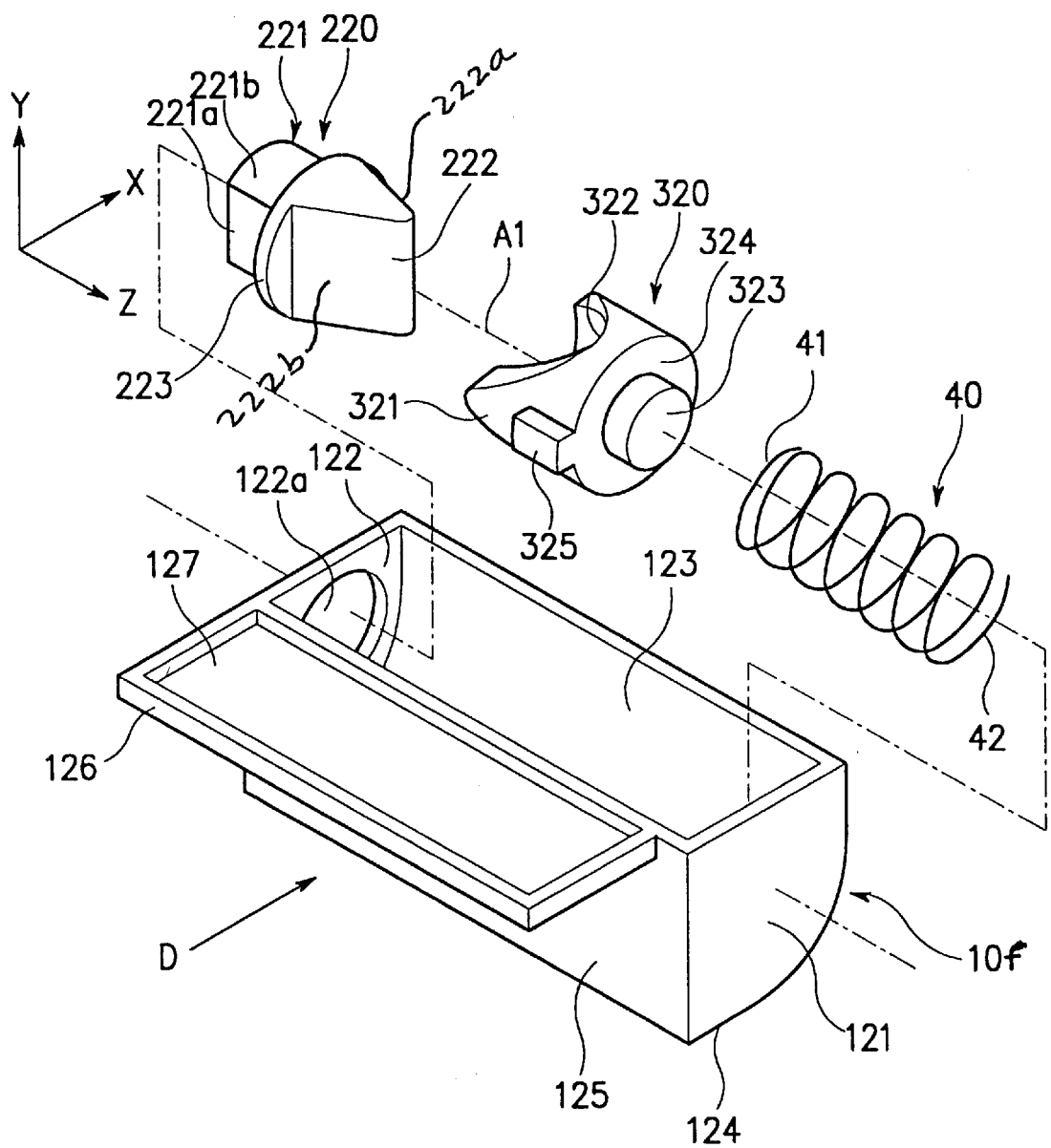
FIG. 31 an exploded perspective view illustrating the configuration of a hinge module according to the seventh embodiment of the present invention.

Detailed configurations of the constituting elements of the hinge module M will be described in conjunction with FIG. 31. For reference, it is noted that the X-axis direction in FIG. 31 corresponds to a horizontal direction, the Y-axis direction corresponds to a vertical direction, and the Z-axis direction corresponds to a rotating axis direction.

The hinge housing 10f is completely closed at one end thereof when viewed in the Z-axis direction by a lateral end wall 121 and is partially opened at the other end thereof by a lateral end wall 122. That is, a circular hole 122a is formed through the end wall 122 in order to allow a shaft portion 221 of the hinge shaft 220 to pass therethrough. The hinge housing 10f is also completely opened at its upper end and is completely closed at its lower end. That is, the hinge housing 10f has an opening 123 at its upper end, and a curved bottom wall 124 at its lower end. The hinge housing 10f also has a vertical wall 125 at one end thereof when viewed in the X-axis direction. An extension 126 extends horizontally from the upper end of the vertical wall 125. The extension 126 has a rectangular shape and is provided with a rectangular recess 107 at its upper surface. The vertical wall 125 also has a guide slot 128 (shown in FIG. 32) extending in the Z-axis direction (namely, the rotating axis direction).

As mentioned above, folder type portable phones typically comprise a phone body, a folder, and a hinge mechanism for mechanically coupling the folder to the phone body. Such a folder type portable phone also comprises a switching means for automatically switching the operation mode of the phone between a conversation mode and a call waiting mode in accordance with the opened or closed state of the folder. As well known, such a switching means comprises a magnet and a lead switch. Typically, the magnet is installed on the folder whereas the lead switch is installed on the main board arranged in the phone body.

In this regard, the recess 127 provides a space where the magnet m (shown in FIG. 29), which is a constituting element of the switching means, is installed.

The shaft portion 221 of the hinge shaft 220 is adapted to be coupled to an associated one of the side arms 3015a and 3015b of the phone body 3000. The hinge shaft 220 also has a mountain-shaped portion 222 adapted to carry out a sliding movement on the hinge cam 320. The shaft portion 221 has a means for engaging the shaft portion 221 with the side arm in order to prevent a rotation of the shaft portion 221 with respect to the side arm. The means comprises a pair of opposite flat surfaces 221a and a pair of opposite curved surfaces 221b. By virtue of this means, the shaft portion 221 cannot rotate with respect to, but rather rotates with, the side arm when coupled to the side arm.

The mountain-shaped portion 222 extends in the vertical direction while having a pair of horizontally opposite cam surfaces 222a, 222b. The hinge shaft 220 also has an annular stepped portion 223 at a connection between the shaft portion 221 and mountain-shaped portion 222. By virtue of the annular stepped portion 223, the hinge shaft 220 is prevented from being separated in the rotating axis direction from the hinge housing 10.

The hinge cam 320 has, at one longitudinal portion thereof, a pair of horizontally spaced mountain-shaped portions 321, and a valley-shaped portion 322 defined between the mountain-shaped portions 321. The valley-shaped portion 322 is defined by a pair of facing cam surfaces respectively provided at the mountain-shaped portions 321. The mountain-shaped portion 222 of the hinge shaft 220 is engaged with the valley-shaped portion 322 of the hinge cam 320 in such a fashion that the cam surfaces 222a and 222b of the hinge shaft 220 are in contact with the cam surfaces of the mountain-shaped portions 321, respectively. The hinge cam 320 is also provided at the other longitudinal portion thereof with a spring mounting protrusion 323 extending in the rotating axis direction. A guide protrusion 325 is protruded from a desired portion of the hinge cam 320. The guide protrusion 325 is received in the guide slot 128 (See FIG. 32) of the hinge housing 10f so that it guides a straight sliding movement of the hinge cam 320 in the rotating axis direction during the opening and closing operation of the folder. The hinge cam 320 also has an annular surface 324 formed around the spring mounting protrusion 323.

The hinge spring 40 is installed between the annular surface 223 of the hinge cam 320 and the completely closed end wall 121 of the hinge housing 10f. One end 41 of the hinge spring 40 is in contact with the annular surface 324 whereas the other end 42 of the hinge spring 40 is in contact with the completely closed end wall 121 of the hinge housing 10f. Accordingly, the spring force of the hinge spring 40 is applied to the hinge cam 320 in the rotating axis direction, so that the hinge cam 320 may slide reciprocally in the rotating axis direction.

That is, the hinge cam 320 carries out a reciprocal straight movement guided along the guide slot 128 in the hinge housing 10f during the opening and closing operation of the folder while rotating together with the folder. At this time, the hinge shaft 220 is maintained in a fixed state. During the reciprocal straight movement of the hinge cam 320, the hinge spring 40 is repeatedly compressed and expanded along the rotating axis A1.

When the apex of the mountain-shaped portion 222 of the hinge shaft 220 comes into contact with the apexes of the mountain-shaped portions 321 of the hinge cam 320 during the opening and closing operation of the folder, the hinge spring 40 is rendered to be in a maximum compression state. On the other hand, when the apex of the mountain-shaped portion 222 of the hinge shaft 220 comes into contact with the bottom of the valley-shaped portion 322 of the hinge cam 320, the hinge spring 40 is rendered to be in a maximum expansion state.

In a state in which the folder is completely closed, namely, completely folded, the mountain-shaped portion 222 of the hinge shaft 220 is completely engaged with the valley-shaped portion 322 of the hinge cam 320. Since the mountain-shaped portion 222 of the hinge shaft 220 is completely engaged with the valley-shaped portion 322 of the hinge cam 320 while being subjected to the spring force of the hinge spring 40 in this state, the folder is maintained at its completely closed state.

On the other hand, when the folder is hingably moved to be opened with respect to the phone body, the mountain-shaped portion 222 of the hinge shaft 220 is gradually separated from the valley-shaped portion 322 of the hinge cam 320 while sliding on the cam surfaces of the mountain-shaped portions 321 of the hinge cam 320. In accordance with a further movement of the folder, the mountain-shaped portion 222 of the hinge shaft 220 comes, at its apex, into contact with the apexes of the mountain-shaped portions 321 of the hinge cam 320 and then engages again with the valley-shaped portion 322 of the hinge cam 320. In this state, the folder is completely open. Since the mountain-shaped portion 222 of the hinge shaft 220 is urged by the spring force of the hinge spring 40, the folder is maintained at its completely opened state.

Specifically, the hinge housing 10f, hinge cam 320, and hinge spring 40 rotate along with the folder during the opening and closing operation of the folder. At this time, the hinge shaft 220 does not rotate because it is coupled to the associated side arm of the phone body.

Figure 32:
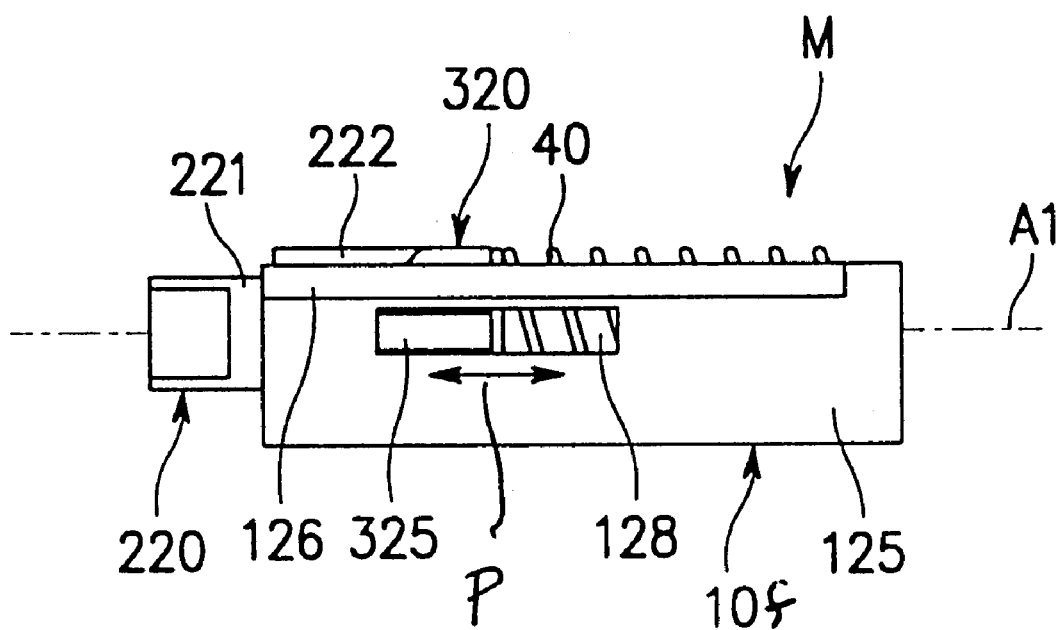
FIG. 32 is a front view taken in a direction indicated by the arrow D in FIG. 31.

Since the hinge shaft 220 is fixed to the side arm of the phone body, the hinge cam 320 carries out a reciprocal straight sliding movement in a direction indicated by the arrow P in FIG. 32 during the opening and closing operation of the folder. The reciprocal straight sliding movement of the hinge cam 320 is guided by the means comprising the longitudinally extending guide slot 128 formed at the vertical wall 125 of the hinge housing 10 and the guide protrusion 325 of the hinge cam 320.

Figure 33:
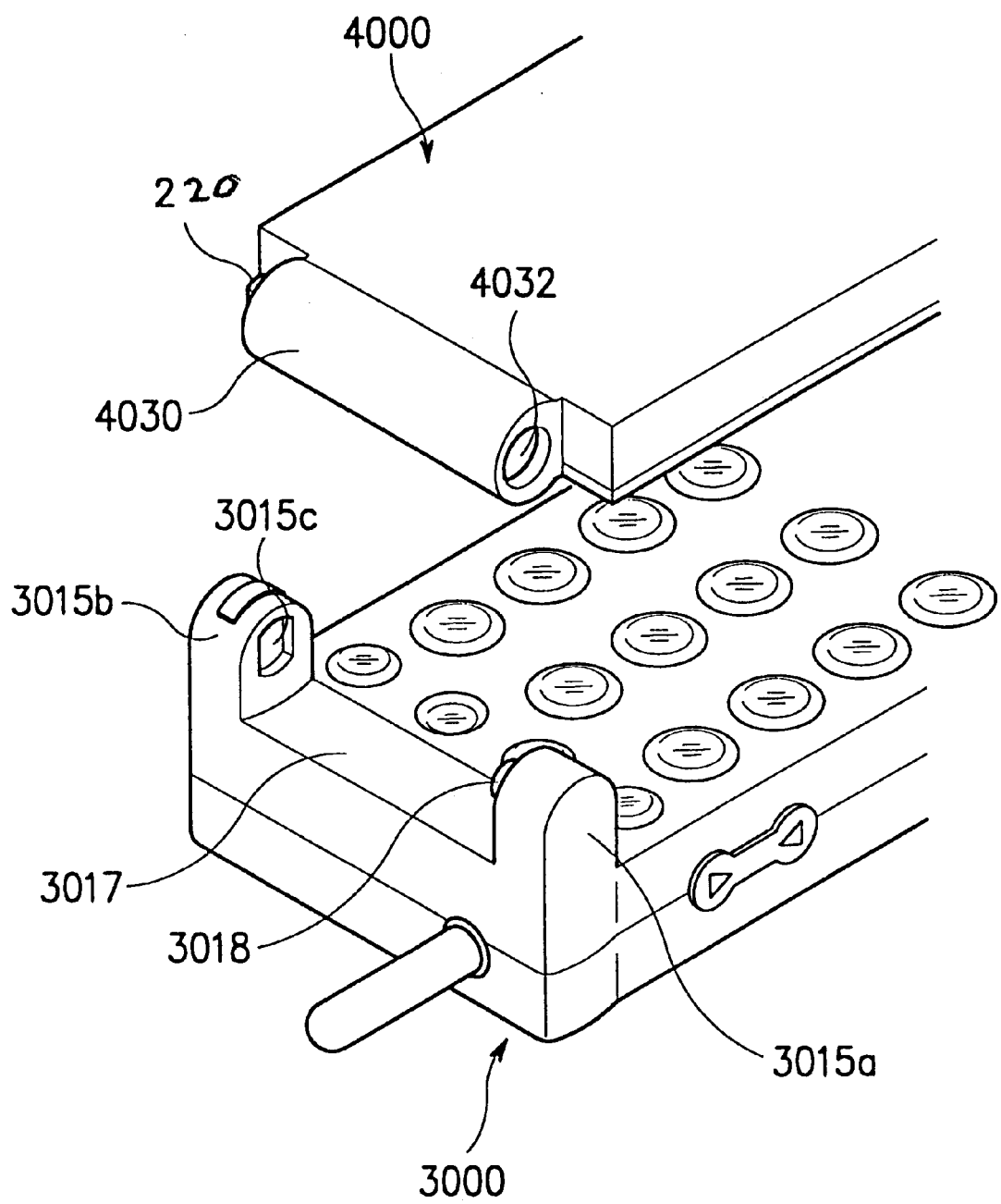
FIG. 33 is a perspective view illustrating a process for assembling a folder to the hinge mechanism according to the seventh embodiment of the present invention.
Figure 34:
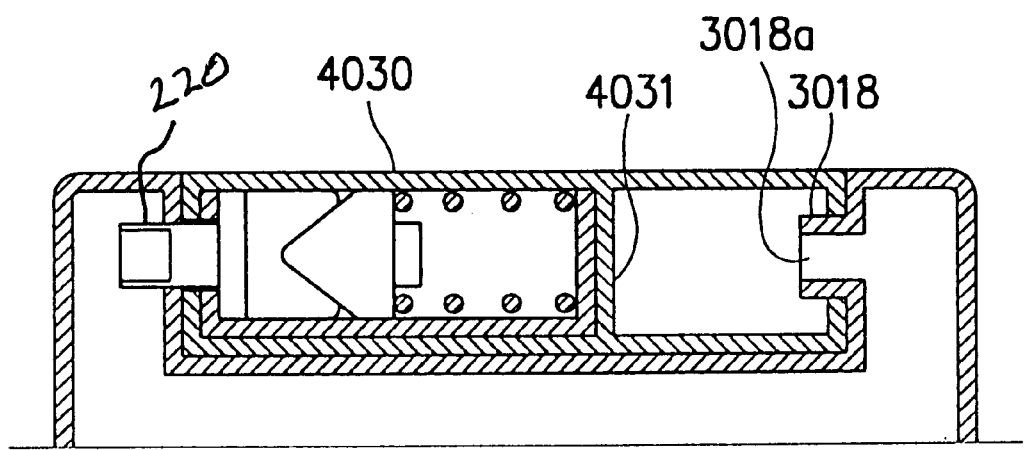
FIG. 34 is a cross-sectional view illustrating a state in which the folder is assembled with the hinge modules according to the seventh embodiment of the present invention.

In a state in which the hinge module M of the present invention is mounted to the central hinge arm 4030, the shaft portion 221 of the hinge shaft 220 is exposed outwardly from the central hinge arm 4030, as shown in FIGS. 33 and 34. The exposed shaft portion 221 is fitted in a mounting hole 3015c formed at the side arm 3015b so as to couple the hinge shaft of the folder (FIG. 33). A mounting hole 4032 is formed at the end of the central hinge arm 4030 opposite to the shaft portion 221 in order to receive a hinge dummy 3018 formed at the side arm 3015a.

The hinge dummy 3018 serves as the hinge shaft of the folder. The hinge dummy 3018 has a hollow construction having an axial hole 3018a in order to increase the rigidity of the hinge dummy 3018, as shown in FIG. 34. The wires extending from the speaker or the flexible printed circuit included in the LCD unit mounted in the folder may extend through the hole 3018a so that they are electrically connected to the main board (not shown) of the phone body.

Figure 35:
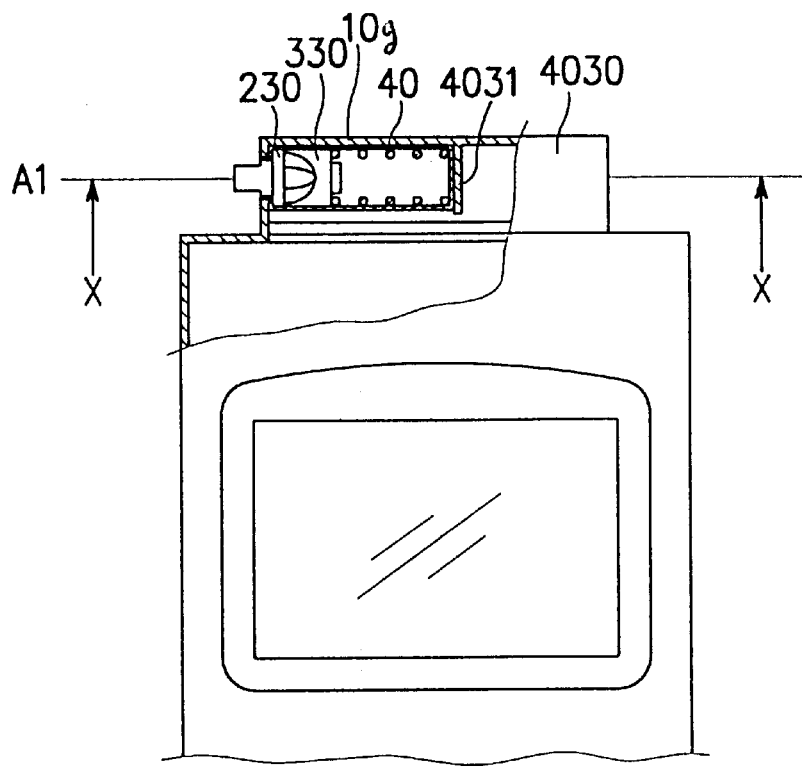
FIG. 35 is a partially broken plan view illustrating the folder mounted with a hinge mechanism according to an eighth embodiment of the present invention.
Figure 36:
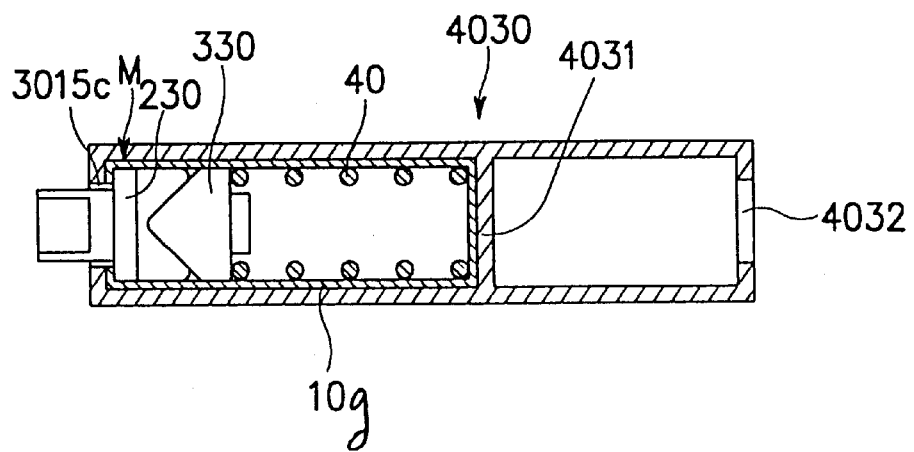
FIG. 36 is a cross-sectional view taken along the line X—X of FIG. 35.

FIG. 35 is a partially broken plan view illustrating the folder mounted with a hinge mechanism according to an eighth embodiment of the present invention. FIG. 36 is a cross-sectional view taken along the line X—X of FIG. 35. Now, the hinge mechanism according to the eighth embodiment of the present invention will be described in conjunction with FIGS. 35 and 36.

This hinge mechanism includes one hinge module. The hinge module is mounted to the central hinge arm 4030. The central hinge arm 4030, which has a cylindrical shape, is opened at opposite ends 3015c and 4032 thereof. The hinge module, which is denoted by the reference character M, is arranged in the interior of the central hinge arm 4030 at one side of the central hinge arm 4030. In order to fix the hinge module M in the hinge arm 4030, a partition wall 4031 is formed near the central portion of the hinge arm 4030. The portion of the hinge arm 4030, opposite to the portion where the hinge module M is received, may provide a space for allowing the flexible printed circuit or the wires of the speaker to pass therethrough. In the drawings, the flexible printed circuit and wires are not shown.

The hinge module M includes a hinge housing 10g. The hinge module M also includes a hinge shaft 230, a hinge cam 330, and a hinge spring 40 installed in the hinge housing 10g along the rotating axis A1 in this order.

Detailed configurations of the constituting elements of the hinge module M will be described in conjunction with FIGS. 37 to 39. For reference, it is noted that the X-axis direction in FIGS. 37 to 39 corresponds to a horizontal direction, the Y-axis direction corresponds to a vertical direction, and the Z-axis direction corresponds to a rotating axis direction.

The hinge housing 10g is partially opened at one end thereof when viewed in the direction of the rotating axis A1 by a lateral end wall 131 and is completely opened at the other end 132 thereof. A circular hole 131a is formed through the end wall 131 in order to allow a shaft portion 231 of the hinge shaft 230 to pass therethrough. The hinge housing 10g is also completely closed at its upper end by a top wall 133 and is partially opened at its lower end by a bottom wall 134.

An extension 135 extends longitudinally from the top wall 133 so that it closes the completely opened end 132 of the hinge housing 10g in a bent state. The bottom wall 134 has a guide slot 134a (shown in FIG. 39) extending in the rotating axis direction (namely, the Z-axis direction).

Figure 37:
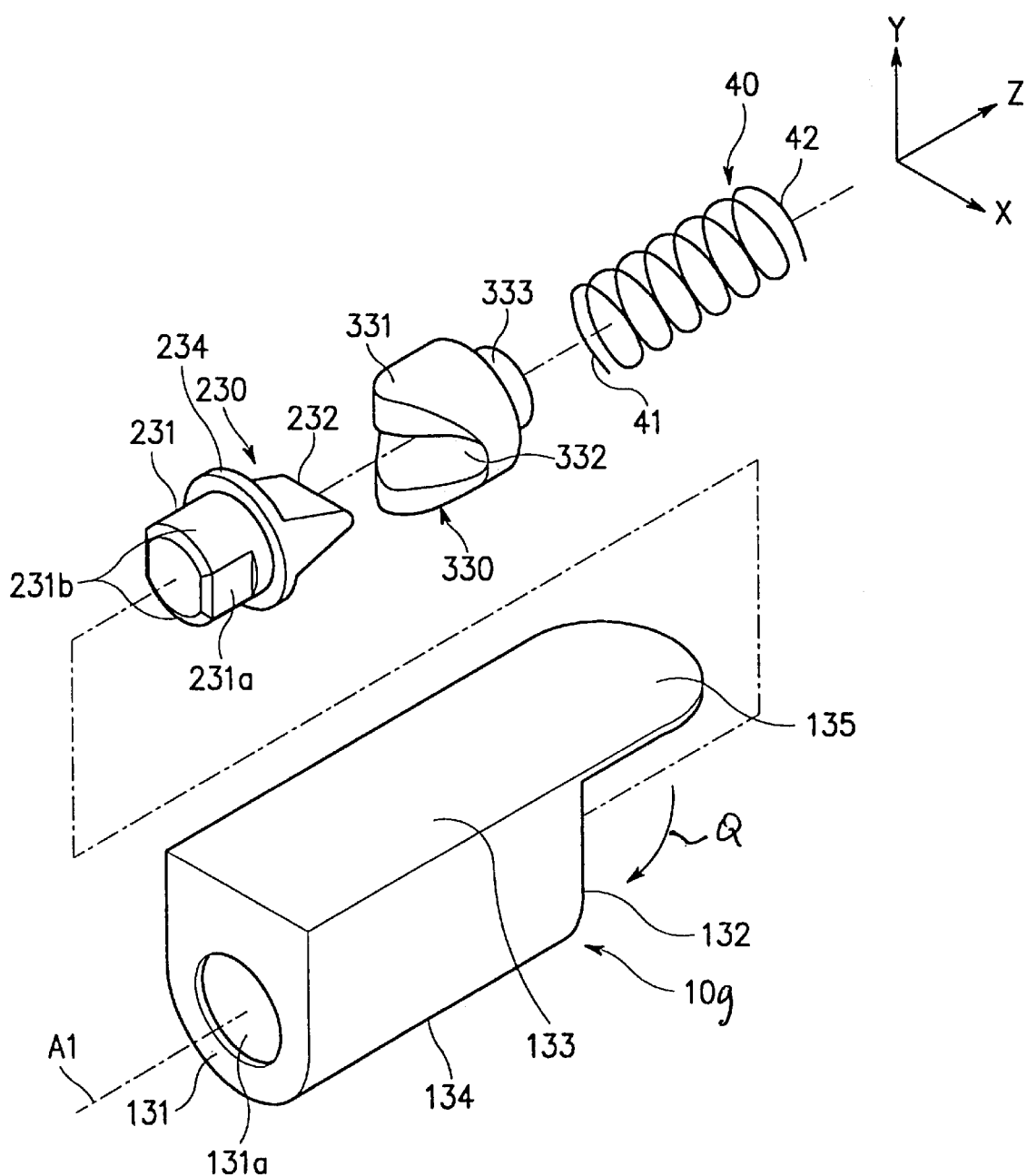
FIG. 37 is an exploded perspective view illustrating a hinge module having a configuration according to an eighth embodiment of the present invention.
Figure 38:
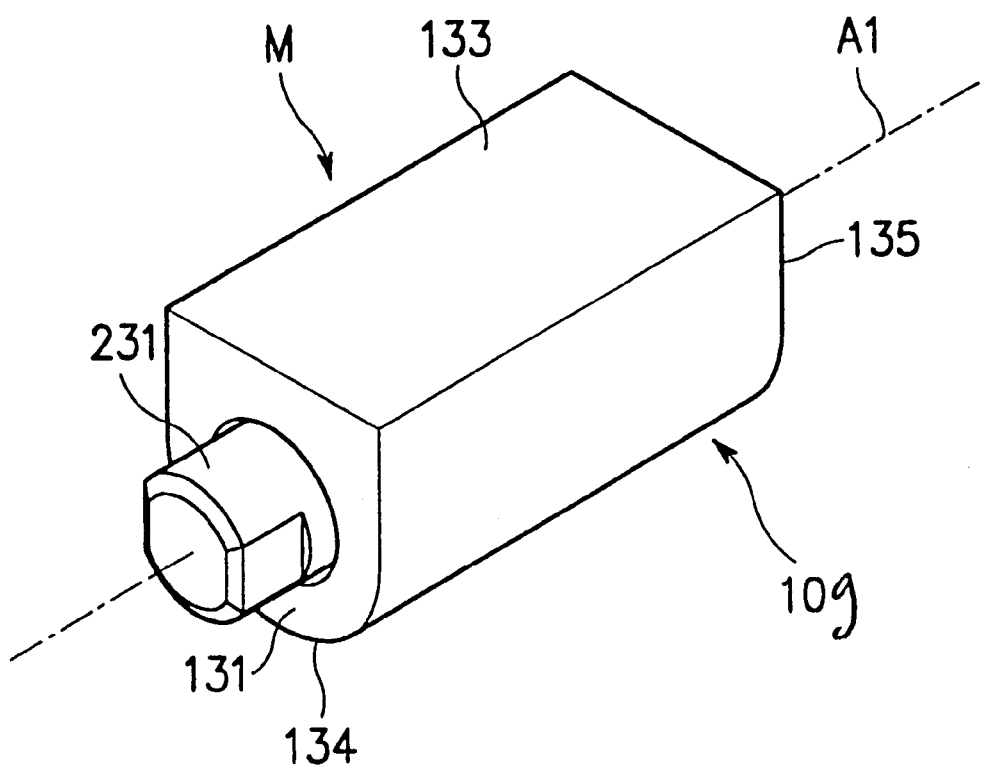
FIG. 38 is a perspective view illustrating an assembled state of the hinge module according to the eighth embodiment of the present invention.

Referring now to FIG. 37, the shaft portion 231 of the hinge shaft 230 is adapted to be coupled to an associated one of the side arms of the phone body. The hinge shaft 230 also has a mountain-shaped portion 232 adapted to carry out a sliding movement on the hinge cam 330. The shaft portion 231 has a means for engaging the shaft portion 231 with the side arm in order to prevent a rotation of the shaft portion 231 with respect to the side arm. The means comprises a pair of opposite flat surfaces 231a and a pair of opposite curved surfaces 231b. By virtue of this means, the shaft portion 231 cannot rotate with respect to the side arm in a state coupled to the side arm.

The mountain-shaped portion 232 extends horizontally while having a pair of vertically opposite cam surfaces. The hinge shaft 230 also has an annular stepped portion 234 at a connection between the shaft portion 231 and mountain-shaped portion 232. By virtue of the annular stepped portion 234, the hinge shaft 230 is prevented from being separated in the rotating axis direction from the hinge housing 10g.

The hinge cam 330 has, at one longitudinal portion thereof, a pair of vertically spaced mountain-shaped portions 331, and a valley-shaped portion 332 defined between the mountain-shaped portions 331. The valley-shaped portion 332 is defined by a pair of facing cam surfaces respectively provided at the mountain-shaped portions 331. The mountain-shaped portion 232 of the hinge shaft 230 is engaged with the valley-shaped portion 332 of the hinge cam 330 in such a fashion that the cam surfaces of the hinge shaft 230 are in contact with the cam surfaces of the mountain-shaped portions 331, respectively. The hinge cam 330 is also provided at the other longitudinal portion thereof with a spring mounting protrusion 333 extending in the rotating axis direction. A guide protrusion 334 is protruded from a desired portion of the hinge cam 330. The guide protrusion 334 is received in the guide slot 134a of the hinge housing 10g so that it guides a straight sliding movement of the hinge cam 330 in the rotating axis direction during the opening and closing operation of the folder.

The hinge spring 40 is installed between the hinge cam 330 and the extension 135 is bent as shown by arrow Q completely closing the end 132 of the hinge housing 10 in such a fashion that it is in contact with the hinge cam 330 at one end 41 thereof and with the bent extension 135 at the other end 42 thereof. Accordingly, the spring force of the hinge spring 40 is applied to the hinge cam 330 in the rotating axis direction, so that the hinge cam 330 may slide reciprocally in the rotating axis direction.

Figure 39:
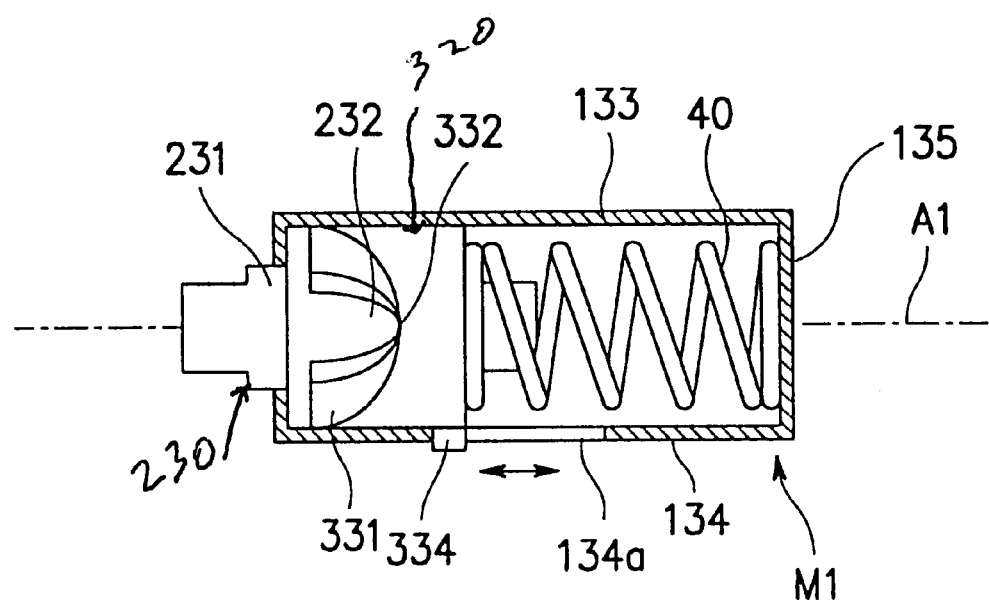
FIG. 39 is a cross-sectional view illustrating the hinge module according to the eighth embodiment of the present invention.

Referring to FIG. 39, that is, the hinge cam 330 carries out a reciprocal straight movement guided along the guide slot 134a in the hinge housing 10 during the opening and closing operation of the folder while rotating together with the folder. At this time, the hinge shaft 230 is maintained in a fixed state. During the reciprocal straight movement of the hinge cam 330, the hinge spring 40 is repeatedly compressed and expanded along the rotating axis A1.

When the apex of the mountain-shaped portion 232 of the hinge shaft 230 comes into contact with the apexes of the mountain-shaped portions 331 of the hinge cam 330 during the opening and closing operation of the folder, the hinge spring 40 is rendered to be in a maximum compression state. On the other hand, When the apex of the mountain-shaped portion 232 of the hinge shaft 230 comes into contact with the bottom of the valley-shaped portion 332 of the hinge cam 330, the hinge spring 40 is rendered to be in a maximum expansion state.

In a state in which the folder is completely closed, namely, completely folded, the mountain-shaped portion 232 of the hinge shaft 230 is completely engaged with the valley-shaped portion 332 of the hinge cam 330. Since the mountain-shaped portion 232 of the hinge shaft 230 is completely engaged with the valley-shaped portion 332 of the hinge cam 330 while being subjected to the spring force of the hinge spring 40 in this state, the folder is maintained at its completely closed state.

On the other hand, when the folder is hingably moved to be opened with respect to the phone body, the mountain-shaped portion 232 of the hinge shaft 230 is gradually separated from the valley-shaped portion 332 of the hinge cam 330 while sliding on the cam surfaces of the mountain-shaped portions 331 of the hinge cam 330. In accordance with a further movement of the folder, the mountain-shaped portion 232 of the hinge shaft 230 comes, at its apex, into contact with the apexes of the mountain-shaped portions 331 of the hinge cam 330 and then engages again with the valley-shaped portion 332 of the hinge cam 330. In this state, the folder is completely open. Since the mountain-shaped portion 232 of the hinge shaft 230 is urged by the spring force of the hinge spring 40, the folder is maintained at its completely opened state.

The hinge housing 10g, hinge cam 330, and hinge spring 40 rotate along with the folder during the opening and closing operation of the folder. At this time, the hinge shaft 230 does not rotate because it is coupled to the associated side arm of the phone body.

Since the hinge shaft 230 is fixed to the side arm of the phone body, the hinge cam 330 carries out a reciprocal straight sliding movement in a direction indicated by the arrow in FIG. 39 during the opening and closing operation of the folder. As noted above, the reciprocal straight sliding movement of the hinge cam 330 is guided by the means comprising the longitudinally extending guide slot 134a formed at the bottom wall 134 of the hinge housing 10g and the guide protrusion 334 of the hinge cam 330.

Figure 40:
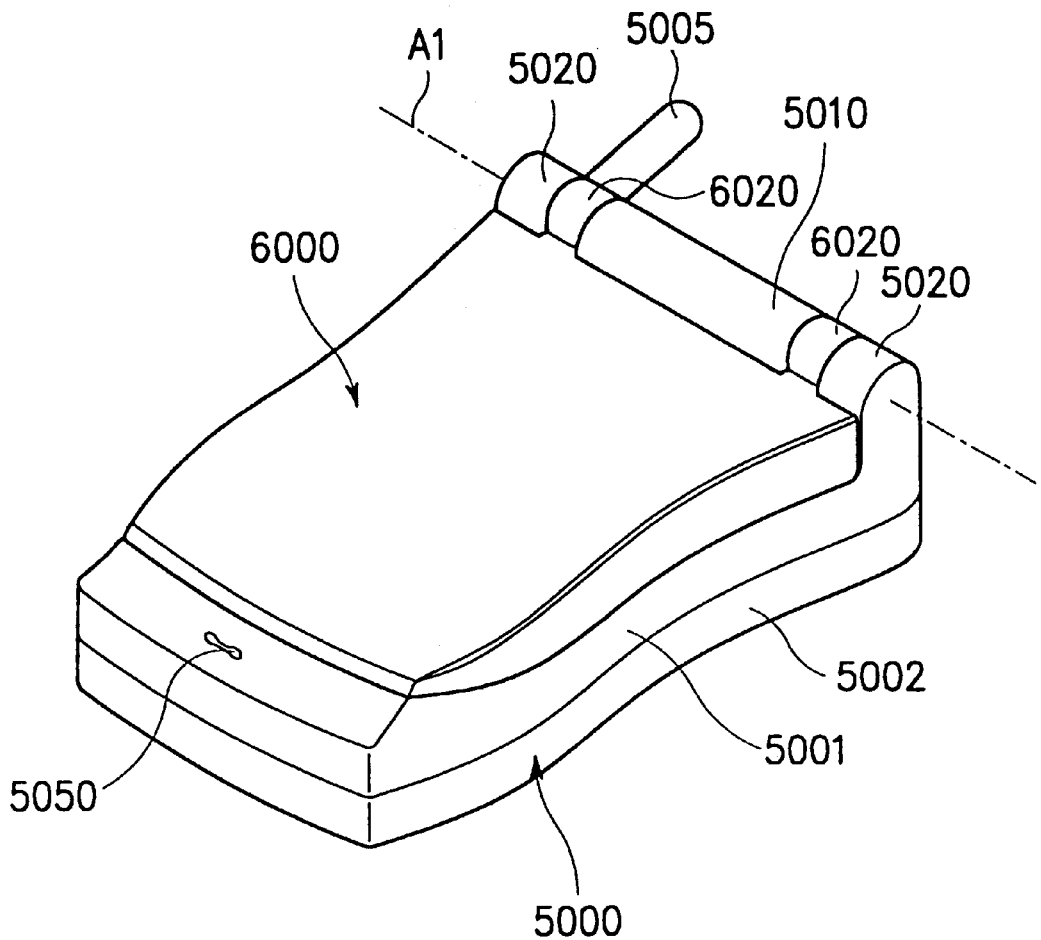
FIG. 40 is a perspective view illustrating a folder type portable phone in an on-hook state and equipped with a hinge mechanism according to a ninth embodiment of the present invention.
Figure 41:
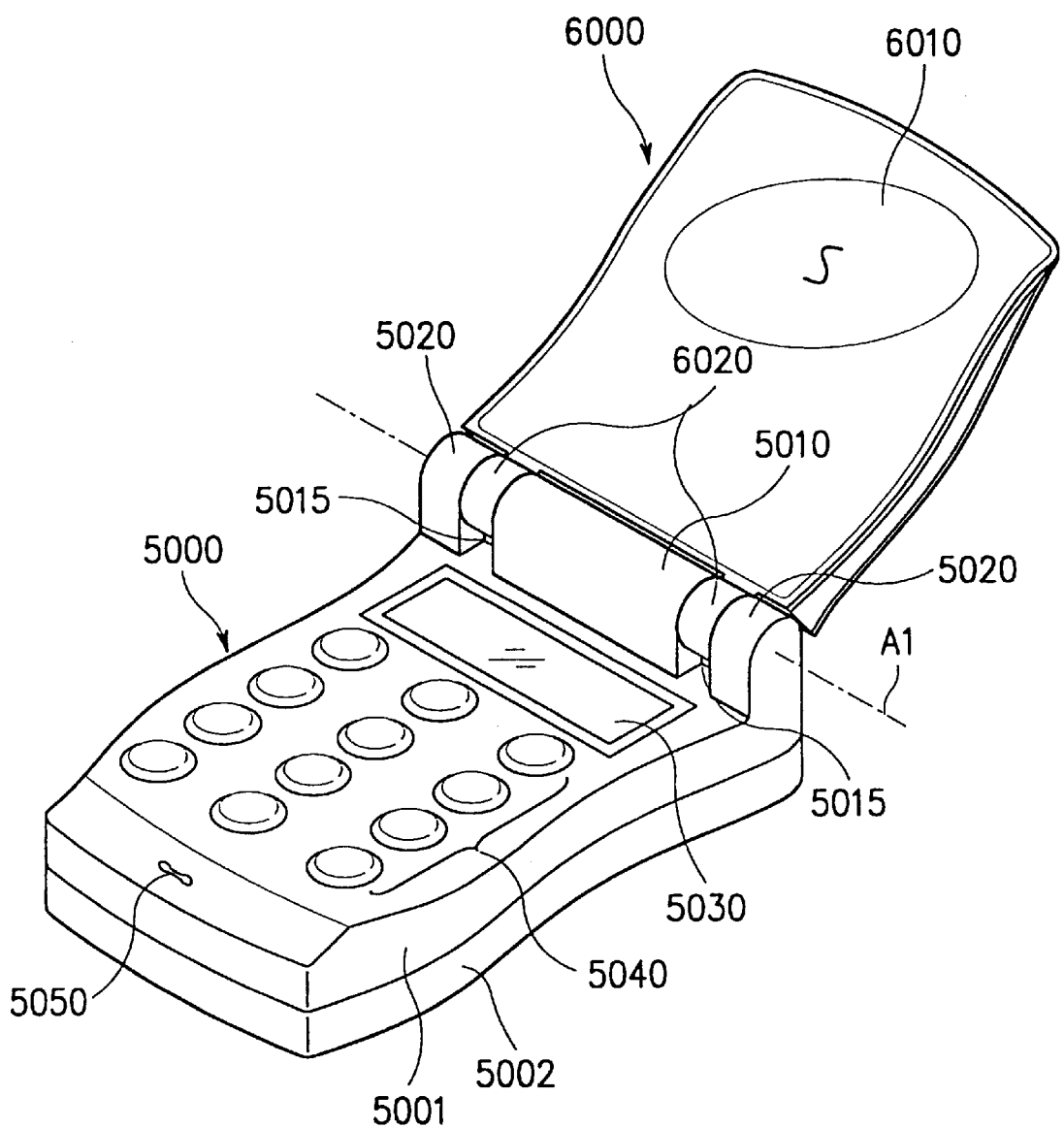
FIG. 41 is a perspective view illustrating an off-hook state of the folder type portable phone equipped with the hinge mechanism according to the ninth embodiment of the present invention.

FIGS. 40 and 41 illustrate a folder type portable phone equipped with a hinge mechanism having a configuration according to a ninth embodiment of the present invention. FIG. 40 is a perspective view illustrating an on-hook state of the folder type portable phone whereas FIG. 41 is a perspective view illustrating an off-hook state of the portable phone.

As shown in FIGS. 40 and 41, the folder type portable phone includes a phone body 5000, a folder 6000, and a hinge mechanism (not shown) adapted to mechanically couple the folder 6000 to the phone body 5000. The folder 6000 can hinge about a rotating axis A1 by the hinge mechanism so that it is opened and closed. The phone body 5000 includes an upper casing frame 5001 and a lower casing frame 5002. An antenna unit 5005 (FIG. 40) is mounted to the upper end of the phone body 5000. On the upper end of the phone body 5000, a central arm 5010 is centrally formed. A pair of side arms 5020 are formed on the upper end of the phone body 5000 at opposite sides of the central arm 5010.

Referring to FIG. 41, a pair of slots 5015 are defined between the central arm 5010 and the side arms 5020, respectively. Below the central arm 5010, an LCD unit 5030 is arranged on the phone body 5000. A key pad 5040 including a plurality of keys is arranged on the phone body 5000 below the LCD unit 5030. Below the key pad 5040, a microphone unit 5050 is installed in the phone body 5000.

An ear piece 6010 is arranged at the upper portion of the folder 6000 coupled to the phone body 5000 by the hinge mechanism. A pair of hinge sockets 6020 are provided at an end of the folder 6000 opposite to the ear piece 6010. The hinge sockets 6020 are received in the slots 5015 of the phone body 5000, respectively, so that they are coupled to the hinge mechanism.

Figure 42:
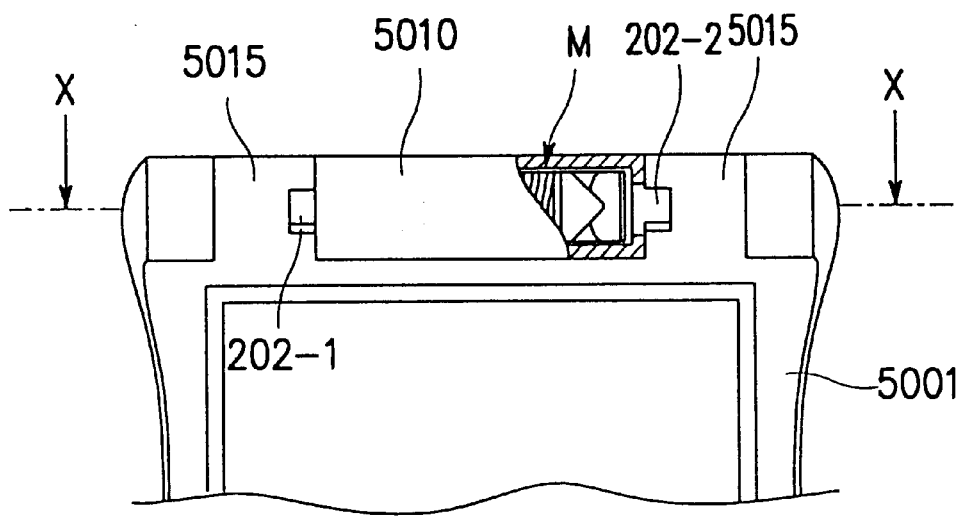
FIG. 42 is a plan view illustrating a state in which the hinge module according to the ninth embodiment of the present invention is mounted to the upper casing frame of the phone body.
Figure 43:
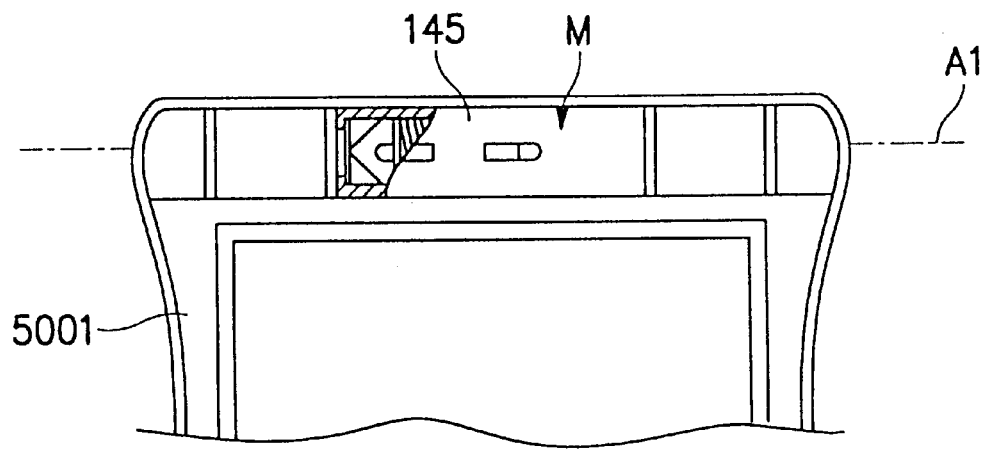
FIG. 43 is a bottom view illustrating the hinge module according to the ninth embodiment of the present invention mounted to the upper casing frame.

Referring initially to FIGS. 42 and 43, the details of the hinge mechanism of the ninth embodiment will now be described. FIG. 42 is a plan view illustrating the state in which the hinge module according to the ninth embodiment of the present invention is mounted to the upper casing frame of the phone body. FIG. 43 is a bottom view illustrating the hinge module mounted to the upper casing frame.

As shown in FIGS. 42 and 43, the hinge mechanism includes one hinge module M. This hinge module M is installed in the central arm 5010 of the phone body.

In contrast to prior single module embodiments, the ninth embodiment includes a state in which the hinge module M is mounted in the central arm 5010. Dual shaft portions 202-1 and 202-2 of the hinge module M protruding into the slots 5015, respectively, as shown in FIG. 42. In this state, the bottom wall 145 of the hinge module M is outwardly exposed whereas the top wall of the hinge module M is hidden.

Figure 44:
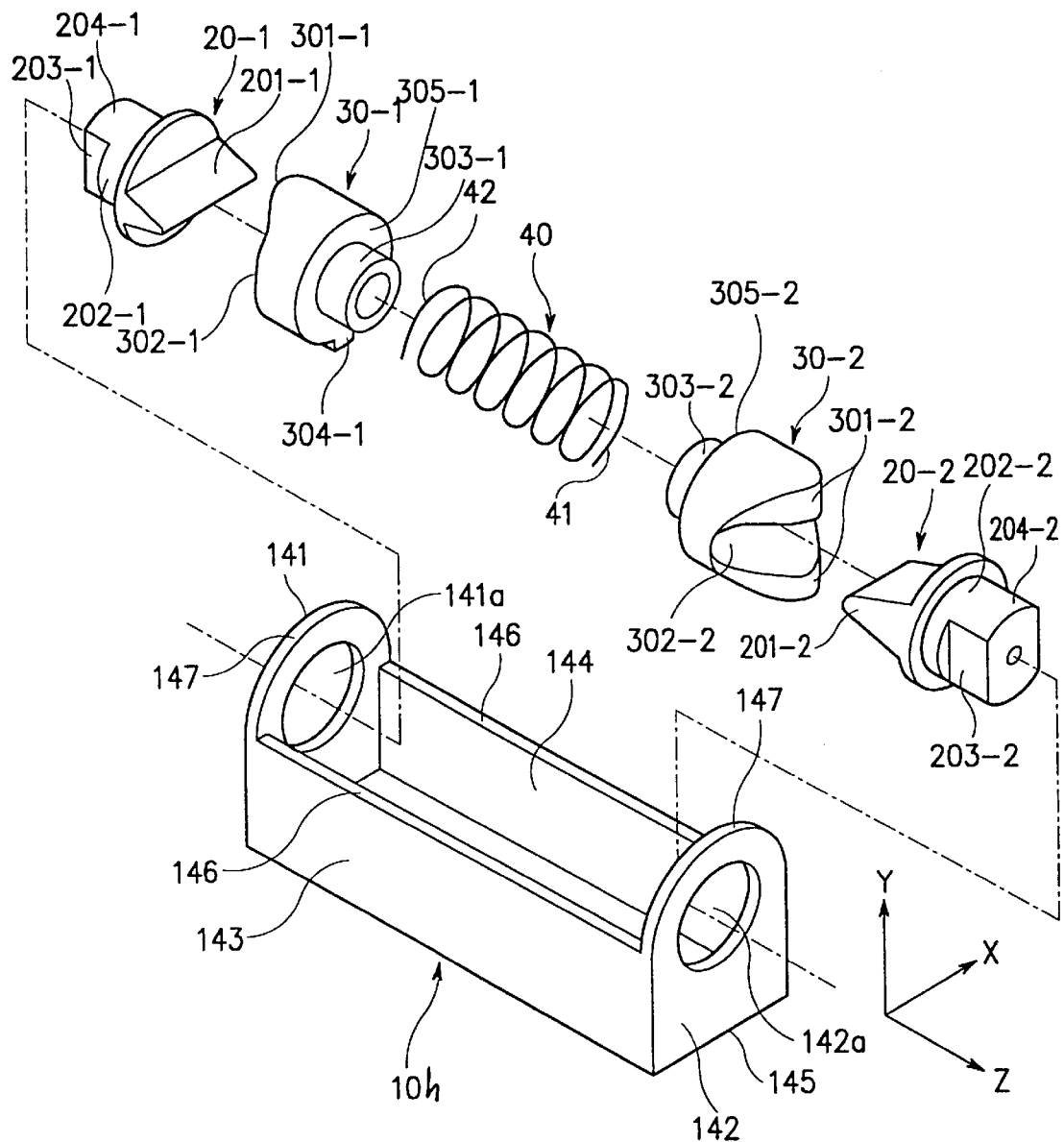
FIG. 44 is a perspective view with parts separated illustrating the configuration of the hinge module according to the ninth embodiment of the present invention.

Referring now to FIG. 44, FIG. 44 is a perspective view with parts separated illustrating the configuration of the hinge module according to the ninth embodiment of the present invention.

For reference, it is noted that the X-axis direction in FIG. 44 corresponds to a horizontal direction, the Y-axis direction corresponds to a vertical direction, and the Z-axis direction corresponds to a rotating axis direction.

As shown in FIG. 44, the hinge module includes a hinge housing 10h, a pair of hinge shafts 20-1 and 20-2, a pair of hinge cams 30-1 and 30-2, and a hinge spring 40. The hinge shafts 20-1 and 20-2 are symmetrically arranged in the hinge housing 10h at opposite outermost positions when viewed in the direction of the rotating axis A1, respectively. Inwardly from the hinge shafts 20-1 and 20-2, the hinge cams 30-1 and 30-2 are arranged in the hinge housing 10h in such a fashion that they face each other in the rotating axis direction. The hinge spring 40 is disposed between the hinge cams 30-1 and 30-2.

The hinge housing 10h is partially opened at both ends thereof when viewed in the direction of the rotating axis A1 by a pair of lateral end walls, respectively. That is, circular holes 141a and 142a are formed through the end walls 141 and 142 of the hinge housing 10h in order to allow respective shaft portions 202-1 and 202-2 of the hinge shafts 20-1 and 20-2 to pass therethrough. The hinge housing 10h is also completely opened at its upper end and is partially opened at its lower end. That is, the hinge housing 10*h* has an opening 144 at its upper end, and a partially opened bottom wall 145 (FIG. 45) at its lower end. The hinge housing 10*h* also has vertical walls 146 at both ends thereof when viewed in the X-axis direction. The bottom wall 145 has a pair of guide slots 145*a* (shown in FIG. 45) extending in the Z-axis direction (namely, the rotating axis direction). The hinge housing 10*h* has flat surfaces 146 at respective upper surfaces of the walls 143 and 144. The hinge housing 10*h* is also provided with round surfaces 147 at respective upper surfaces of the end walls 141 and 142.

The hinge shafts 20-1 and 20-2, which are symmetrically arranged in the hinge housing 10*h*, have shaft portions 202-1 and 202-2 at their one-end portions, respectively. The shaft portion 202-1 has a pair of opposite flat surfaces 203-1 and a pair of opposite curved surfaces 204-1 whereas the shaft portion 202-2 has a pair of opposite flat surfaces 203-2 and a pair of opposite curved surfaces 204-2. The hinge shafts 20-1 and 20-2 also have mountain-shaped portion 201-1 and 201-2 each extending horizontally (namely, in the X-axis direction) while having a pair of vertically opposite cam surfaces. In the state in which the hinge shafts 20-1 and 20-2 are mounted in the hinge housing 10*h*, the shaft portions 202-1 and 202-2 are exposed outwardly from the hinge housing 10*h* through the holes 141*a* and 142*a*, respectively.

The hinge cam 30-1, which is arranged in such a fashion that it faces the hinge shaft 20-1, has, at one longitudinal portion thereof, a pair of vertically spaced mountain-shaped portions 301-1, and a valley-shaped portion 302-1 defined between the mountain-shaped portions 301-1. The valley-shaped portion 302-1 is defined by a pair of facing cam surfaces respectively provided at the mountain-shaped portions 302-1. The mountain-shaped portion 201-1 of the hinge shaft 20-1 is engaged with the valley-shaped portion 302-1 of the hinge cam 30-1 in such a fashion that the cam surfaces of the hinge shaft 20-1 are in contact with the cam surfaces of the mountain-shaped portions 201-1, respectively.

The hinge cam 30-1 is also provided at the other longitudinal portion thereof with a spring mounting protrusion 303-1 extending in the rotating axis direction. A guide protrusion 304-1 is protruded from a desired portion of the hinge cam 30-1. The guide protrusion 304-1 is received in the associated guide slot 145*a* of the hinge housing 10*h* so that it guides a straight sliding movement of the hinge cam 30-1 in the rotating axis direction during the opening and closing operation of the folder.

Similarly, the hinge cam 30-2, which is arranged in such a fashion that it faces the hinge shaft 20-2, and has the same construction as the hinge cam 30-1. That is, the hinge cam 30-2 has a pair of vertically spaced mountain-shaped portions 301-2, and a valley-shaped portion 302-2 defined between the mountain-shaped portions 301-2. The valley-shaped portion 302-2 is defined by a pair of facing cam surfaces respectively provided at the mountain-shaped portions 302-2. The mountain-shaped portion 201-2 of the hinge shaft 20-2 is engaged with the valley-shaped portion 302-2 of the hinge cam 30-2 in such a fashion that the cam surfaces of the hinge shaft 20-2 are in contact with the cam surfaces of the mountain-shaped portions 201-2, respectively.

Figure 48:
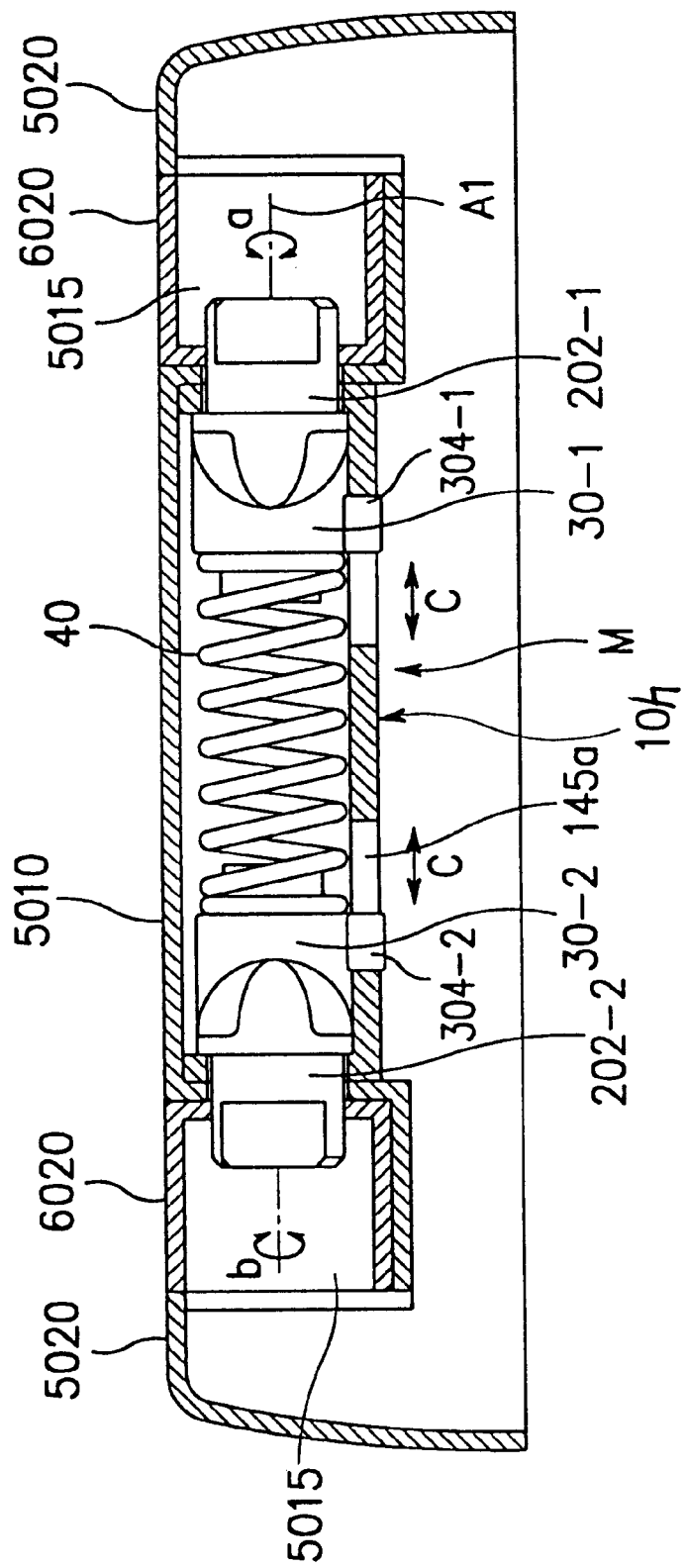
FIG. 48 is a cross-sectional view illustrating a state in which the folder is assembled with the hinge mechanism according to the ninth embodiment of the present invention.

The hinge cam 30-2 is also provided at the other longitudinal portion thereof with a spring mounting protrusion 303-2 extending in the rotating axis direction. As shown in FIG. 48, a guide protrusion 304-2 (shown in FIG. 48) is protruded from a desired portion of the hinge cam 30-2. The guide protrusion 304-2 is received in the associated guide slot 145*a* of the hinge housing 10*h* so that it guides a straight sliding movement of the hinge cam 30-2 in the rotating axis direction during the opening and closing operation of the folder.

In the state in which the hinge shafts 20-1 and 20-2 are arranged in position in the hinge housing 10*h*, their mountain-shaped portions 201-1 and 201-2 are engaged with the valley-shaped portions 302-1 and 302-2 of the associated hinge cams 30-1 and 30-2.

In this state, the hinge spring 40, which is disposed between the hinge cams 30-1 and 30-2, are in contact with respective annular surfaces 305-1 and 305-2 of the hinge cams 30-1 and 30-2 at opposite ends 42 and 41, respectively. Accordingly, the spring force of the hinge spring 40 is applied to the hinge cams 30-1 and 30-2 in opposite directions along the rotating axis A1, so that the hinge cams 30-1 and 30-2 may slide reciprocally in the rotating axis direction. In other words, the hinge spring 40 is expanded and compressed in the rotating axis direction.

Figure 45:
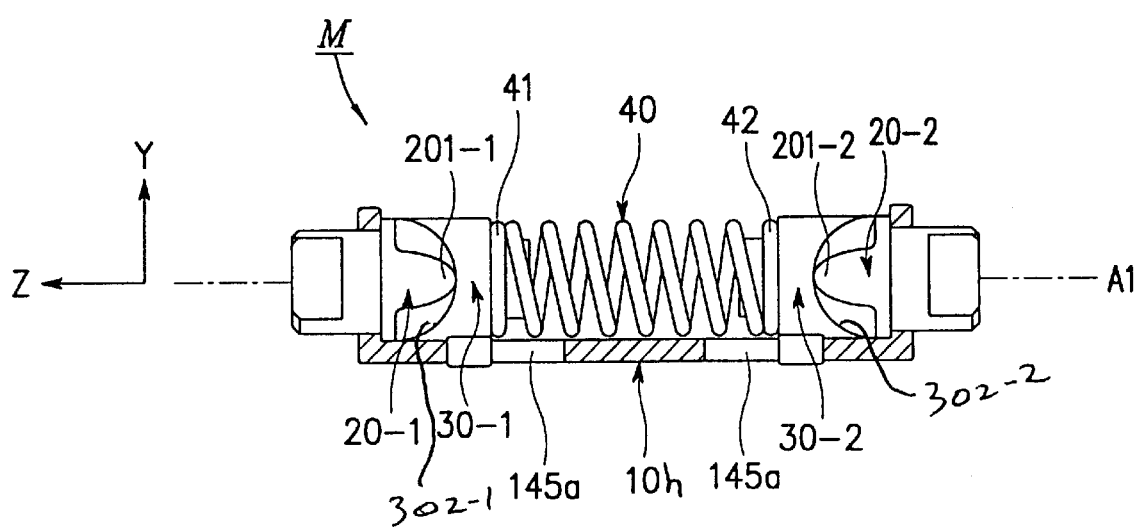
FIG. 45 is a cross-sectional view illustrating an assembled state of the hinge module according to the ninth embodiment of the present invention.
Figure 46:
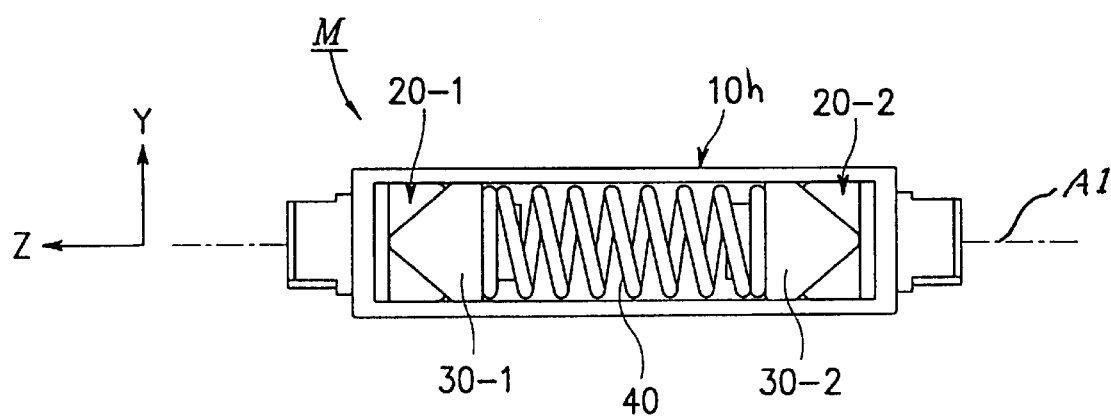
FIG. 46 is a plan view illustrating an assembled state of the hinge module according to the ninth embodiment of the present invention.

Referring now to FIGS. 45 and 46, FIGS. 45 and 46 show the state in which the hinge shafts 20-1 and 20-2, hinge cams 30-1 and 30-2, and hinge spring 40 are assembled together in the hinge housing 10*h*.

As shown in FIGS. 45 and 46, the hinge shafts 20-1 and 20-2 are symmetrically arranged in the hinge housing 10*h* at opposite outermost positions when viewed in the direction of the rotating axis A1, respectively, in such a fashion that they are rotatable with respect to the hinge housing 10*h*. Inwardly from the hinge shafts 20-1 and 20-2, the hinge cams 30-1 and 30-2 are arranged in the hinge housing 10*h* in such a fashion that they are slidable along the guide slots 145*a*, respectively. The hinge spring 40 is disposed between the hinge cams 30-1 and 302 in such a fashion that they are compressed and expanded along the rotating axis direction.

Referring to FIG. 45, the mountain-shaped portions 201-1 and 201-2 of the hinge shafts 20-1 and 20-2 extend horizontally in such a fashion that the cam surfaces of each mountain-shaped portion are vertically opposite to each other. The valley-shaped portions 302-1 and 302-2 of the hinge cams 30-1 and 30-2 also extend horizontally in such a fashion that the cam surfaces defining each valley-shaped portion face each other in the vertical direction. The hinge spring 40 extends in the rotating axis direction.

Figure 47:
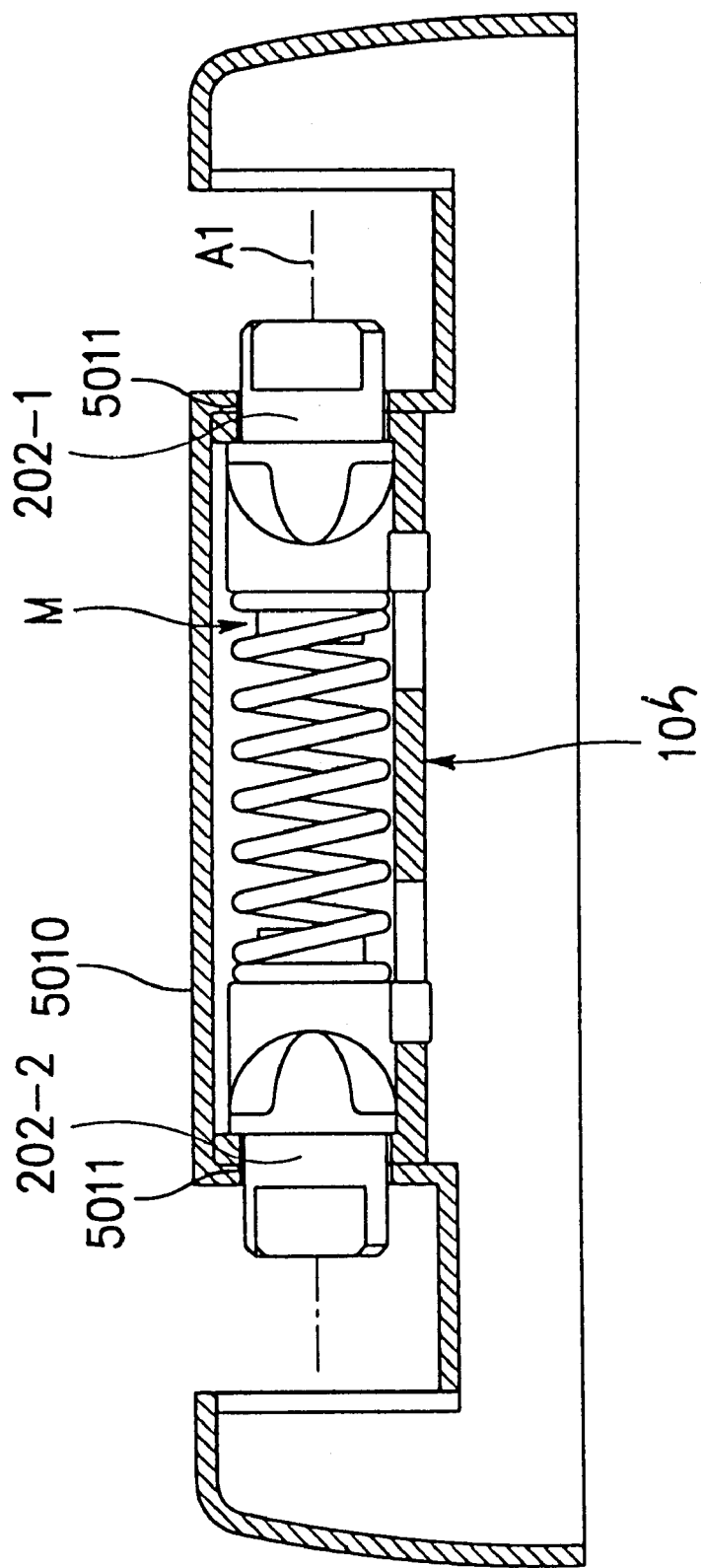
FIG. 47 is a cross-sectional view taken along the line X—X of FIG. 42.

Now, the process for assembling the hinge module M having the above mentioned configuration to the central arm 5010 of the phone body will be described in conjunction with FIG. 47. The hinge module M, which is in an independently assembled state, is mounted to the central arm 5010 in such a fashion that their shaft portions 202-1 and 202-2 extend outwardly through holes 5011 formed at opposite ends of the central arm 5010, respectively. In this state, the hinge module M is supported by the central arm 5010 at opposite ends thereof corresponding to the shaft portions 202-1 and 202-2. The central arm 5010 has a semi-cylindrical shape at its upper wall so that it conforms to the hinge housing 10*h*.

Referring to FIG. 48, the hinge sockets 6020 of the folder 6000 are received in the slots 5015 of the phone body 5000 defined between the central arm 5010 and the side arms 5020 in such a fashion that they are fitted around the shaft portions 202-1 and 202-2, respectively. Thus, the folder 6000 is hingably mounted to the phone body 5000 by the hinge mechanism. When the folder 6000 carries out an opening or closing movement about the rotating axis A1, the hinge shafts 202-1 and 202-2 rotate in a direction indicated by the arrow b in FIG. 48 along with the folder 6000. By virtue of the rotation of the hinge shafts 202-1 and 202-2, the hinge cams 30-1 and 30-2 carry out a reciprocal straight movement in a direction indicated by the arrow c in FIG. 48 while sliding on the hinge shafts 202-1 and 202-2, respectively. At this time, the hinge spring 40 is expanded or compressed in accordance with the sliding movements of the hinge cams 30-1 and 30-2.

As mentioned above, the sliding movements of the hinge cams 30-1 and 302 are guided by their guide protrusions 304-1 and 304-2 received in the guide slots 145a. When the hinge cams 30-1 and 30-2 move toward each other, the hinge spring 40 is compressed. On the other hand, when the hinge cams 30-1 and 30-2 move away from each other, the hinge spring 40 is expanded by its resilience.

Figure 49:
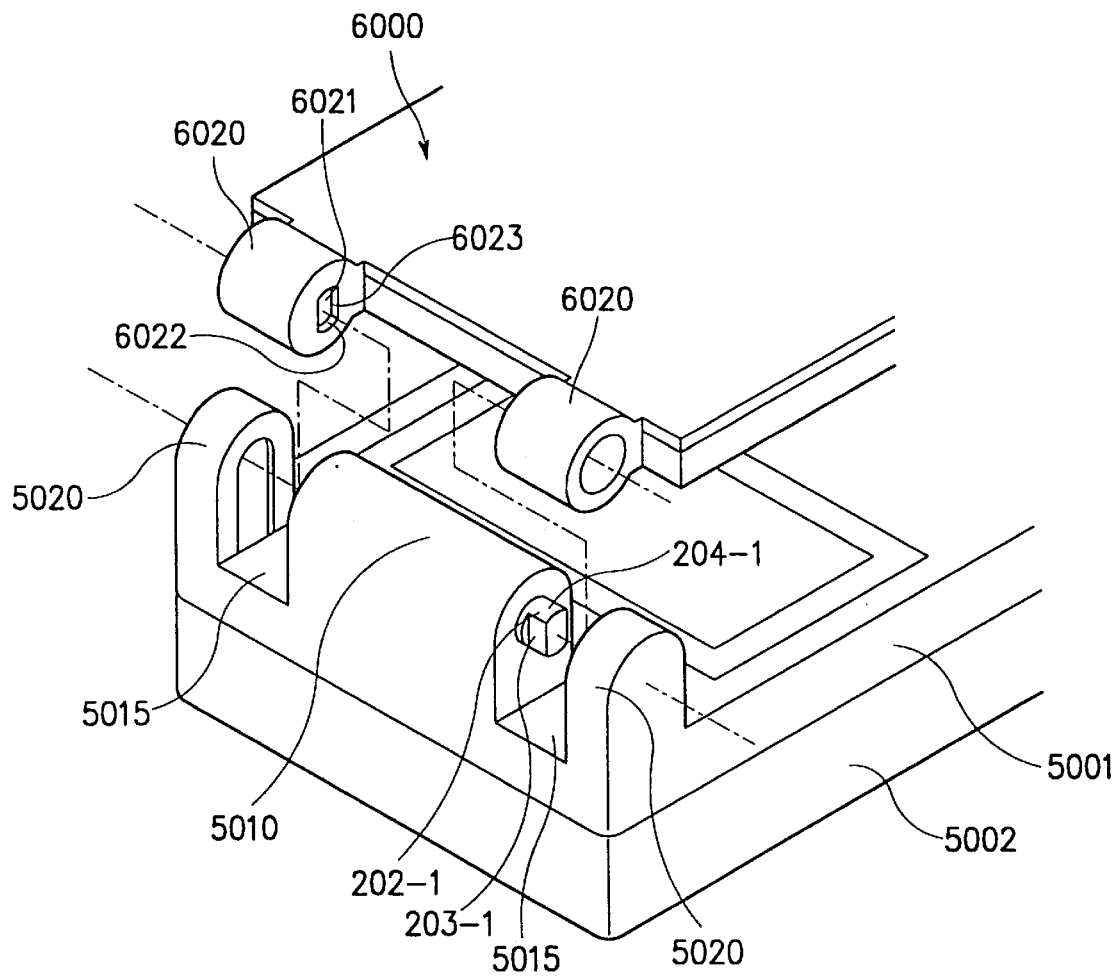
FIG. 49 is an exploded perspective view illustrating a process in which the folder is mounted to the phone body by the hinge mechanism according to the ninth embodiment of the present invention.

As mentioned above and as shown in FIG. 49, the shaft portions 202-1 and 202-2 are protruded into the slots 5015 in a state in which the hinge module (not shown in FIG. 49) is assembled to the central arm 5010. The protruded shaft portions 202-1 and 202-2 are fitted in the hinge sockets 6020 of the folder 6000. Each hinge socket 6020 has a hole 6021 for receiving an associated one of the shaft portions 202-1 and 202-2. The hole 6021 has the same shape as the associated shaft portion. That is, the hole 6021 has a pair of curved surfaces 6022 and a pair of flat surfaces 6023.

As apparent from the above description, in the folder type portable phone equipped with the hinge mechanism according to the ninth embodiment of the present invention, the folder 6000 is coupled to the hinge module mounted in the central arm 5010 of the upper casing frame 5001 in such a fashion that it carries out an opening and closing movement. In accordance with the illustrated hinge mechanism of the present invention, the opening and closing angle range of the folder 6000 is limited up to about 160°. However, the opening and closing angle range of the folder 6000 may be varied by varying the engaging position of each hinge shaft with respect to the associated hinge cam in a state in which the folder 6000 is mounted to the phone body 5000 by the hinge mechanism. Alternatively, the opening and closing angle range of the folder 6000 may be varied by varying the angular position of the hole 6021 formed at each hinge socket 6020.

Figure 50:
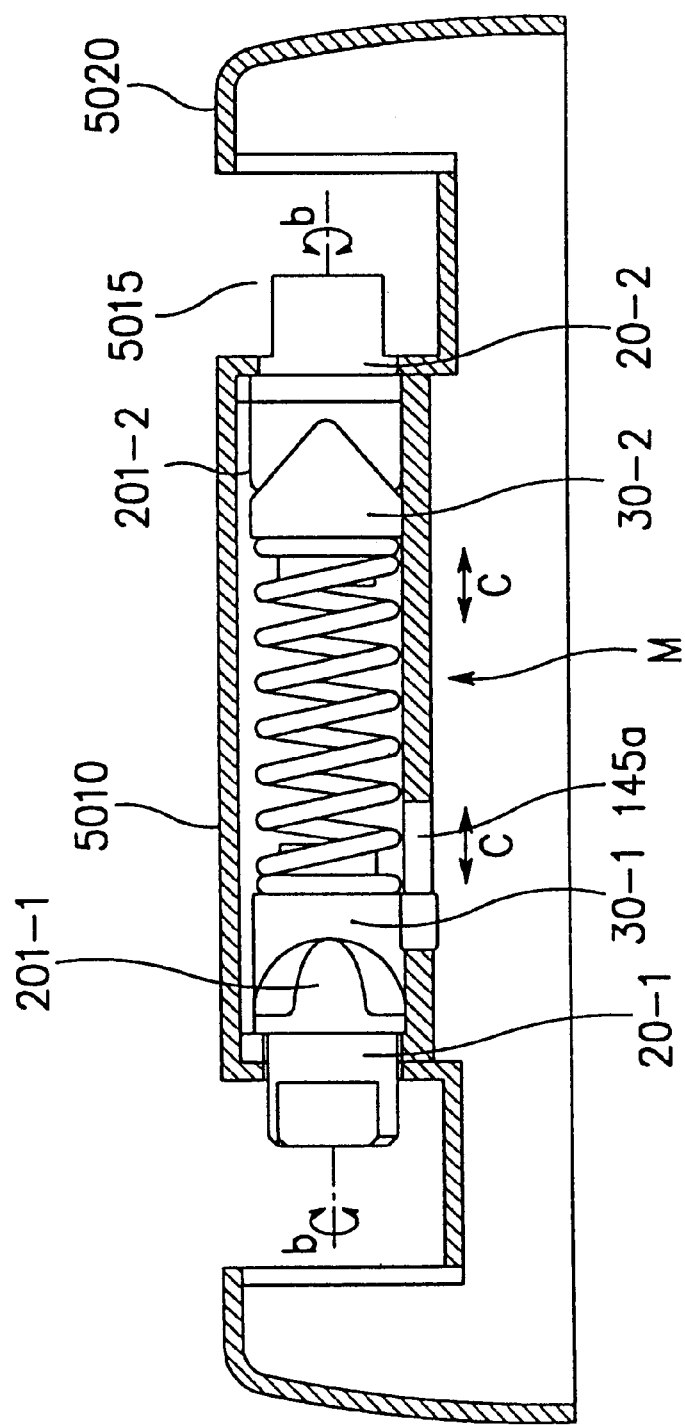
FIG. 50 is a cross-sectional view illustrating the hinge module according to the ninth embodiment of the present invention in which its hinge shafts and hinge cams are asymmetrically mounted in a central arm of the phone body.

Referring now to FIG. 50, FIG. 50 illustrates a cross-sectional view of a hinge module M in which the hinge shafts 20-1 and 20-2 and the hinge cams 30-1 and 30-2 are asymmetrically mounted in the hinge housing 10 in such a fashion that the engaging position of the hinge shaft 20-2 with respect to the associated hinge cam 30-2 is varied from that of FIG. 48 in a state in which the folder 6000 is mounted to the phone body 5000 by the hinge module M.

In this case, the hinge shaft 20-1 is horizontally arranged in such a fashion that the cam surfaces of the mountain-shaped portion 201 -1 thereof are vertically opposite to each other whereas the hinge shaft 20-2 is vertically arranged in such a fashion that the cam surfaces of the mountain-shaped portion 201-2 thereof are horizontally opposite to each other, as shown in FIG. 50. While not shown, a guide slot 145a and a guide protrusion would be oriented 90° from the opposed ones. When the folder 6000 is mounted to the phone body 5000 by the hinge module M, the shaft portion 201-2 of the hinge shaft 20-2 is fitted in the associated hinge socket 6020 of the folder 6000 in a state in which its engaging position with respect to the associated hinge cam 30-2 is varied from that of FIG. 48. Accordingly, it is possible to vary the opening and closing angle range of the folder 6000 from that in the case of FIG. 48. This may also be achieved by forming the hole of the hinge socket receiving the shaft portion 201-2 of the hinge shaft 20-2 in such a fashion that it is angularly shifted from that in the case of FIG. 48. Thus, a variety of opening and closing angle ranges can be implemented for the folder.

Figure 51:
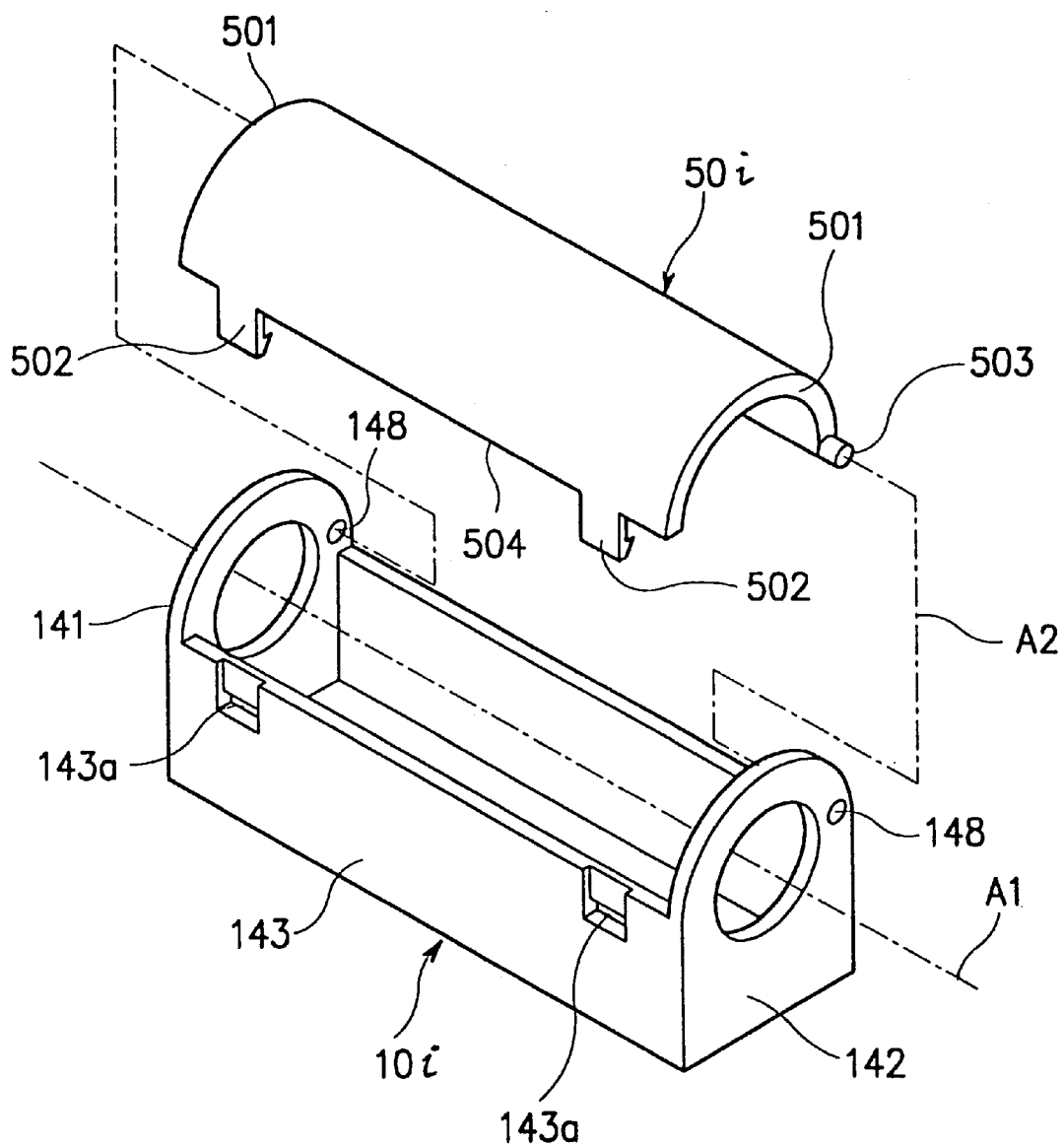
FIG. 51 is a perspective view illustrating a hinge housing having a configuration according to a tenth embodiment of the present invention.

FIG. 51 is a perspective view illustrating a hinge module having a configuration according to a tenth embodiment of the present invention. The hinge module of this embodiment has the same configuration as that of the ninth embodiment, except for the configuration of the hinge housing 10i. The hinge housing 10i according to the tenth embodiment has a configuration capable of achieving an improvement in the efficiency of the assembling process. Now, this hinge housing will be described in detail, in conjunction with FIG. 51.

As shown in FIG. 51, a hinge cover 50 is assembled to the hinge housing 10i. The hinge cover 50 serves to protect the hinge shafts, hinge cams, and hinge spring similar to those described above received in the hinge housing 10i.

The hinge cover 50i extends longitudinally (namely, in the direction of a rotating axis A1) and has a C-shaped cross section. That is, the hinge cover 50i has opposite longitudinal ends 501 having a C shape. The hinge cover 50 is hingably coupled to the hinge housing 10i by a hinge means. The hinge means comprises a pair of hinge protrusions 503 provided at both ends 501 of the hinge cover 50i, and a pair of hinge holes 148 provided at both end walls 141 and 142 of the hinge housing 10i. The hinge protrusions 503 are engaged with the hinge holes 148, thereby causing the hinge cover 50i to be hingably coupled to the hinge housing in such a fashion that the hinge cover 50i hinges about a rotating axis A2.

In order to maintain the hinge cover 50i in a closed state relative to the hinge housing 10i, at least one locking protrusion 502 is provided at an end 504 of the hinge cover 50i opposite to the hinge protrusions 503 when viewed in the X-axis direction. At least one locking hole 143a is also formed at the wall 143 of the hinge housing 10i and is configured to releasably engage the locking protrusion 502. Since the hinge cover 50i can hinge with respect to the hinge housing 10i in accordance with the tenth embodiment of the present invention, it is possible to achieve an improvement in the efficiency of the assembling process. In addition, there is convenience in regard to maintenance and repair of the hinge module.

Figure 52:
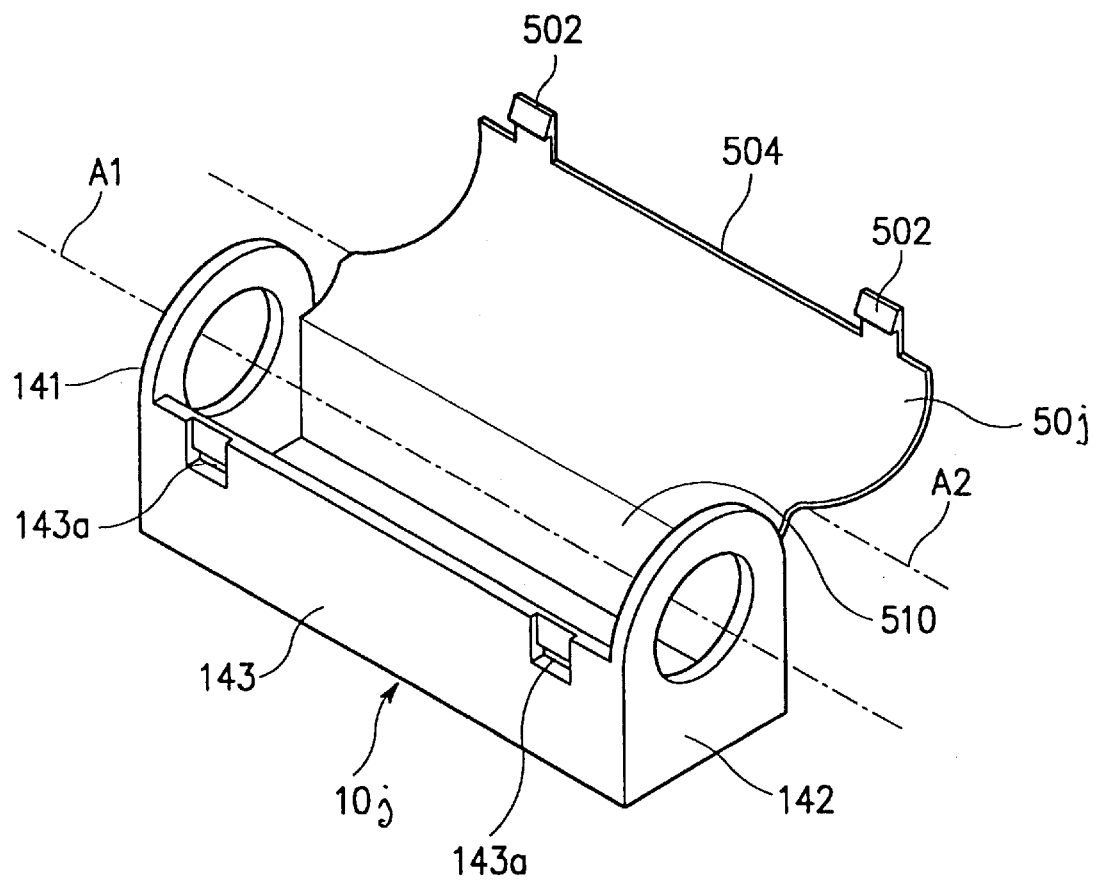
FIG. 52 is a perspective view illustrating a hinge housing having a configuration according to an eleventh embodiment of the present invention.

FIG. 52 is a perspective view illustrating a hinge module having a configuration according to an eleventh embodiment of the present invention. The hinge module of this embodiment has the same configuration as that of the ninth embodiment, except for the configuration of the hinge housing 10j. The hinge housing 10j according to the tenth embodiment has a configuration capable of achieving an improvement in the efficiency of the assembling process. Now, this hinge housing will be described in detail, in conjunction with FIG. 52.

As shown in FIG. 52, a hinge cover 50 is integrally connected to the hinge housing 10j by a living hinge or connecting member 510 serving as a hinge means. This hinge means 510 is made of a plastic material while having a structure having a small thickness. Accordingly, the hinge means 510 exhibits a flexibility desired to hinge the hinge cover 50j about a rotating axis A2.

Preferably, the hinge means 510 is integrally molded with the hinge housing 10j and hinge cover 50j.

The hinge cover 50j extends longitudinally (namely, in the direction of a rotating axis A1) and has a C-shaped cross section. In order to maintain the hinge cover 50*j* in a state closing the hinge housing 10*j*, at least one locking protrusion 502 is provided at an end 504 of the hinge cover 50*j* opposite to the hinge means 510 when viewed in the X-axis direction. At least one locking hole 143*a* is also formed at the wall 143 of the hinge housing 10*j* so that it releasably engages with the locking protrusion 502.

As apparent from various embodiments of the present invention as mentioned above, the hinge mechanism of the present invention is assembled in a particular manner capable of achieving an improvement in the efficiency of the assembling process, as compared to conventional hinge mechanisms. That is, in the hinge mechanism of the present invention, the hinge cover adapted to cover the top of the hinge housing is hingably coupled to the hinge housing. This configuration provides convenience in regard to the assembling process. The hinge mechanism of the present invention also provides an improvement in the compactness of products. Also, the hinge mechanism of the present invention can carry out stable opening and closing operations which are important for folder type and flip type portable phones because it includes hinge modules symmetrically arranged. The hinge mechanism of the present invention, which has been described as being applied to folder type and flip type portable phones, is also applicable to any portable terminals.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. In a portable phone including a phone body, a cover, and a hinge mechanism adapted to mechanically couple the cover to the phone body, the hinge mechanism comprising:
    at least one hinge module mounted to said phone body and adapted to hinge said cover with respect to said phone body for opening and closing said cover, said hinge module comprising:
        a hinge housing having a bottom wall, and a pair of opposite lateral end walls spaced from each other in a rotating axis direction, one of said lateral walls having a hole, said hinge housing being completely opened at an upper end thereof to facilitate assembly of said at least one hinge module, and also having a pair of opposite longitudinal end walls spaced from each other in a direction normal to said rotating axis direction;
        a hinge shaft having a mountain-shaped portion with a pair of opposite circumferential flat surfaces and a pair of opposite circumferential curved surfaces, said hinge shaft being assembled in said hinge module through said opened upper end of said hinge housing and being arranged in said hinge housing in such a fashion that said shaft portion extends through said hole of said hinge housing outwardly from said hinge housing and is coupled to said cover, so that it rotates together with said cover;
        a hinge cam being assembled in said hinge module through said opened upper end of said hinge housing and arranged in said hinge housing in such a fashion that it faces said hinge shaft in said rotating axis direction, said hinge cam having, at one longitudinal portion thereof, a pair of mountain-shaped protrusions respectively provided with facing cam surfaces defining a valley-shaped portion therebetween, and, at the other longitudinal portion thereof, a mounting structure, said hinge cam engaging at said valley-shaped portion with said mountain-shaped portion of said hinge shaft in such a fashion that it slides straight in said rotating axis direction in accordance with said rotation of said hinge shaft; and
        a hinge spring being assembled in said hinge module through said opened upper end of said hinge housing and arranged in said hinge housing in said rotating axis direction in such a fashion that it is mounted to said mounting structure of said hinge cam at one end thereof and is in contact with the other lateral end wall of said hinge housing at the other end thereof, said hinge spring serving to urge said hinge cam toward said hinge shaft in said rotating axis direction.

2. The hinge mechanism according to claim 1, wherein said at least one hinge module comprises two hinge modules mounted in a receiving portion of said phone body in such a fashion that they are asymmetric to each other.

3. The hinge mechanism according to claim 1, further comprising:
    a hinge cover mounted to said hinge housing and adapted to close said opened upper end of said hinge housing.

4. The hinge mechanism according to claim 3, wherein said hinge cover has means for coupling said hinge cover to said hinge housing in a state closing said opened upper end of said hinge housing.

5. The hinge mechanism according to claim 1, wherein said hinge shaft mountain-shaped portion is provided with a pair of opposite cam surfaces at one longitudinal portion thereof and said hinge shaft is provided with a shaft portion at the other longitudinal portion thereof, said shaft portion being provided at a free end thereof.

6. The hinge mechanism according to claim 1, further comprising means for guiding said straight sliding movement of said hinge cam in said rotating axis direction.

7. The hinge mechanism according to claim 1, wherein said mounting structure is a mounting protrusion extending from said hinge cam in said rotating axis direction.

8. In a flip type portable phone including a phone body, a flip cover, and a hinge mechanism adapted to mechanically couple the flip cover to the phone body, the hinge mechanism comprising:
    a pair of hinge modules mounted to said phone body in such a fashion that they are adapted to hinge said flip cover with respect to said phone body for opening and closing said flip cover, each of said hinge modules comprising:
        a hinge housing having a bottom wall, and a pair of opposite lateral end walls spaced from each other in a rotating axis direction, one of said lateral walls having a hole, said hinge housing being completely opened at an upper end thereof to facilitate assembly of said hinge module, and also having a pair of opposite longitudinal end walls spaced from each other in a direction normal to said rotating axis direction, one of said longitudinal end walls having at least one engagement hole;
        a hinge shaft having a mountain-shaped portion provided with a pair of opposite cam surfaces at one longitudinal portion thereof and a shaft portion at the other longitudinal portion thereof, said shaft portion being provided at a free end thereof with a pair of opposite circumferential flat surfaces and a pair of opposite circumferential curved surfaces, said hinge shaft being arranged in said hinge housing in such a fashion that said shaft portion extends through said hole of said hinge housing outwardly from said hinge housing and is coupled to said flip cover, so that it rotates together with said flip cover;

a hinge cam arranged in said hinge housing in such a fashion that it faces said hinge shaft in said rotating axis direction, said hinge cam having, at one longitudinal portion thereof, a pair of mountain-shaped protrusions respectively provided with facing cam surfaces defining a valley-shaped portion therebetween, and, at the other longitudinal portion thereof, a mounting protrusion extending in said rotating axis direction, said hinge cam engaging at said valley-shaped portion with said mountain-shaped portion of said hinge shaft in such a fashion that it slides straight in said rotating axis direction in accordance with said rotation of said hinge shaft;

a hinge spring arranged in said hinge housing in said rotating axis direction in such a fashion that it is mounted to said mounting protrusion of said hinge cam at one end thereof and is in contact with the other lateral end wall of said hinge housing at the other end thereof, said hinge spring serving to urge said hinge cam toward said hinge shaft in said rotating axis direction;

a hinge cover removably mounted to said hinge housing and adapted to close said opened upper end of said hinge housing, said hinge cover being provided with at least one engagement protrusion adapted to engage with said engagement hole of said hinge housing in a state in which said hinge cover closes said opened upper end of said hinge housing; and means for guiding said straight sliding movement of said hinge cam in said rotating axis direction;

wherein said hinge shaft, said hinge cam, and said hinge spring are assembled in said hinge module through said opened upper end of said hinge housing.

9. The hinge mechanism according to claim 8, wherein said hinge means comprises a pair of hinge protrusions respectively protruded from opposite lateral ends of said hinge cover, and a pair of hinge holes respectively formed at said lateral end walls of said hinge housing and engaged with said hinge protrusions.

10. The hinge mechanism according to claim 8, said hinge means comprises a connecting member for connecting said hinge cover to said hinge housing, said connecting member being made of a plastic material while having a structure having a small thickness to exhibit a flexibility.

* * * * *